United States Patent
Conrad

(10) Patent No.: US 11,617,488 B2
(45) Date of Patent: Apr. 4, 2023

(54) ROBOTIC VACUUM CLEANER AND DOCKING STATION FOR A ROBOTIC VACUUM CLEANER

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 329 days.

(21) Appl. No.: 16/926,330

(22) Filed: Jul. 10, 2020

(65) Prior Publication Data

US 2021/0330167 A1    Oct. 28, 2021

Related U.S. Application Data

(60) Provisional application No. 63/013,781, filed on Apr. 22, 2020.

(51) Int. Cl.
| | |
|---|---|
| *A47L 9/14* | (2006.01) |
| *A47L 9/28* | (2006.01) |
| *A47L 9/10* | (2006.01) |
| *A47L 11/40* | (2006.01) |
| *B01D 46/00* | (2022.01) |

(52) U.S. Cl.
CPC .......... *A47L 11/4025* (2013.01); *A47L 9/102* (2013.01); *A47L 9/106* (2013.01); *A47L 9/149* (2013.01); *A47L 9/2873* (2013.01); *A47L 11/4011* (2013.01); *A47L 11/4027* (2013.01); *A47L 11/4091* (2013.01); *A47L 11/4097* (2013.01); *B01D 46/0032* (2013.01); *B01D 46/0043* (2013.01); *A47L 2201/024* (2013.01); *B01D 2273/30* (2013.01); *B01D 2279/55* (2013.01)

(58) Field of Classification Search
CPC .............. A47L 11/4011; A47L 11/4025; A47L 11/4027; A47L 11/4091; A47L 11/4097; A47L 2201/022; A47L 2201/024; A47L 9/102; A47L 9/106; A47L 9/1409; A47L 9/149; A47L 9/19; A47L 9/22; A47L 9/248; A47L 9/2873; B01D 2273/30; B01D 2279/55; B01D 46/0032; B01D 46/0043
See application file for complete search history.

(56) References Cited

U.S. PATENT DOCUMENTS

| | | | |
|---|---|---|---|
| 3,543,325 | A | 12/1970 | Hamrick |
| 5,135,552 | A | 8/1992 | Weistra |
| 5,787,545 | A | 8/1998 | Colens |

(Continued)

FOREIGN PATENT DOCUMENTS

| | | |
|---|---|---|
| CA | 978485 | 11/1975 |
| CA | 2492737 A1 | 11/2005 |

(Continued)

OTHER PUBLICATIONS

KR-101202916-B1—English Machine Translation (Year: 2012).*

(Continued)

*Primary Examiner* — Marc Carlson
(74) *Attorney, Agent, or Firm* — Philip C. Mendes da Costa; Bereskin & Parr LLP/S.E.N.C.R.L., s.r.l.

(57) ABSTRACT

A robotic vacuum cleaner docking station has a mechanical transfer mechanism that is used to transfer dirt from a robotic vacuum cleaner to a docking station.

16 Claims, 32 Drawing Sheets

(56) References Cited

U.S. PATENT DOCUMENTS

| | | |
|---|---|---|
| 6,327,741 B1 | 12/2001 | Reed |
| 6,389,329 B1 | 5/2002 | Colens |
| 7,053,578 B2 | 5/2006 | Diehl et al. |
| 7,247,181 B2 | 7/2007 | Hansen et al. |
| 7,473,289 B2 | 1/2009 | Oh et al. |
| 7,849,555 B2 | 12/2010 | Hahm et al. |
| 7,861,366 B2 | 1/2011 | Hahm et al. |
| 7,887,613 B2 | 2/2011 | Ruben |
| 8,572,799 B2 | 11/2013 | Won et al. |
| 8,635,739 B2 * | 1/2014 | Lee .................... A47L 9/20 15/352 |
| 8,695,159 B2 | 4/2014 | Van Der Kooi et al. |
| 8,756,751 B2 * | 6/2014 | Jung .................... A47L 9/30 15/319 |
| 8,984,708 B2 | 3/2015 | Kuhe et al. |
| 9,192,272 B2 | 11/2015 | Ota |
| 9,462,920 B1 | 10/2016 | Morin et al. |
| 9,492,048 B2 | 11/2016 | Won et al. |
| 9,788,698 B2 | 10/2017 | Morin et al. |
| 9,888,818 B2 | 2/2018 | Kuhe et al. |
| 9,931,007 B2 | 4/2018 | Morin et al. |
| 10,595,696 B2 | 3/2020 | Harting et al. |
| 2007/0157416 A1 * | 7/2007 | Lee .................... A47L 9/2894 15/328 |
| 2007/0157420 A1 * | 7/2007 | Lee .................... A47L 5/28 15/328 |
| 2007/0226949 A1 * | 10/2007 | Hahm .................... A47L 9/009 15/340.1 |
| 2007/0245511 A1 * | 10/2007 | Hahm .................... A47L 9/106 134/21 |
| 2012/0102670 A1 * | 5/2012 | Jang .................... A47L 9/1463 15/49.1 |
| 2014/0059983 A1 | 3/2014 | Ho |
| 2017/0196430 A1 | 7/2017 | Machida et al. |
| 2018/0000302 A1 | 1/2018 | Hyun et al. |
| 2018/0078107 A1 | 3/2018 | Gagnon et al. |
| 2020/0122164 A1 | 4/2020 | Conrad |
| 2020/0170468 A1 * | 6/2020 | Nakayama ............. A47L 9/0477 |
| 2020/0179953 A1 | 6/2020 | Conrad |
| 2020/0187736 A1 * | 6/2020 | Jeong .................... A47L 9/2873 |
| 2021/0330157 A1 * | 10/2021 | Conrad .................... A47L 9/248 |

FOREIGN PATENT DOCUMENTS

| | | | |
|---|---|---|---|
| CN | 1212095 C | 7/2005 | |
| EP | 1961358 A2 * | 8/2008 | ............. A47L 9/106 |
| EP | 1243218 B1 | 5/2010 | |
| EP | 1707094 B1 | 4/2012 | |
| EP | 2717109 A1 * | 4/2014 | ............. B25J 19/005 |
| GB | 539973 | 10/1941 | |
| GB | 2467403 A | 8/2010 | |
| GB | 2522658 B | 4/2016 | |
| JP | 2003180587 A | 7/2003 | |
| KR | 1020070012109 A | 1/2007 | |
| KR | 101202916 B1 * | 11/2012 | |
| WO | WO-2018100773 A1 * | 6/2018 | ............. A47L 5/225 |
| WO | WO-2020262863 A1 * | 12/2020 | ............... A47L 5/22 |

OTHER PUBLICATIONS

English machine translation of KR1020070012109A, published on Jan. 25, 2007.

English machine translation of EP1243218B1, published on May 19, 2010.

English machine translation of JP2003180587A, published on Jul. 2, 2003.

English machine translation of CN1212095, published on Jul. 27, 2005.

* cited by examiner

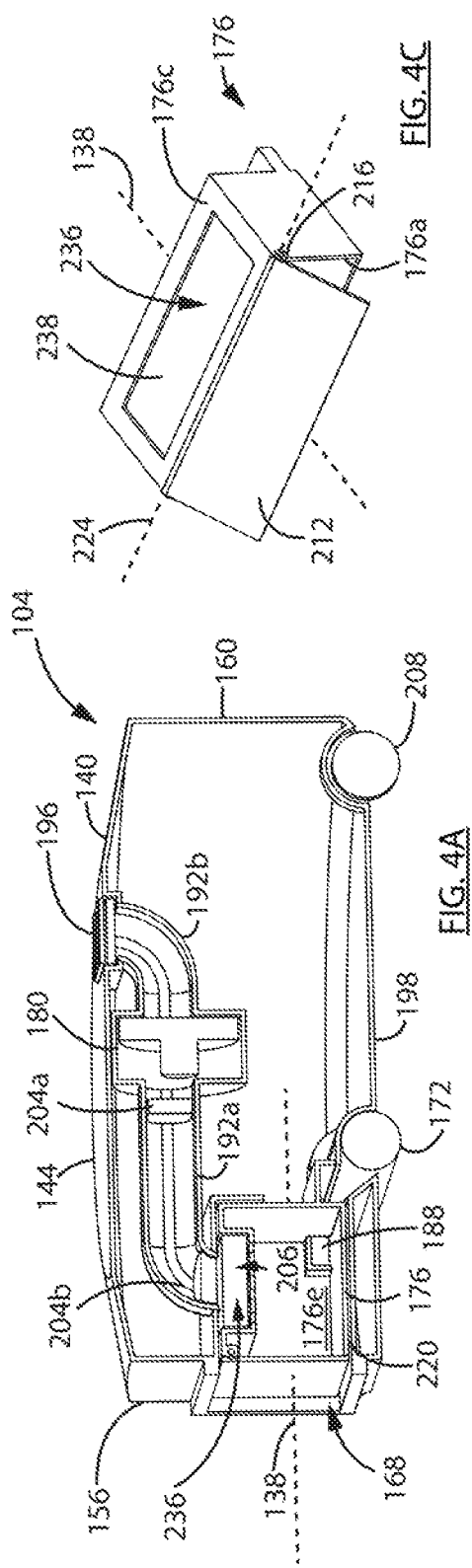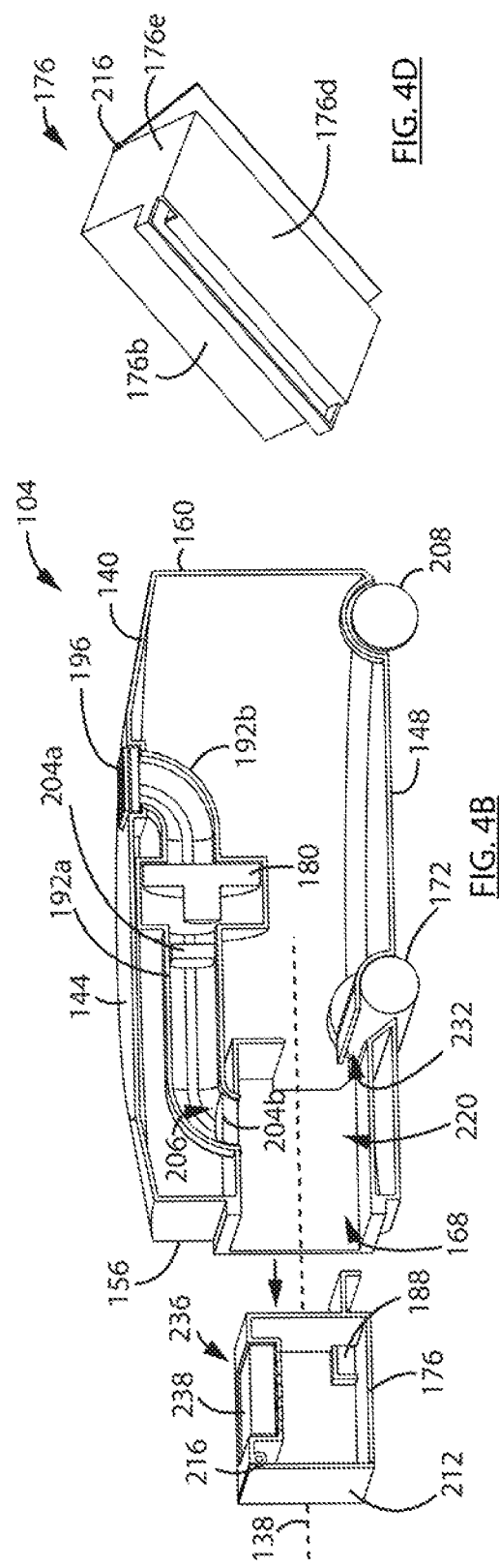

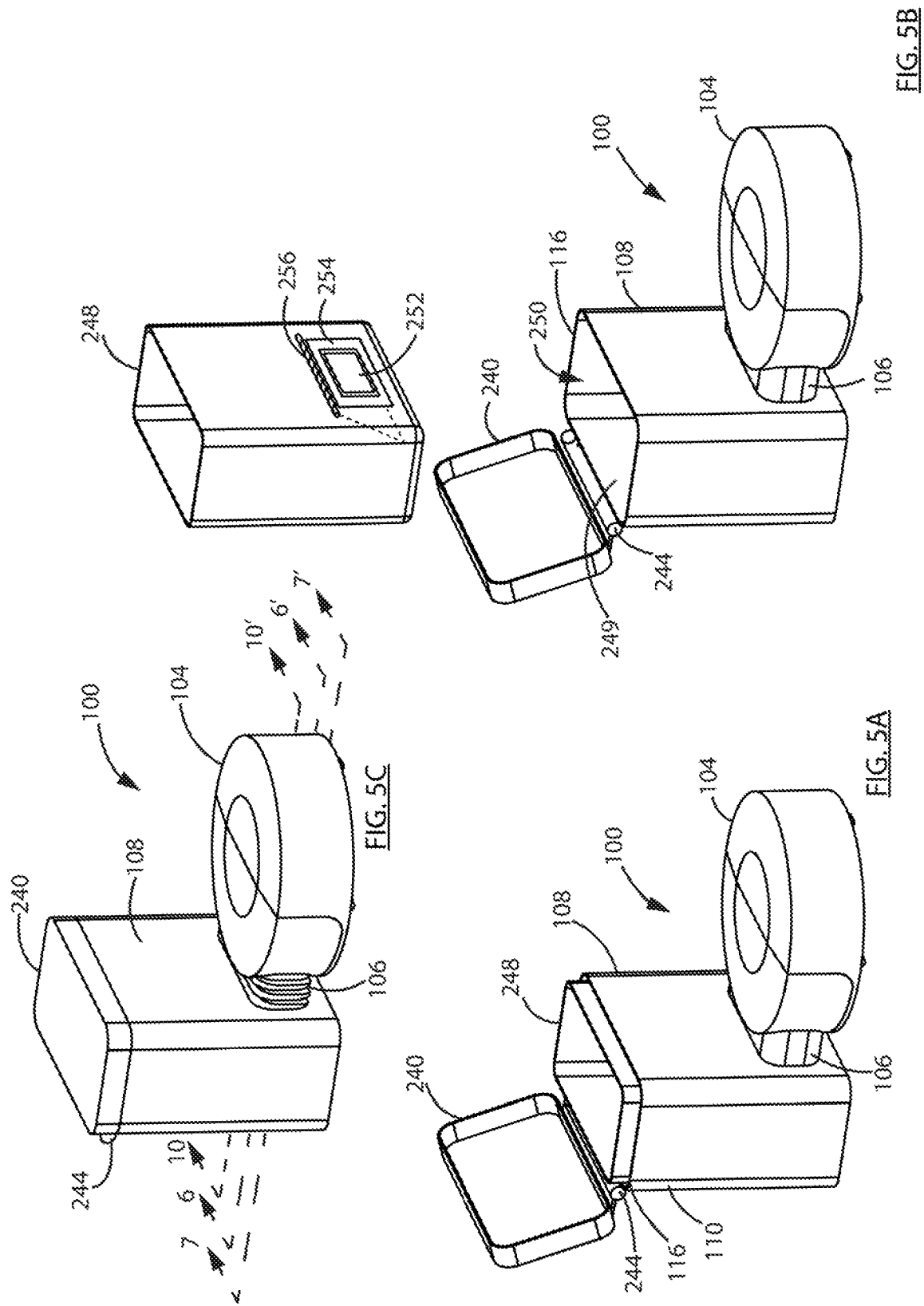

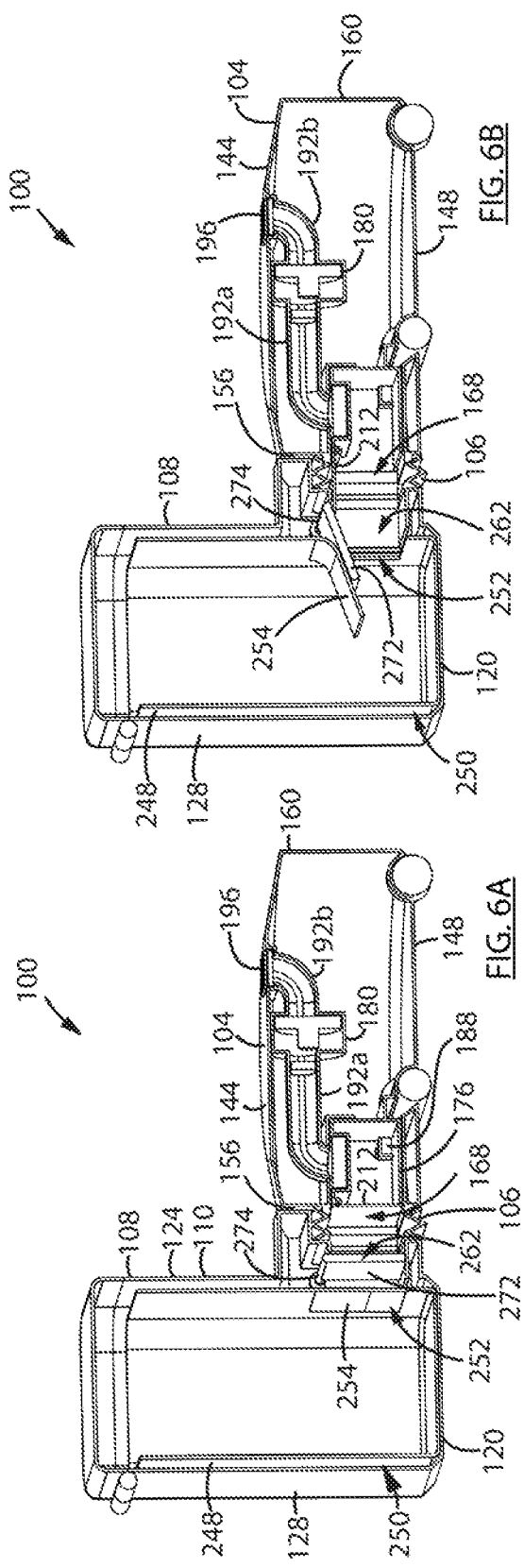
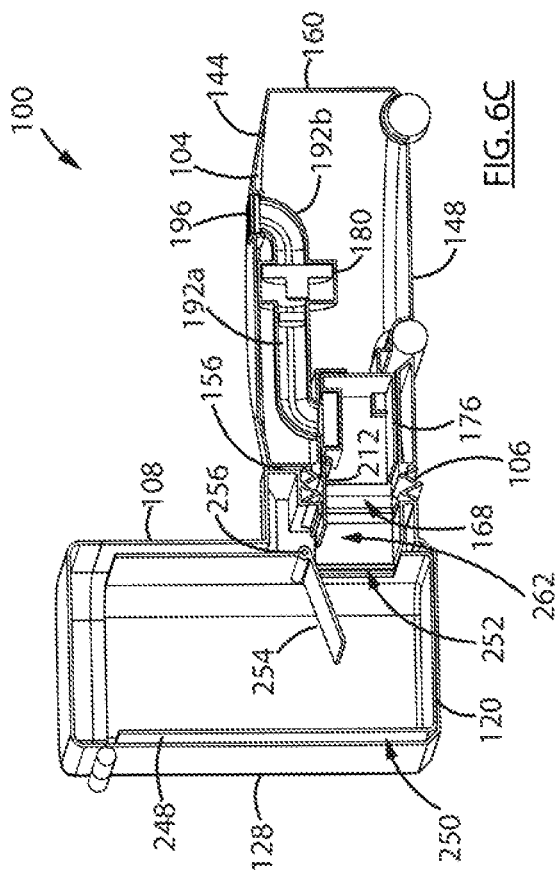

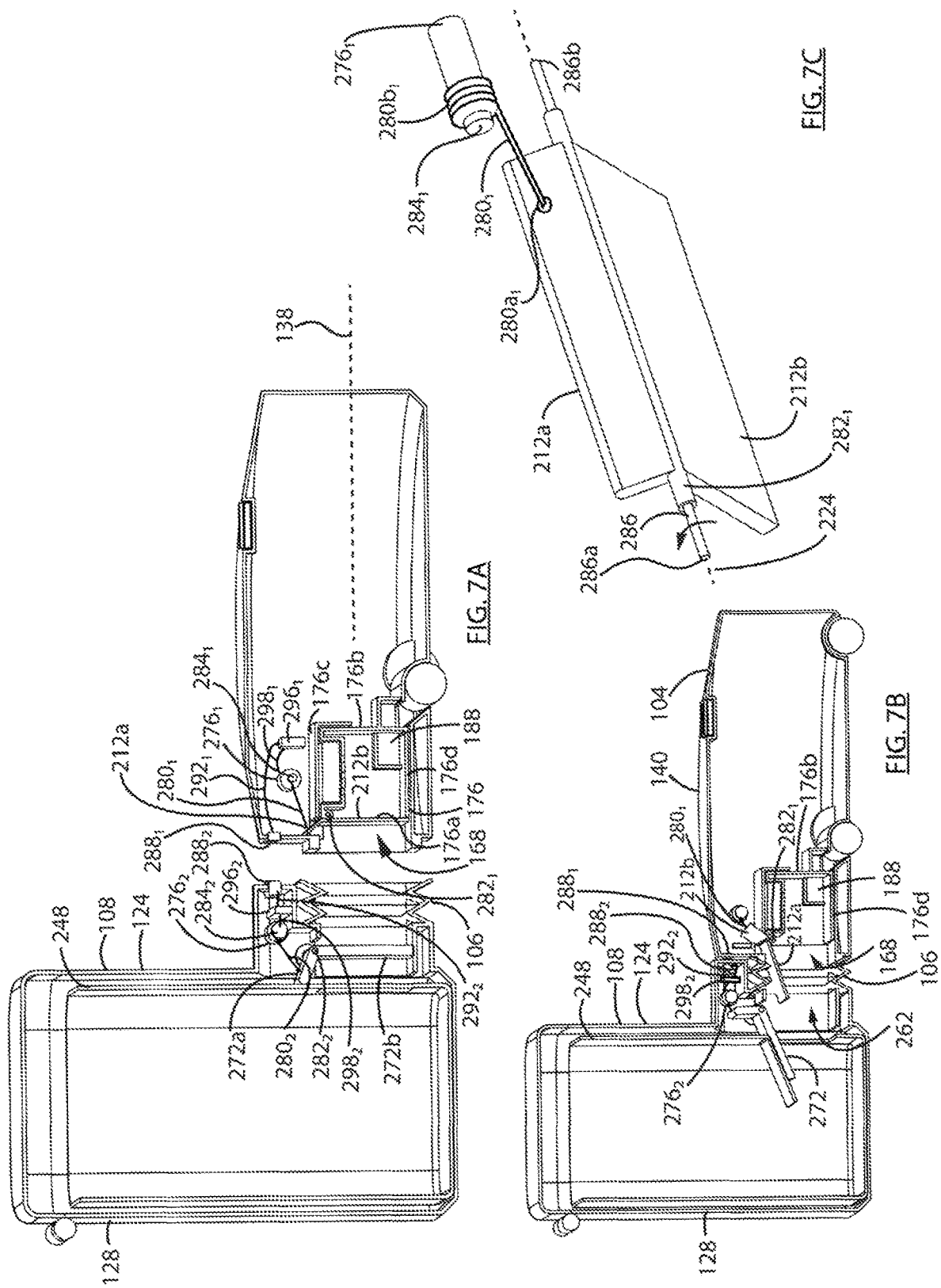

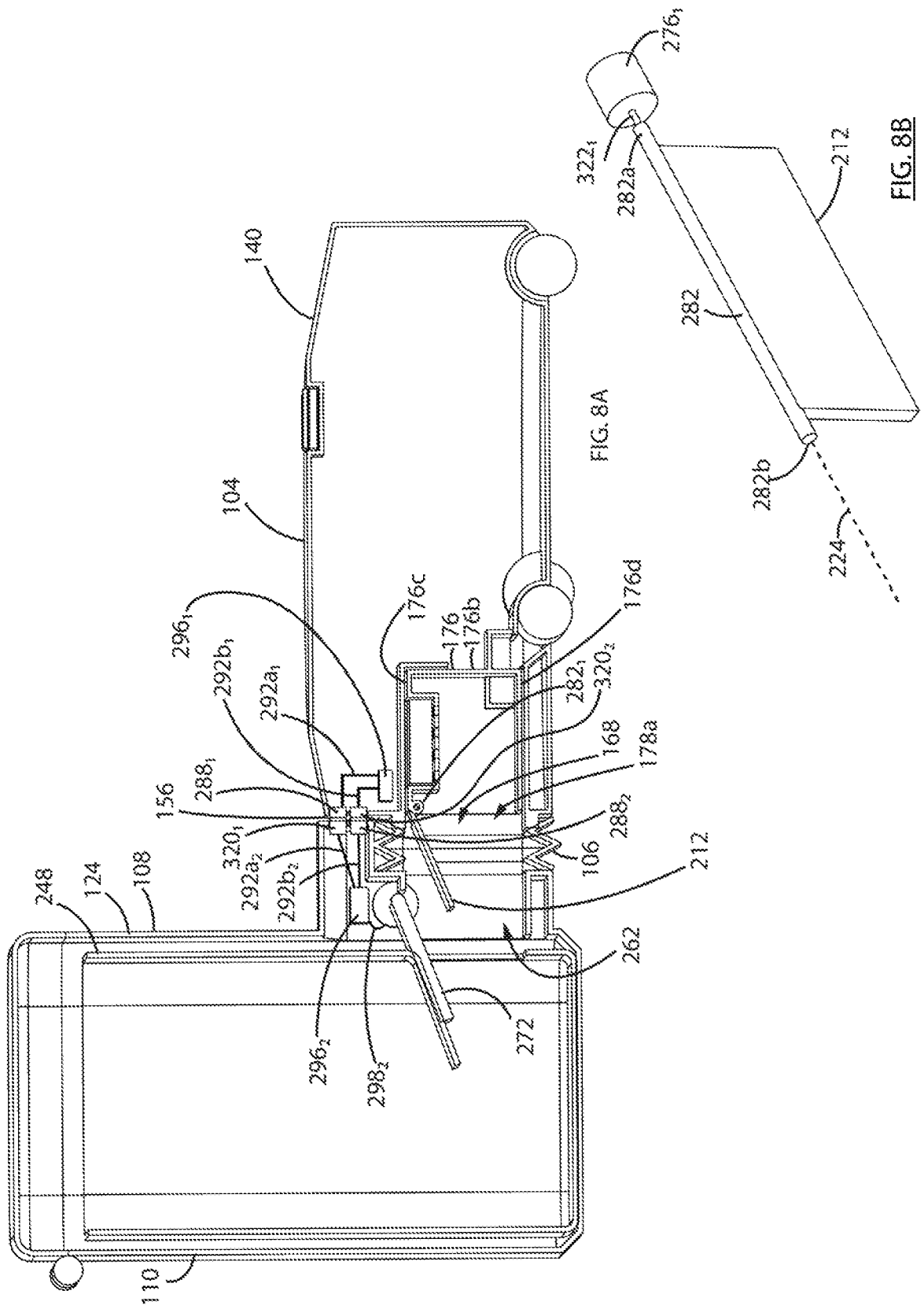

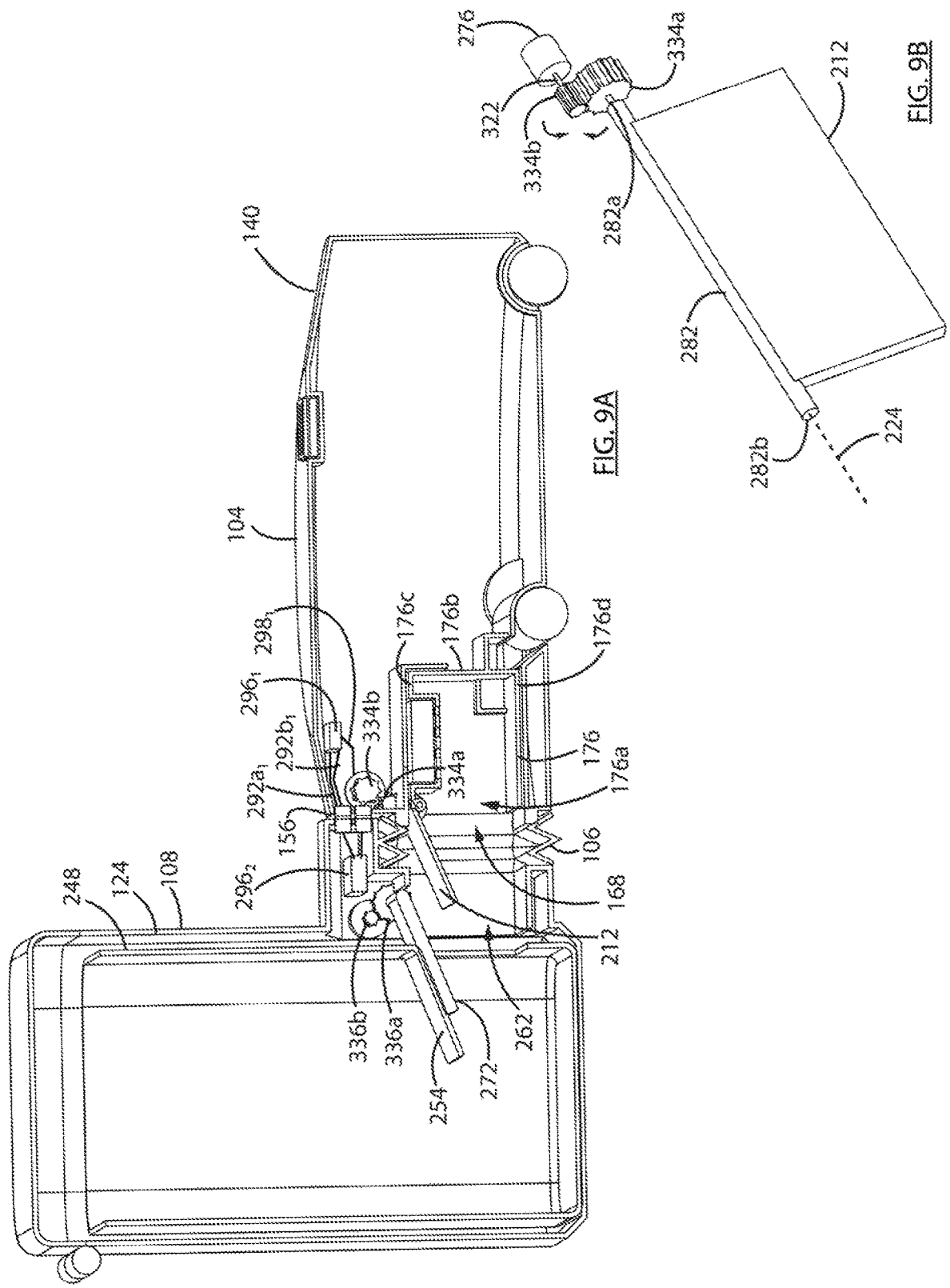

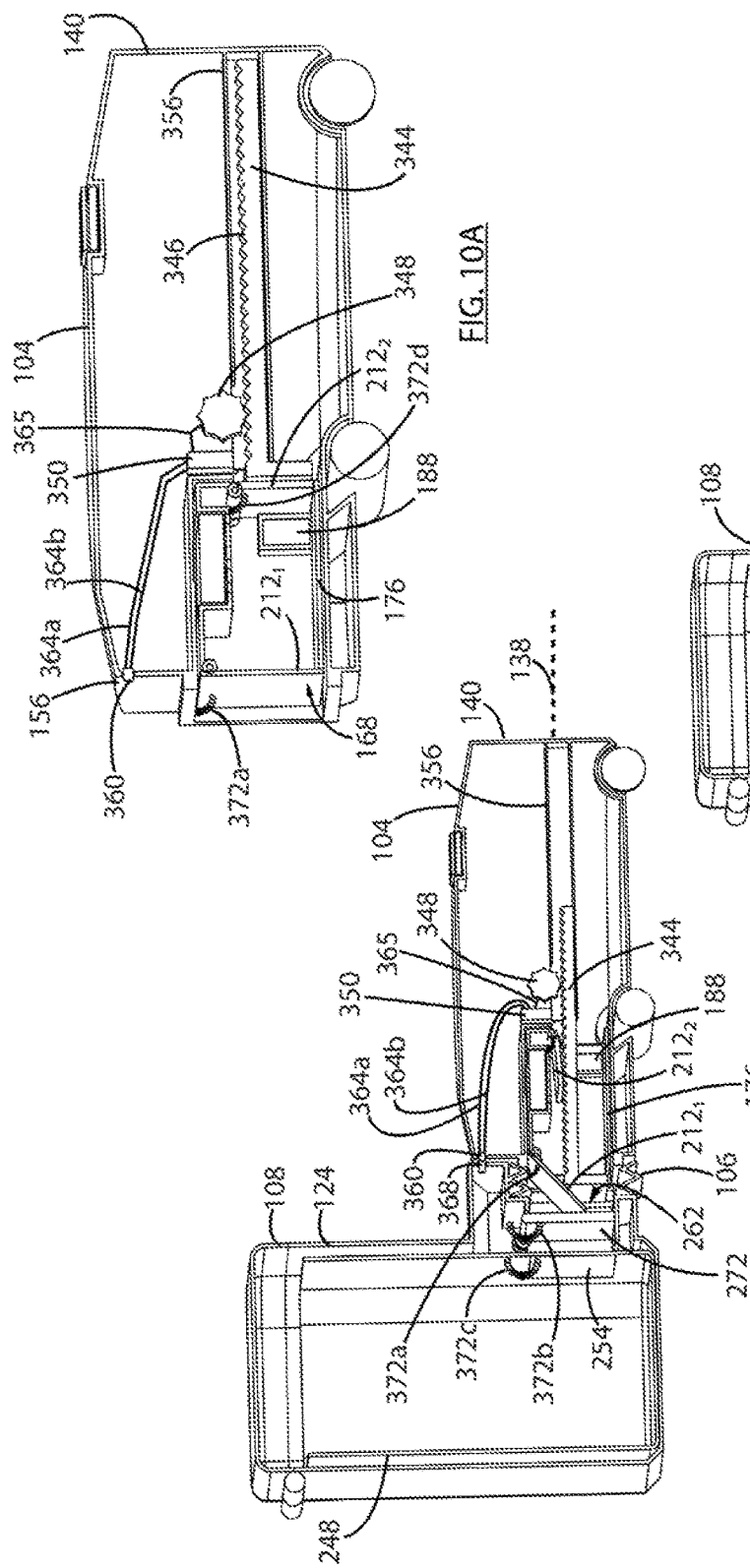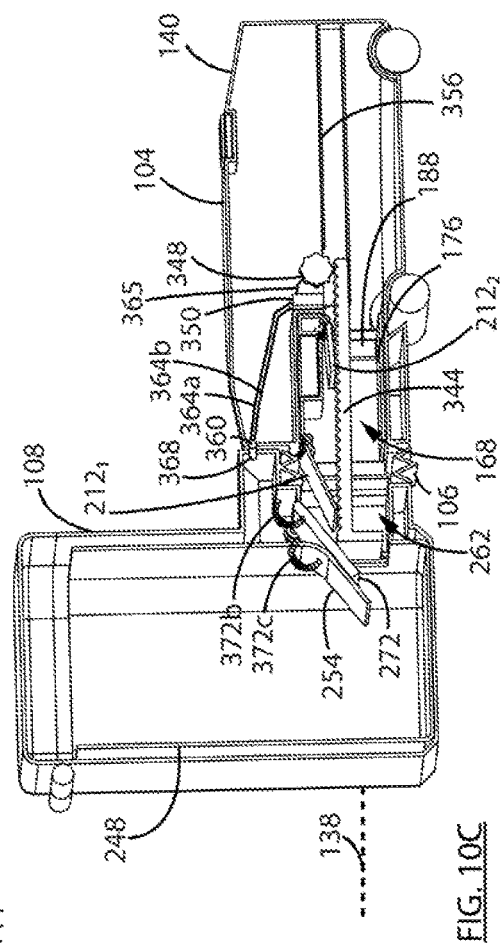

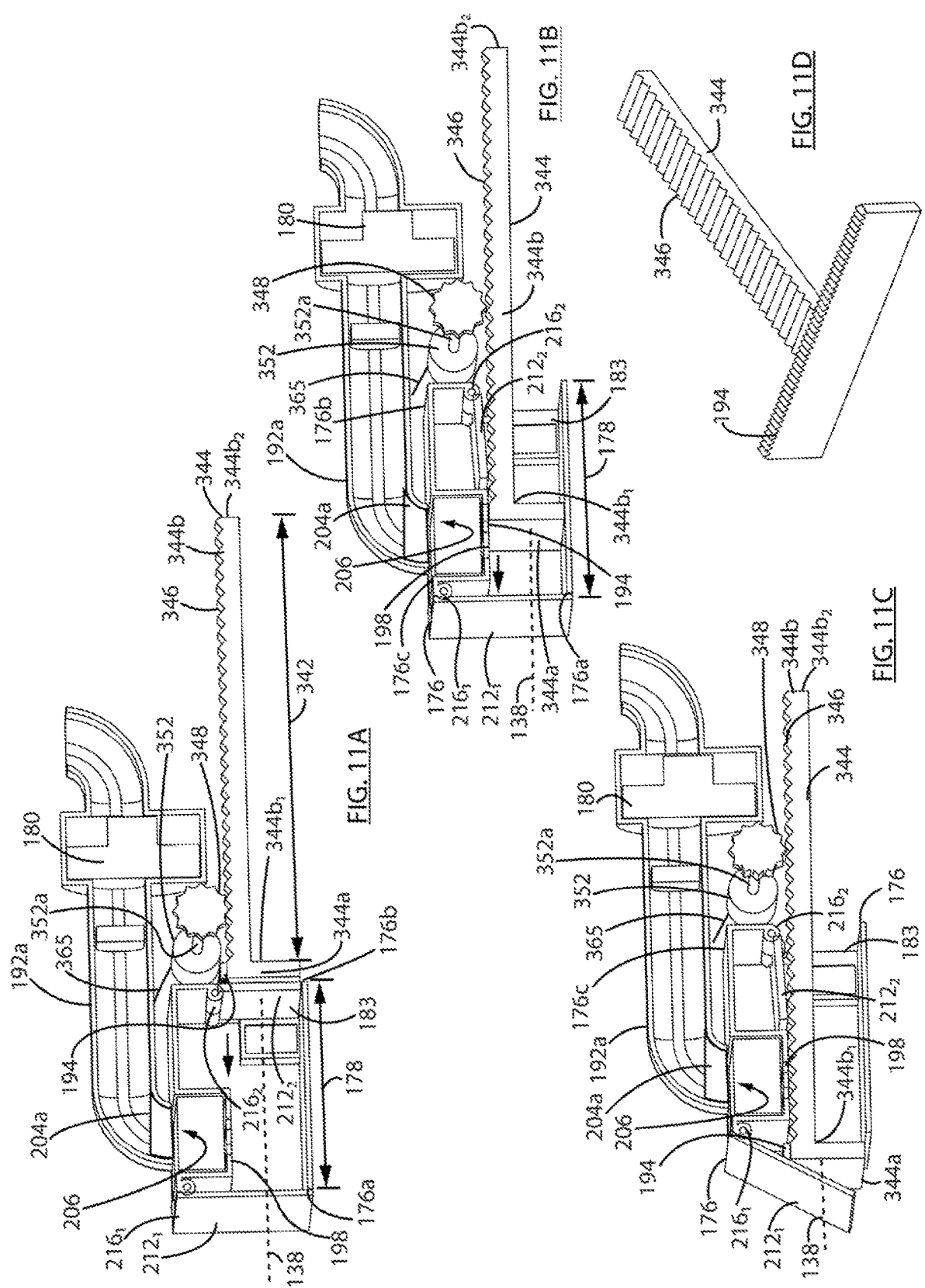

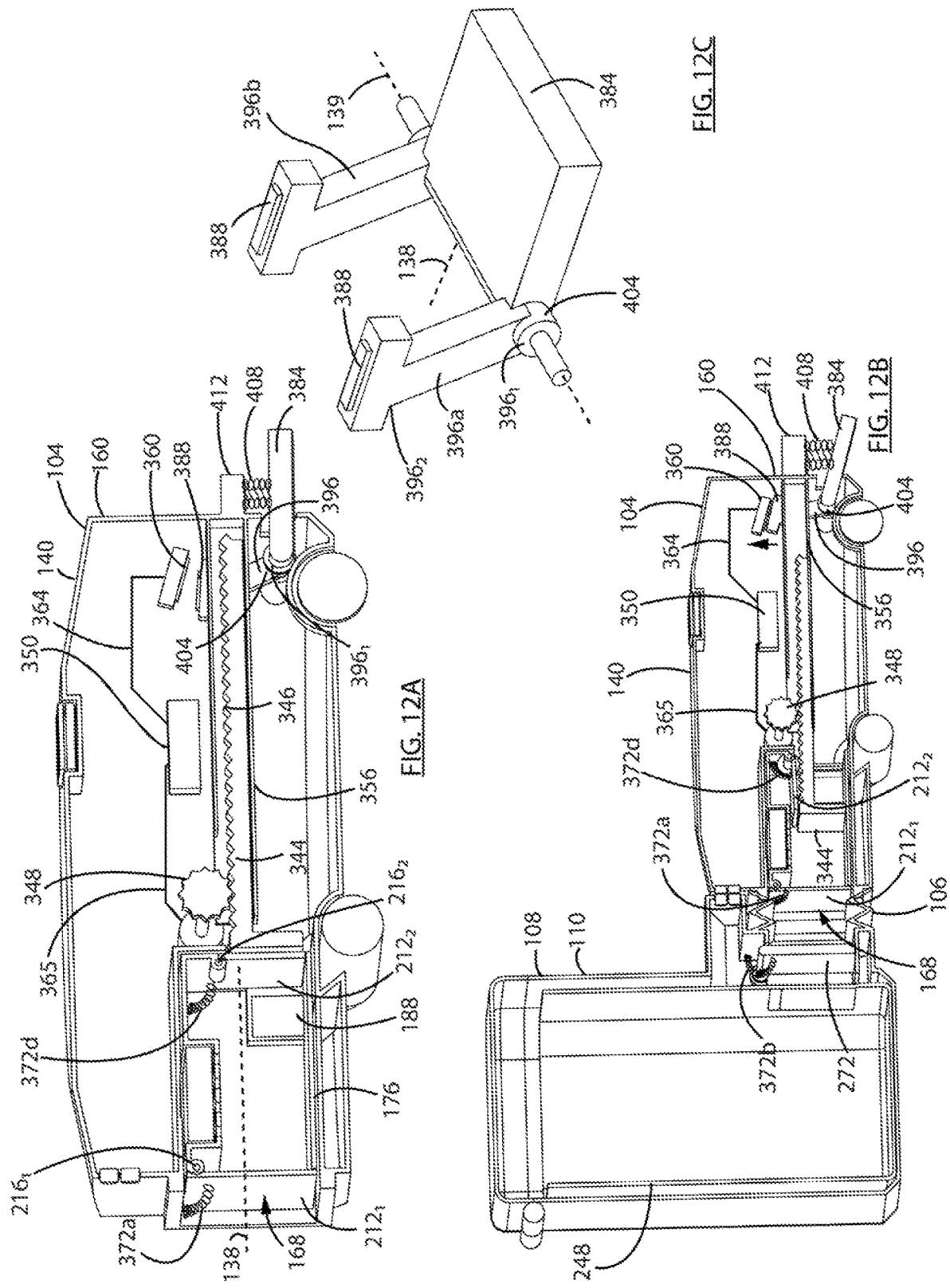

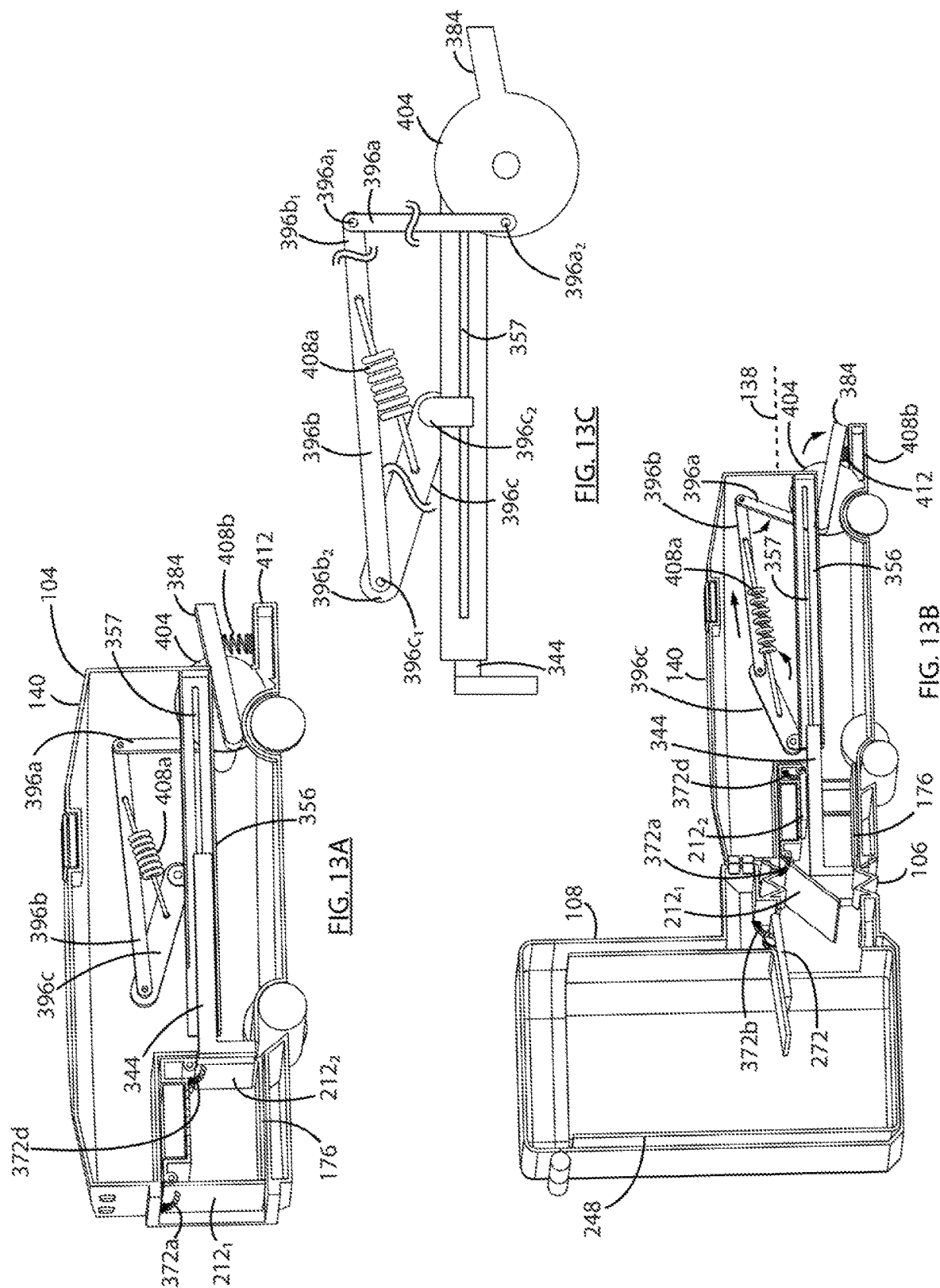

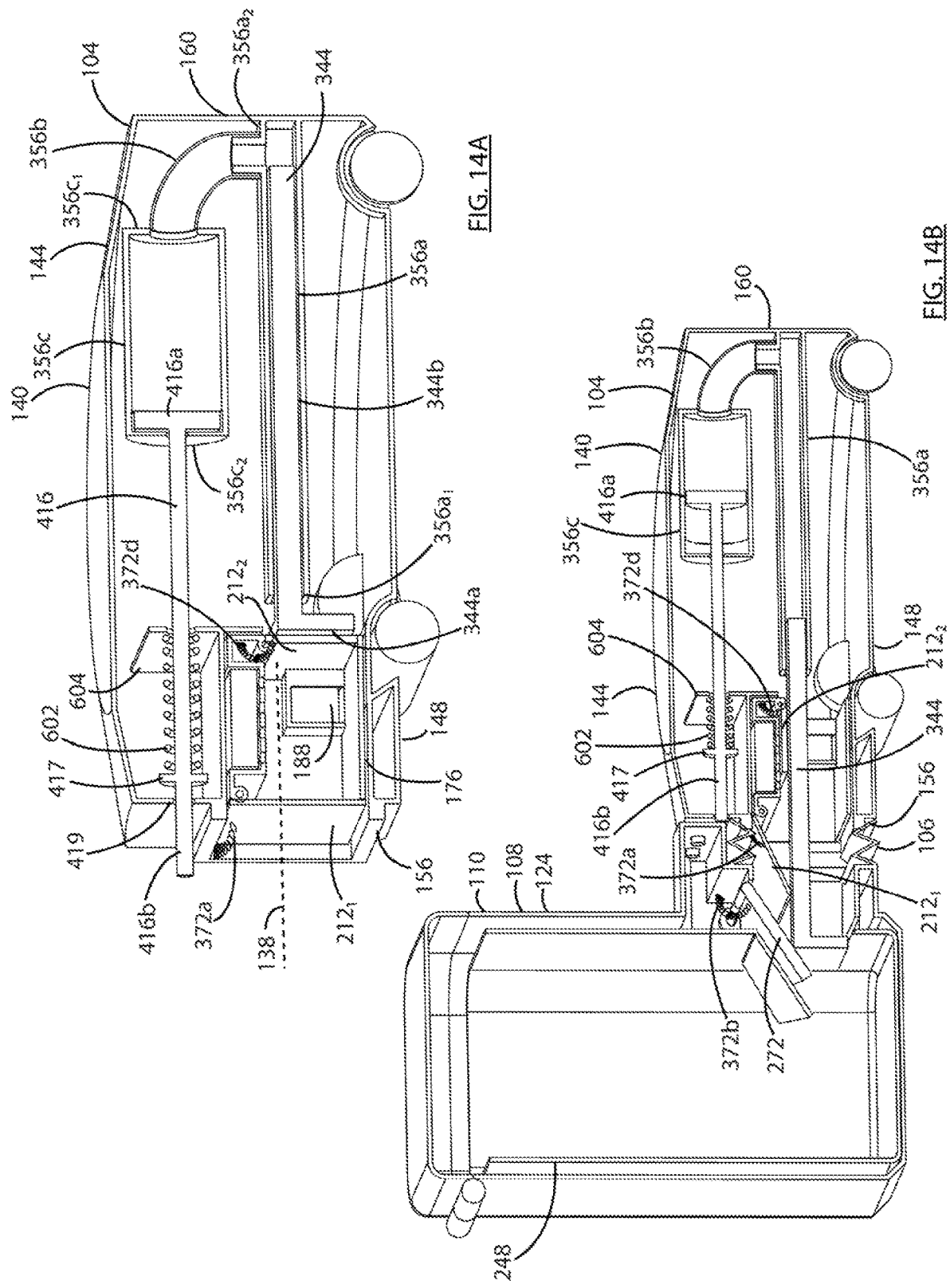

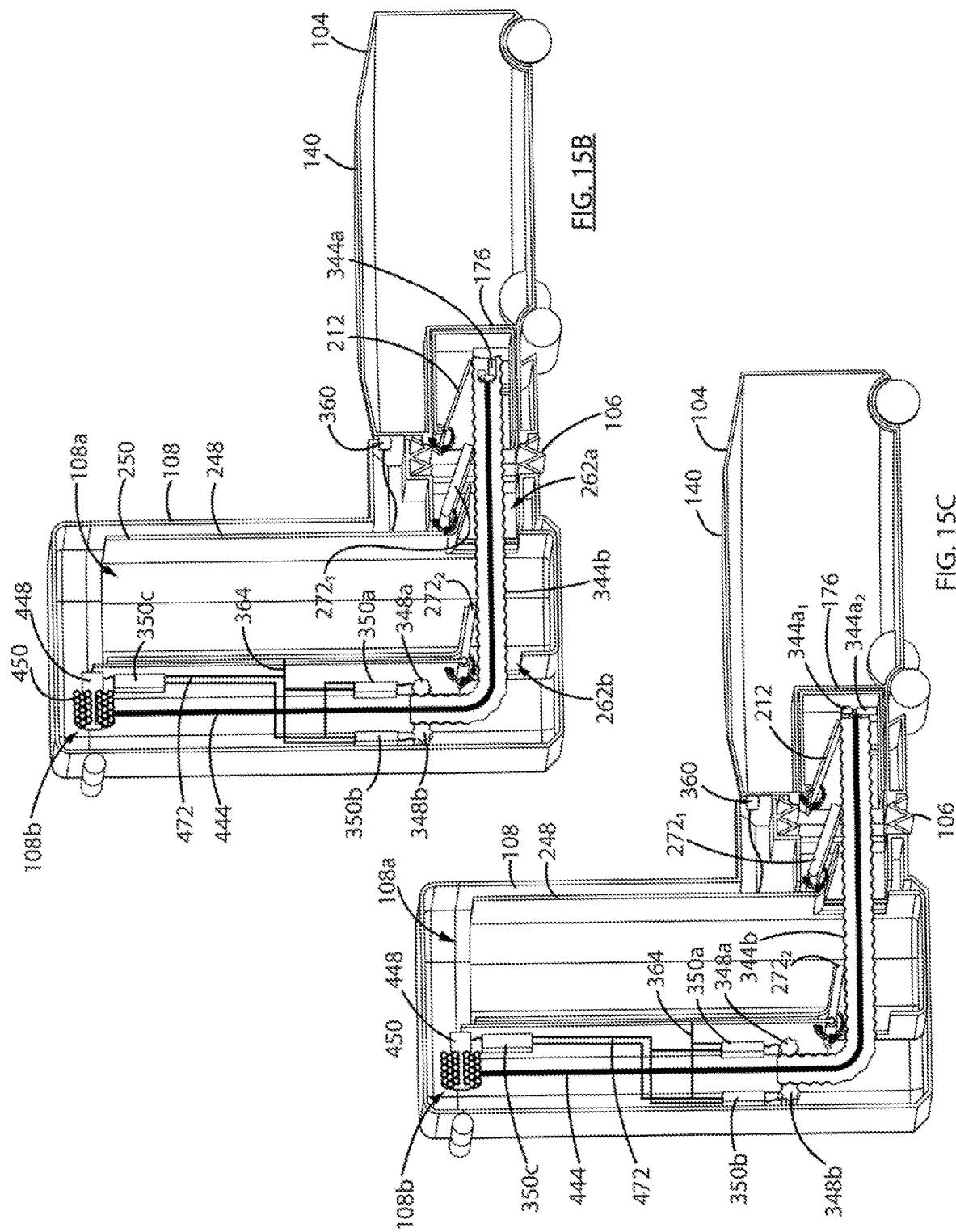

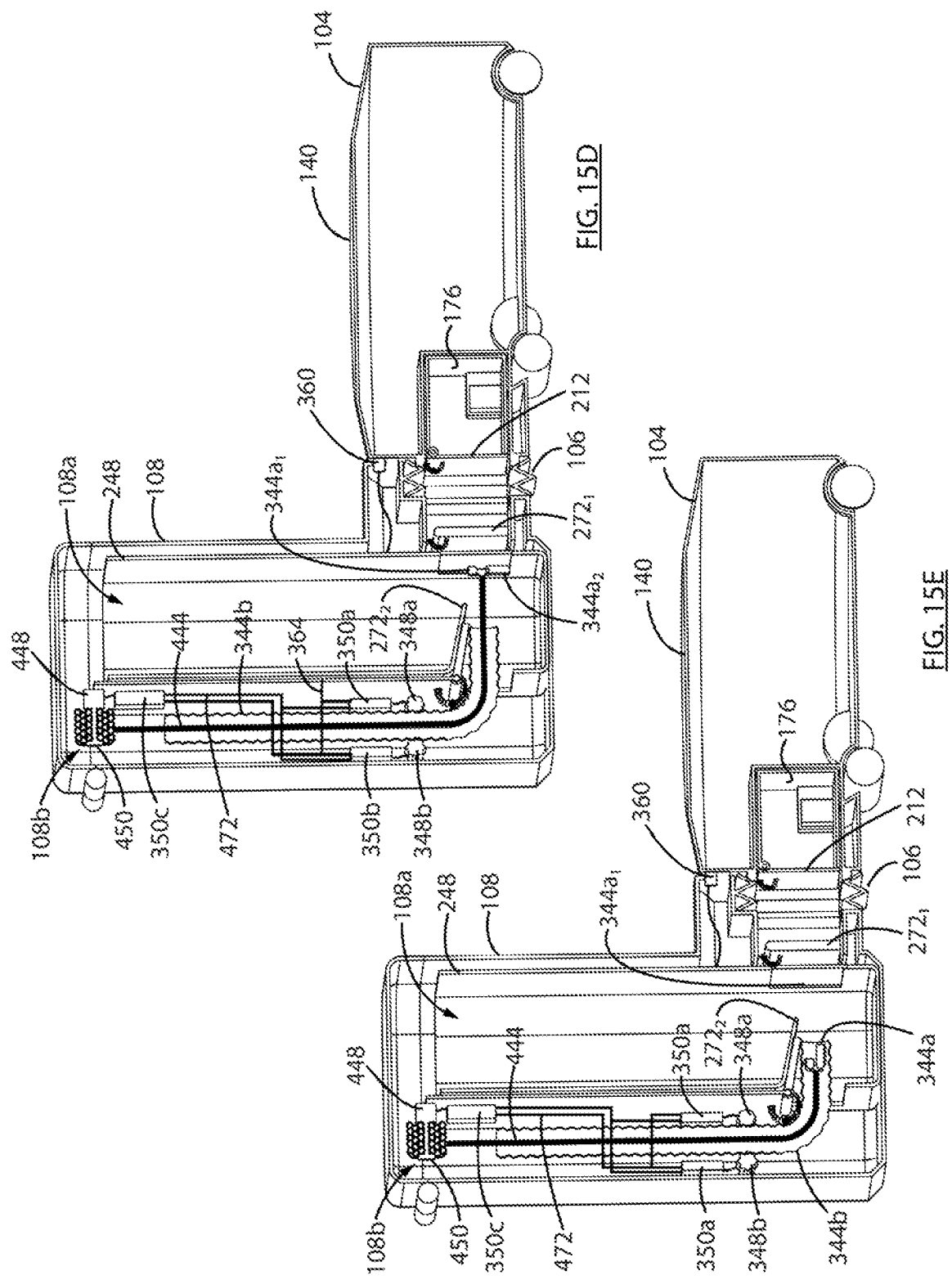

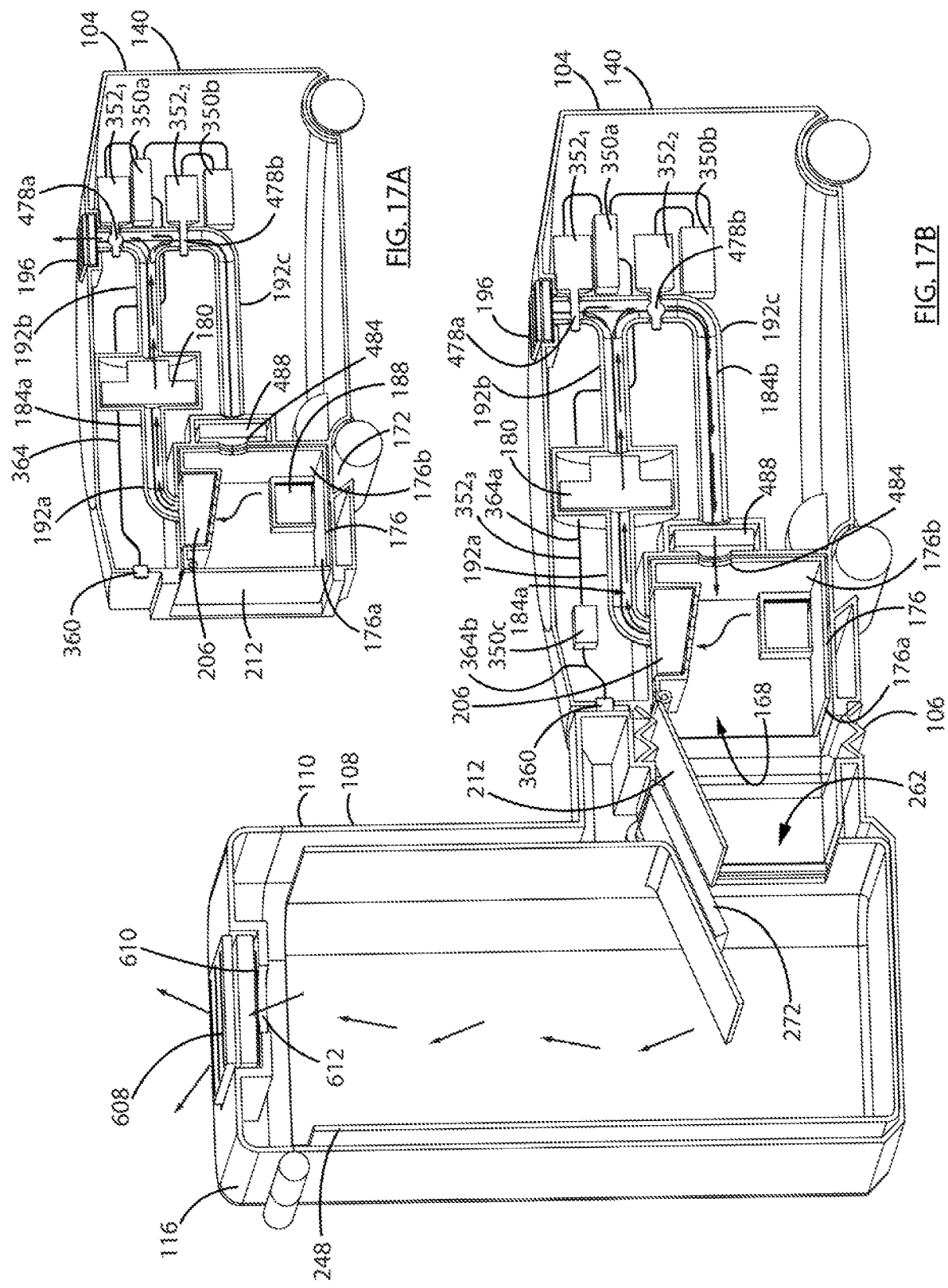

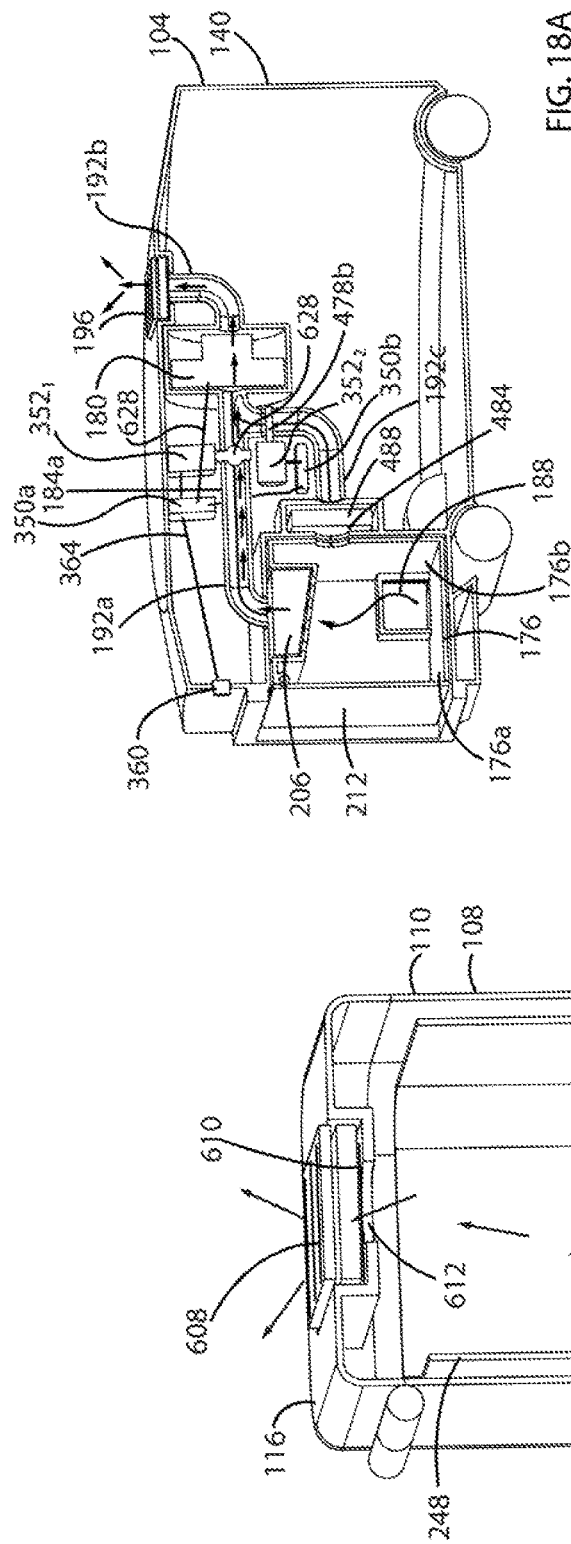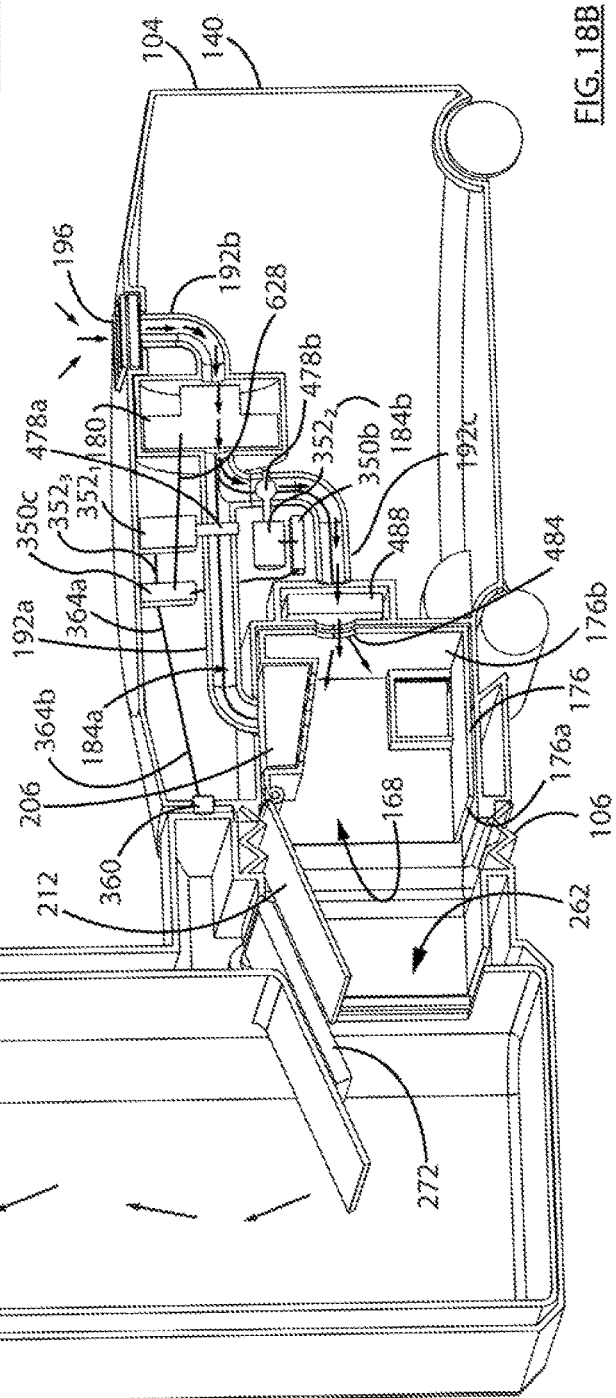

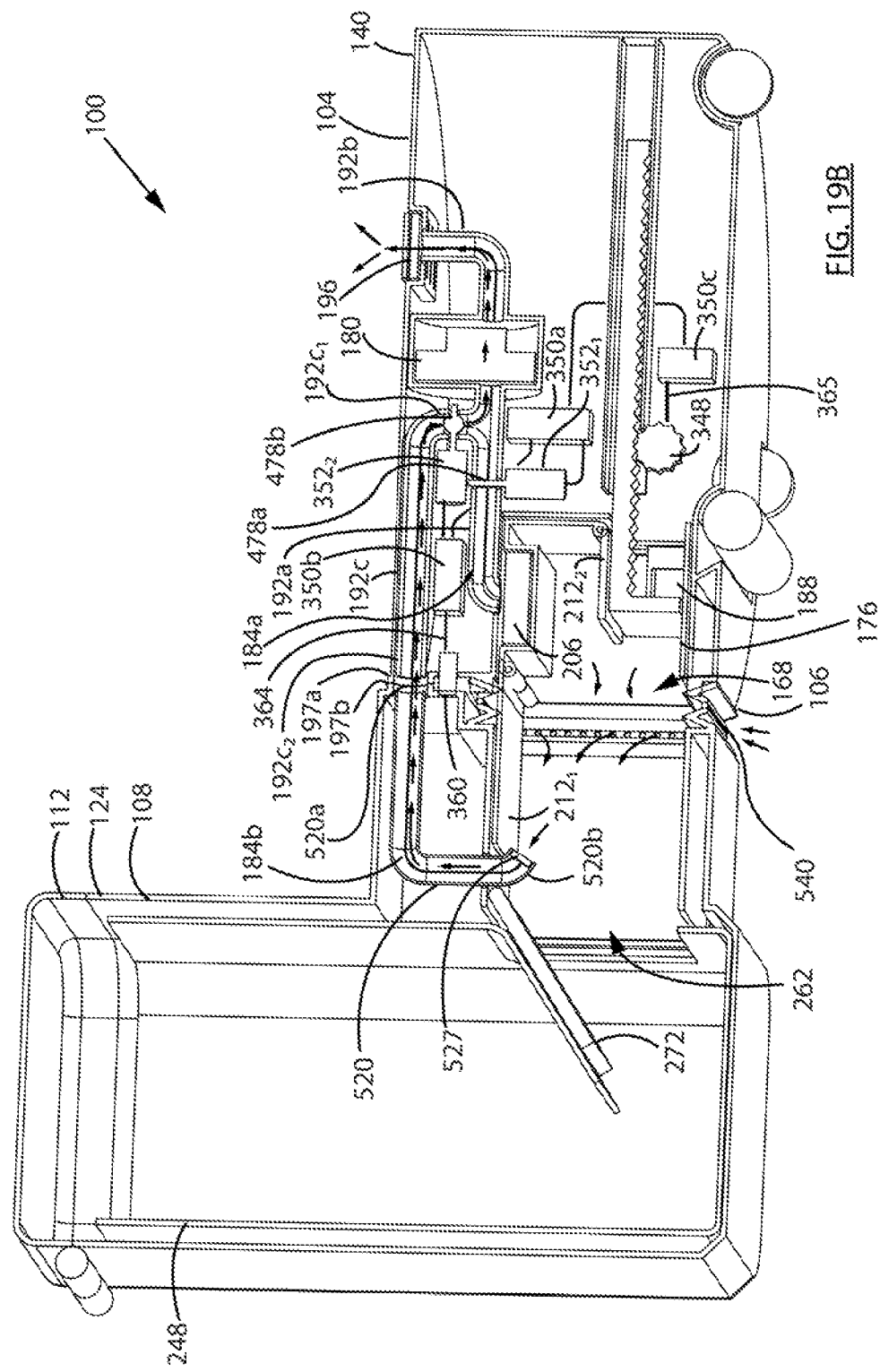

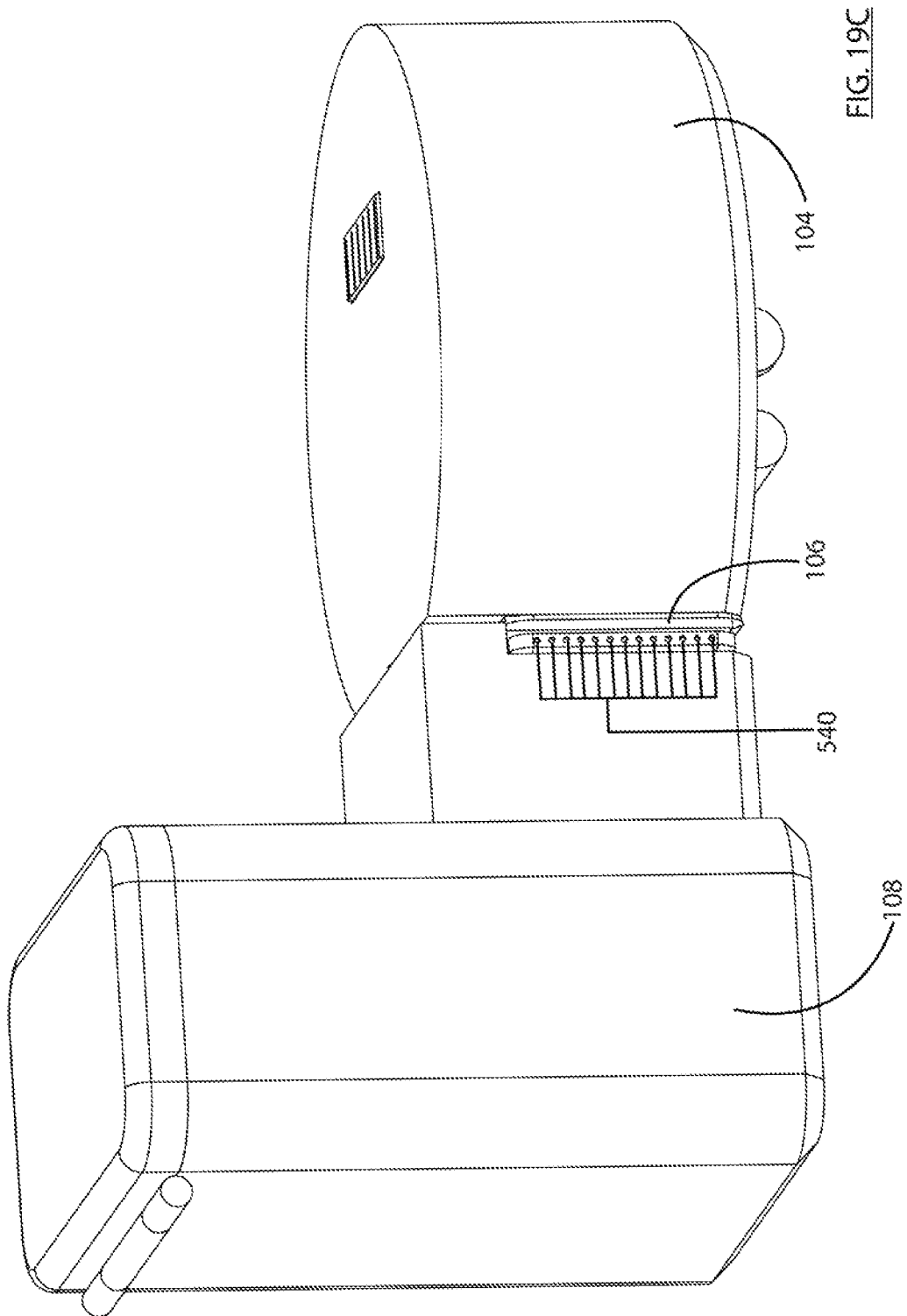

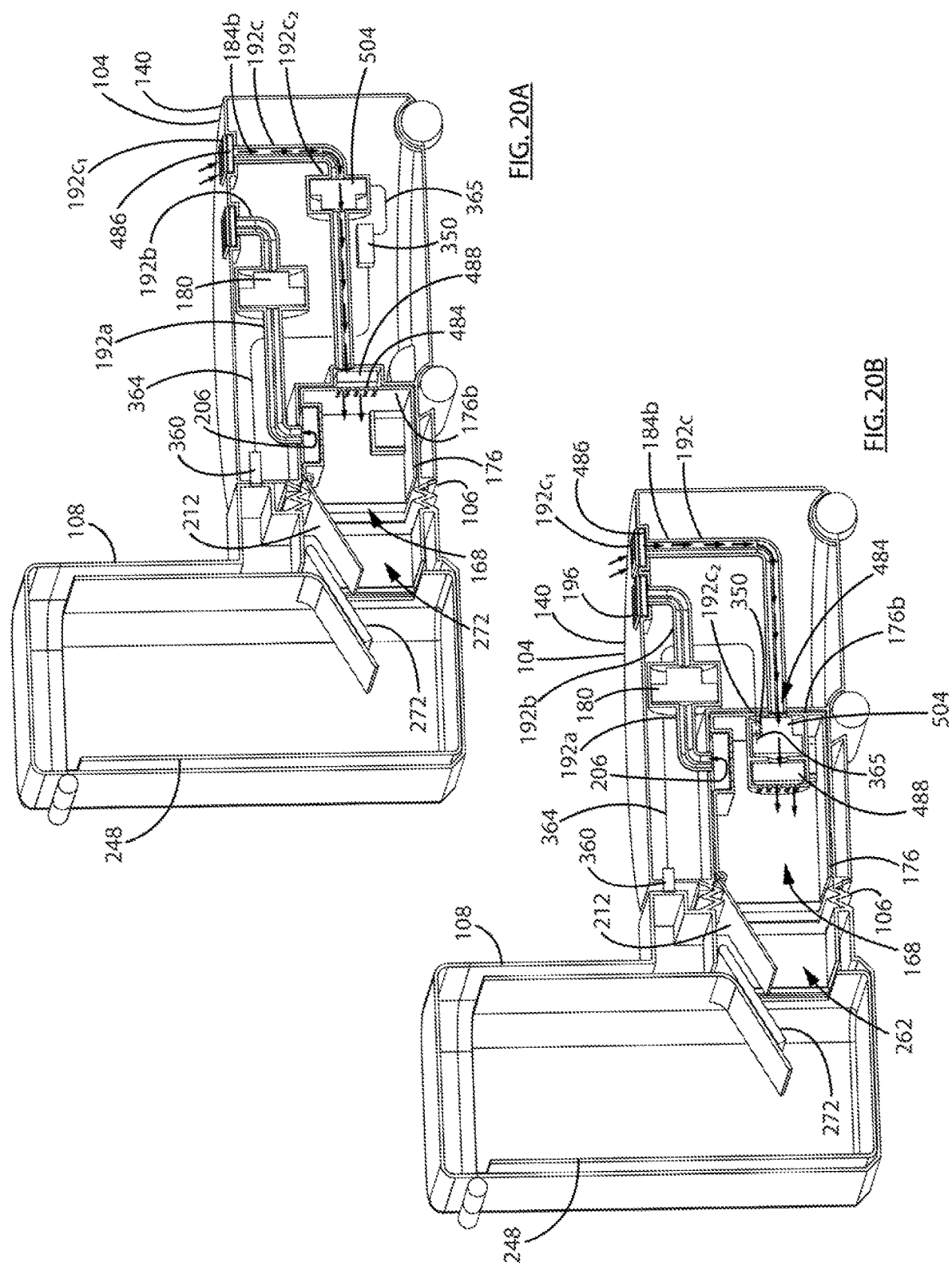

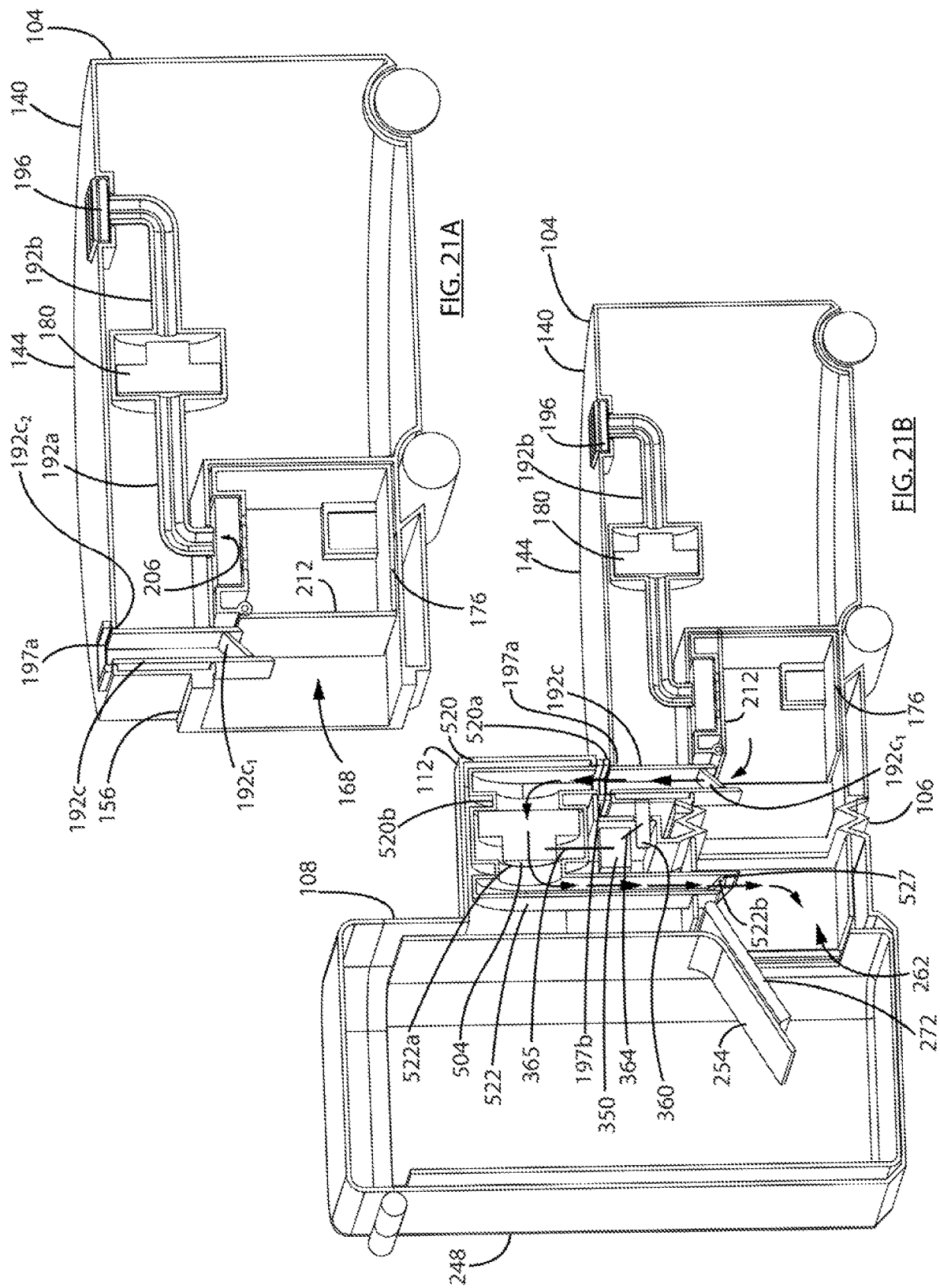

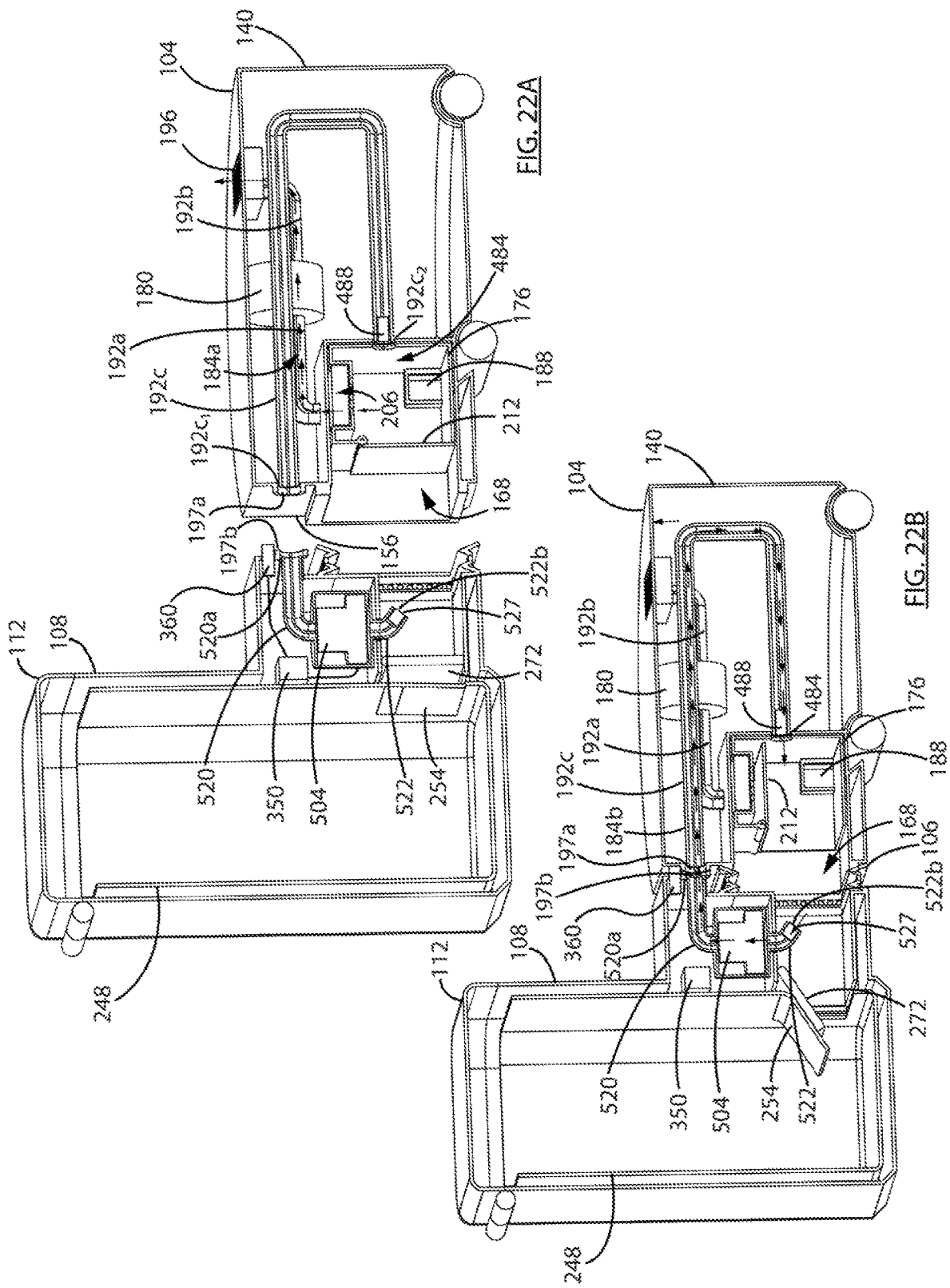

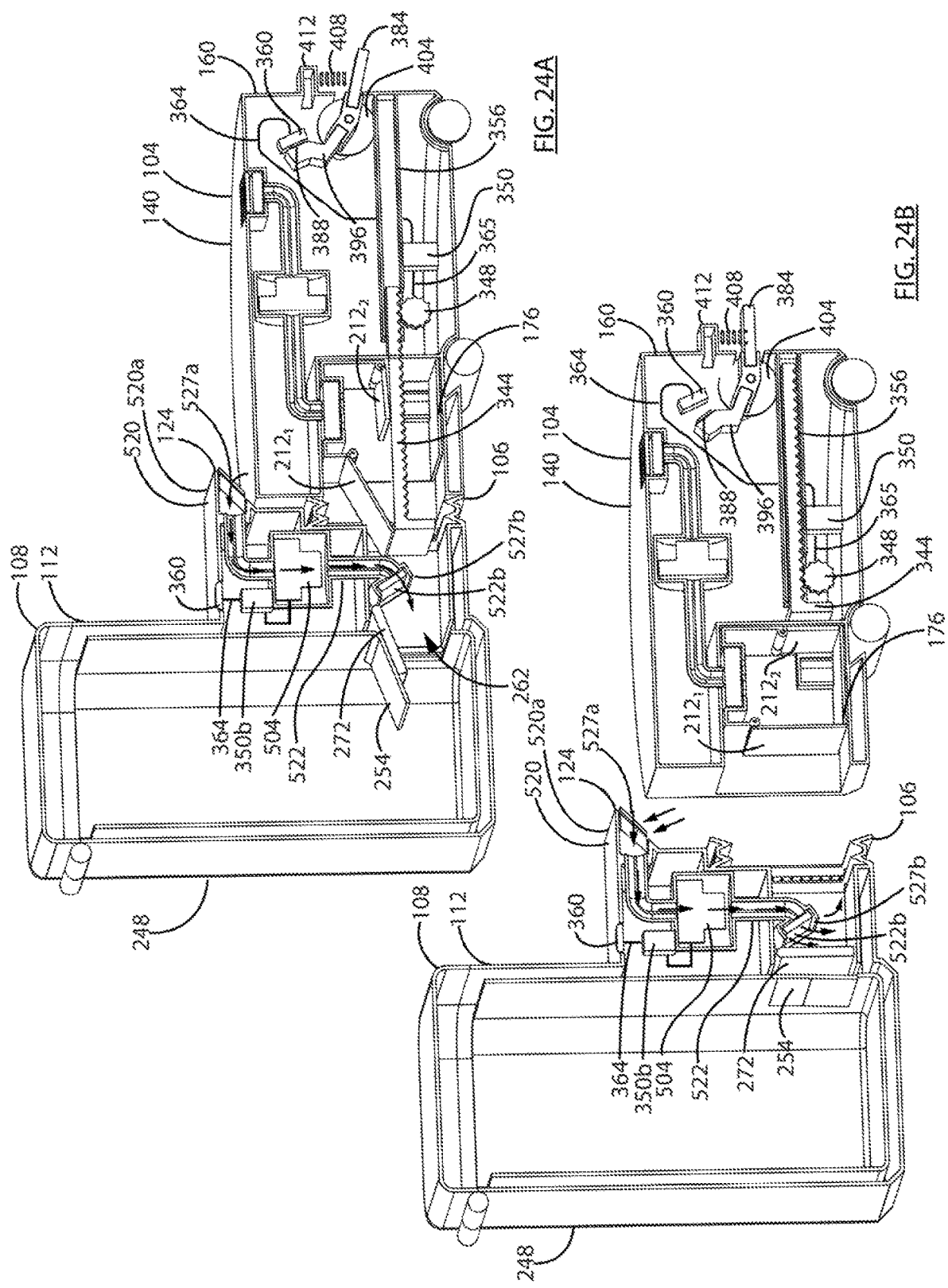

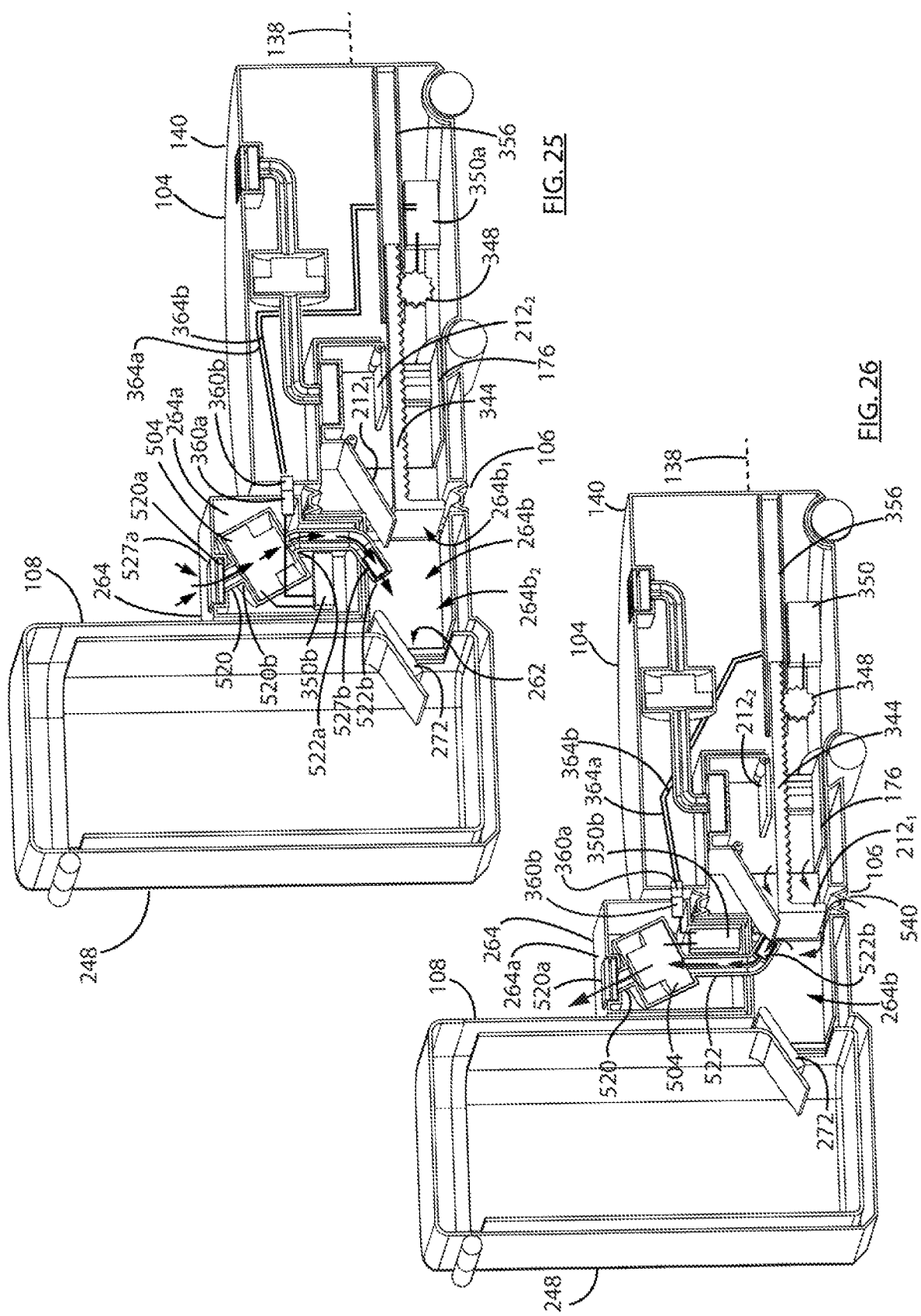

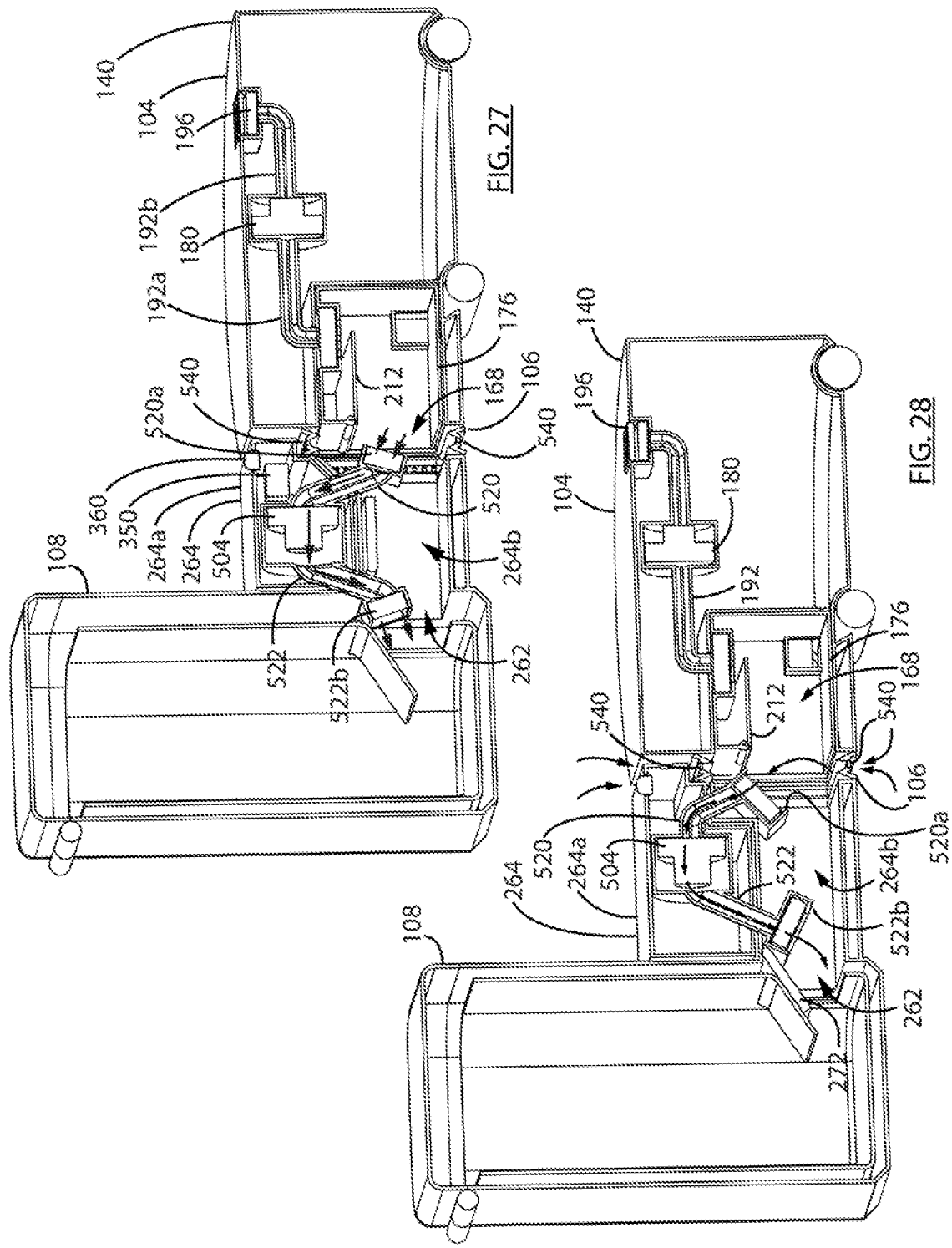

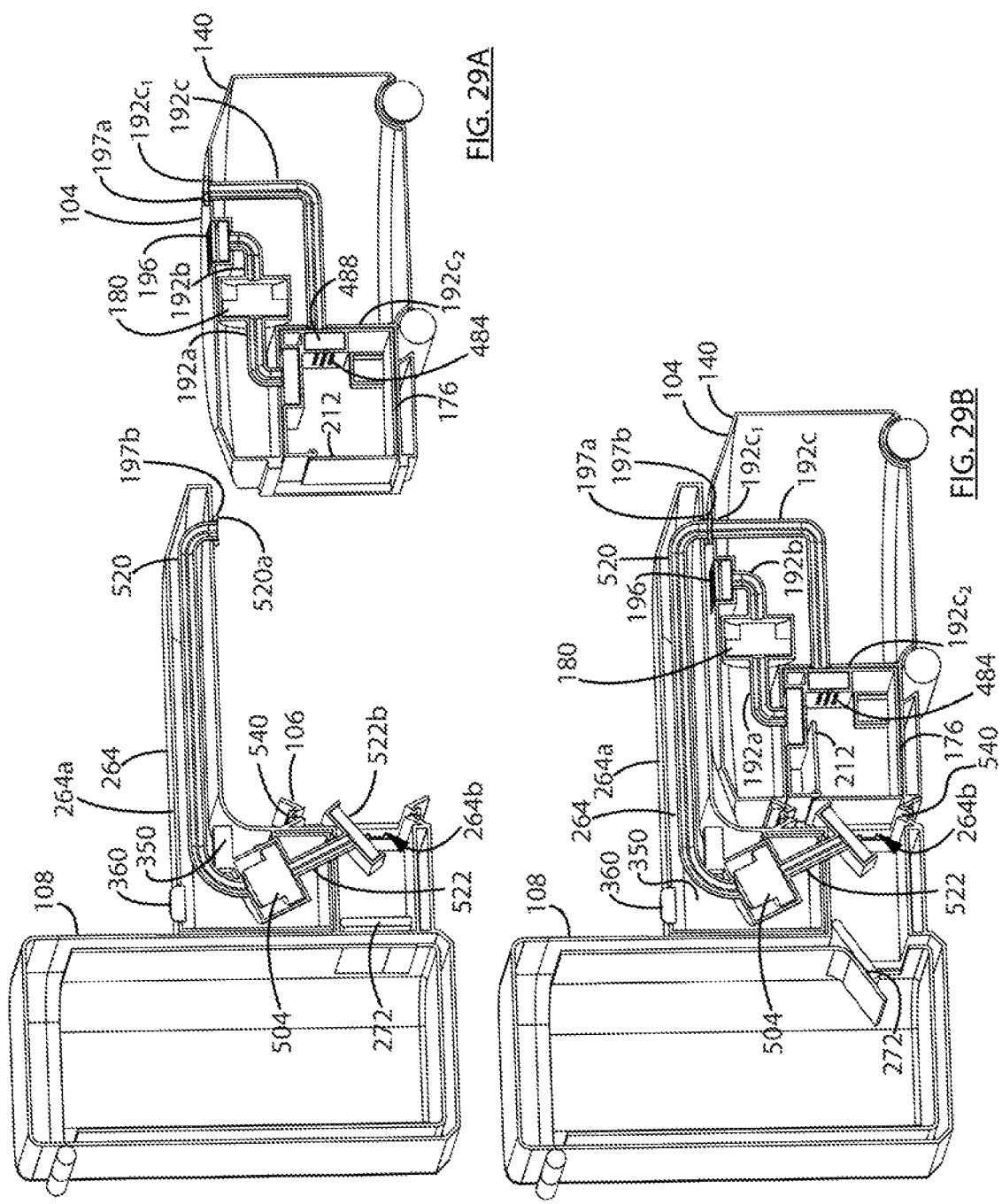

ROBOTIC VACUUM CLEANER AND DOCKING STATION FOR A ROBOTIC VACUUM CLEANER

CROSS-REFERENCE TO RELATED APPLICATIONS

This application claims the benefit of U.S. Patent Application No. 63/013,781, filed on Apr. 22, 2020, the entirety of which is incorporated herein by reference.

FIELD

This disclosure relates generally to robotic surface cleaning apparatus and docking stations that receive dirt collected by a robotic surface cleaning apparatus.

INTRODUCTION

Various types of robotic or autonomous surface cleaning apparatus are known. A robotic vacuum cleaner may have a docking station that charges the robotic vacuum cleaner when the robotic vacuum cleaner is connected or docked to the docking station. Also, a docking station may have a suction motor to draw dirt from a dirt storage chamber in a robotic vacuum cleaner and an air treatment member to remove entrained dirt from the air drawn into the docking station for the dirt storage chamber of a robotic vacuum cleaner.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect of this disclosure, which may be used by itself or with one or more of the other aspects disclosed herein, an autonomous surface cleaning apparatus may have a mechanical transfer member, which may be provided inside of the automated surface cleaning apparatus (which may also be referred to as a robotic surface cleaning apparatus, robotic vacuum cleaner, robot vac or the like), which is used to convey dirt that has been collected in the robotic surface cleaning apparatus to a docking station. The mechanical transfer member may comprise, for example, a ram for conveying dirt from an air treatment unit of the robotic surface cleaning apparatus into the docking station. The mechanical transfer member may be configurable between a floor cleaning position and one or more dirt emptying positions. In the floor cleaning position, the mechanical transfer member may be positioned at a first side and/or external to an air treatment unit of the robotic surface cleaning apparatus. As the mechanical transfer member is moved to the dirt emptying position, the mechanical transfer member may be moveable through at least a portion of the air treatment unit of the robotic surface cleaning apparatus such that dirt collected inside the air treatment unit is moved by the mechanical transfer member through at least a portion of the air treatment unit and towards the docking station. Optionally, the mechanical transfer member may move dirt out of a dirt outlet of the air treatment unit and/or into the docking station. An advantage of such a design is that the docking station need not have a suction motor or an air treatment member to filter dirt from the air drawn into the robotic docking station. It will be appreciated that such a mechanical transfer member may be used by itself (e.g., it may be the sole dirt transfer mechanism) or it may be used with any other mechanism disclosed herein or in use in the robotic docking station arts. For example, it may be used with a docking station that incorporates a suction fan to draw air through a dirt chamber of a robotic surface cleaning apparatus.

In accordance with this broad aspect, there is provided an autonomous surface cleaning apparatus comprising:
- (a) a primary air flow path extending from a dirty air inlet to a clean air outlet:
- (b) a primary suction motor positioned in the primary air flow path;
- (c) an air treatment unit positioned in the primary air flow path wherein, when the autonomous surface cleaning apparatus is positioned on a floor, the air treatment unit has an upper side, a lower side, a first end having a first side positioned between the upper and lower sides and a second end having a second side positioned between the upper and lower sides, the second side is spaced apart from the first side in a first direction; and,
- (d) a mechanical transfer member moveable in the first direction through at least a portion of the air treatment unit whereby dirt collected in the air treatment unit is moved in the first direction through the air treatment unit.

In some embodiment, the first direction may be generally horizontal.

In some embodiments, a dirt outlet may be provided at the second end.

In some embodiments, the mechanical transfer member may be moveable in the first direction from the first side to the second side.

In some embodiments, the autonomous surface cleaning apparatus may have a dirt outlet which communicates with a docking station when the autonomous surface cleaning apparatus is docked at the docking station and the autonomous surface cleaning apparatus is operable in a floor cleaning mode and a dirt emptying mode, in the floor cleaning mode the mechanical transfer member may be positioned at the first side and in the dirt emptying mode the mechanical transfer member may be moveable in the first direction from the first side to the second side and through the dirt outlet.

In some embodiments, the first side may have a mechanical transfer member inlet port and, in the floor cleaning mode, the mechanical transfer member may be positioned exterior to the air treatment unit.

In some embodiments, the mechanical transfer member may comprise a sweeping portion and a drive portion and, in the floor cleaning mode, the sweeping portion may be positioned interior to the air treatment unit and the drive portion may be positioned exterior to the air treatment unit.

In some embodiments, the air treatment unit may comprise an air treatment member and a dirt collection chamber external to the air treatment member and the mechanical transfer member may be moveable in the first direction through at least a portion of the dirt collection chamber.

In some embodiments, the air treatment unit may comprise an air treatment member having a dirt collection region internal of the air treatment member and the mechanical transfer member may be moveable in the first direction through at least a portion of the dirt collection region.

In some embodiments, the mechanical transfer member may be moveable along a lower surface of the dirt collection region.

In some embodiments, the mechanical transfer mechanism may comprise a member that is moveable through the air treatment unit, whereby the mechanical transfer mechanism pushes dirt through the air treatment unit towards a dirt outlet port of the air treatment unit.

In some embodiments, the mechanical transfer mechanism may be moveable through the air treatment unit and the dirt outlet port, whereby the mechanical transfer mechanism pushes dirt through the air treatment unit and out the outlet port of the air treatment unit.

In some embodiments, the autonomous surface cleaning apparatus may further comprise a disposable bag retaining member and wherein the autonomous surface cleaning apparatus is operable in a floor cleaning mode and a dirt emptying mode, and in the dirt emptying mode the mechanical transfer member may be moveable in the first direction whereby dirt is transferred into a disposable bag.

In some embodiments, the autonomous surface cleaning apparatus may further comprise a navigation system and the autonomous surface cleaning apparatus may be operable to deposit the disposable bag containing the dirt in a predetermined location.

In some embodiments, the location may be adjacent a garbage receptacle.

In some embodiments, the autonomous surface cleaning apparatus may further comprise a pneumatic dirt transfer mechanism.

In some embodiments, the pneumatic dirt transfer mechanism may comprise the primary suction motor.

In some embodiments, the autonomous surface cleaning apparatus may further comprise a secondary air flow path selectively connectable in fluid flow communication with the primary suction motor, the secondary air flow path may extend between a downstream end of the primary suction motor and a dirt collection region of the air treatment unit.

In some embodiments, the first side may comprise a first side of the dirt collection region, the second side may comprise a second side of the dirt collection region, the mechanical transfer member may be moveable in the first direction from the first side of the dirt collection region towards the second side of the dirt collection region and the secondary air flow path may extend between a downstream end of the primary suction motor the first side of the dirt collection.

In some embodiments, the autonomous surface cleaning apparatus may further comprise a secondary air flow path in fluid flow communication with the dirt bin and the pneumatic dirt transfer mechanism may comprise a secondary suction motor provided in the secondary air flow path.

In another broad aspect of this disclosure, which may be used by itself or with one or more of the other aspects disclosed herein, a mechanical transfer member may be provided inside of a robotic docking station and used to convey dirt that has been collected inside a robotic surface cleaning apparatus into the robotic docking station. The mechanical transfer member may be moveable between a storage position and one or more dirt emptying positions. In the storage position, the mechanical transfer member may be stored on or inside of the docking station. In the dirt emptying positions, the mechanical transfer member may moveable from the docking station, through a dirt outlet of an air treatment unit of the robotic surface cleaning apparatus, through at least a portion of the air treatment unit, and then reversed back into the docking station so as to drag (e.g., pull) collected dirt out of the robot air treatment unit into the docking station. Optionally, the docking station may include a dirt receptacle for aggregating dirt removed from the robotic air treatment unit. An advantage of this design is again that the docking station need not have a suction motor or an air treatment member to filter dirt from the air drawn into the robotic docking station. It will be appreciated that this aspect may be combined with any other dirt transfer mechanism provided herein. It will be appreciated that such a mechanical transfer member may be used by itself (e.g., it may be the sole dirt transfer mechanism) or it may be used with any other mechanism disclosed herein or in use in the robotic docking station arts. For example, it may be used with a docking station that incorporates a suction fan to draw air through a dirt chamber of a robotic surface cleaning apparatus.

In accordance with this broad aspect, there is provided an apparatus comprising a docking station and an autonomous surface cleaning apparatus wherein, the autonomous surface cleaning apparatus comprises:
  (a) a primary air flow patent extending from a dirty air inlet to a clean air outlet:
  (b) a primary suction motor positioned in the primary air flow path; and
  (c) an air treatment unit positioned in the primary air flow path, the air treatment unit comprising a dirt collection region;
  and wherein the docking station comprises a dirt receptacle and a mechanical dirt transfer mechanism operable to transfer dirt that has collected in the dirt collection region from the dirt collection region to the dirt receptacle.

In some embodiments, the autonomous surface cleaning apparatus may be positioned on a floor, the air treatment unit may have an upper side, a lower side, a first end having a first side positioned between the upper and lower sides and a second end having a second side positioned between the upper and lower sides, the second side is spaced apart from the first side in a first direction and, the mechanical transfer member may be moveable in the first direction through at least a portion of the air treatment unit whereby dirt collected in the air treatment unit is moved in the first direction through the air treatment unit.

In some embodiments, the autonomous surface cleaning apparatus may be positioned on a floor, the air treatment unit may have an upper side, a lower side, a first end having a first side positioned between the upper and lower sides and a second end having a second side positioned between the upper and lower sides, the second side is spaced apart from the first side in a first direction, the second side has a dirt outlet and, in a dirt emptying mode, the mechanical transfer member may be moveable through the dirt outlet towards the first side and then moveable in the first direction back through the dirt outlet.

In some embodiments, the mechanical transfer member may comprise a sweeping portion and a drive portion, the sweeping portion may be reconfigurable between an insertion position in which the sweeping portion is positioned above the lower side and a sweeping position in which the sweeping portion extends downwardly from the drive portion.

In some embodiments, the autonomous surface cleaning apparatus may have a robot bin door which closes the dirt outlet and the mechanical dirt transfer mechanism may open the robot bin door when the mechanical dirt transfer mechanism is actuated.

In some embodiments, the docking station may have an openable door which closes a dirt inlet of the dirt receptacle and the mechanical dirt transfer mechanism may open the openable door when the mechanical dirt transfer mechanism is actuated.

In some embodiments, the autonomous surface cleaning apparatus may have a robot bin door which closes the dirt outlet and the mechanical dirt transfer mechanism may open the robot bin door when the mechanical dirt transfer mechanism is actuated.

In some embodiments, the autonomous surface cleaning apparatus may have a robot bin door which closes the dirt outlet and the robot bin door may be opened when the autonomous surface cleaning apparatus docks at the docking station.

In some embodiments, the docking station may have an openable door which closes a dirt inlet of the dirt receptacle and the openable door may be opened when the autonomous surface cleaning apparatus docks at the docking station.

In some embodiments, the autonomous surface cleaning apparatus may have a robot bin door which closes the dirt outlet and the robot bin door may be opened when the autonomous surface cleaning apparatus docks at the docking station.

In some embodiments, the autonomous surface cleaning apparatus may have a robot bin door which closes the dirt outlet and the robot bin door may be opened when an emptying mode of the autonomous surface cleaning apparatus is actuated.

In some embodiments, the docking station may have an openable door which closes a dirt inlet of the dirt receptacle and the openable door may be opened when an emptying mode of the autonomous surface cleaning apparatus is actuated.

In some embodiments, the autonomous surface cleaning apparatus may have a robot bin door which closes the dirt outlet and the robot bin door may opened when an emptying mode of the autonomous surface cleaning apparatus is actuated.

In some embodiments, the apparatus may further comprise a pneumatic dirt transfer mechanism.

In some embodiments, the autonomous surface cleaning apparatus may have the pneumatic dirt transfer mechanism.

In some embodiments, the mechanical dirt transfer mechanism may be exterior to the dirt receptacle.

In accordance with another aspect, which may be used by itself or with one or more of the other aspects disclosed herein, a pneumatic dirt transfer mechanism may be provided inside of a robotic surface cleaning apparatus and operable in a dirt emptying mode to convey dirt that has been collected inside the robotic surface cleaning apparatus to a docking station. In some cases, the pneumatic dirt transfer mechanism may comprise the primary suction motor of the robotic surface cleaning apparatus. The suction motor may be operable between a floor cleaning mode and a dirt emptying mode. In the floor cleaning mode, the suction motor may be used to generate a suction air flow to facilitate cleaning and/or sweeping of dirt of a surface. The airflow generated by the suction motor may travel through a primary air flow path extending from a dirty air inlet of the robotic surface cleaning apparatus to a clean air outlet of the robotic surface cleaning apparatus. In the dirt emptying mode, the exhaust air flow, from the outlet of the suction motor of the robotic surface cleaning apparatus to the clean air outlet may be reconfigured, such as by a valve, to flow along a secondary air flow path to direct the exhaust air through part or all of the dirt storage chamber or dirt bin of the robotic surface cleaning apparatus and into the docking station.

Alternatively, or in addition, in the dirt emptying mode, the direction of rotation of an internal fan blade, of the suction motor, may be reversed such that the inlet of the suction motor becomes a suction motor air outlet. In this configuration, in the dirt emptying mode, air may be directed, such as via a secondary air flow path back through a dirt storage chamber or dirt bin of the robotic surface cleaning apparatus, and into the docking station.

Alternatively, or in addition, the pneumatic transfer mechanism can comprise a secondary suction motor provided with the robotic surface cleaning apparatus, which is separate from the primary suction motor of the robotic surface cleaning apparatus used in the floor cleaning mode. The secondary suction motor may be positioned in a secondary air flow path which extends between an air inlet and a dirt storage chamber or dirt bin of the robotic surface cleaning apparatus. The secondary suction motor may be operated in a dirt emptying mode to push collected dirt in a dirt storage chamber or dirt bin of the robotic vacuum cleaner into a docking station.

In any such embodiment, the primary suction motor of the robotic surface cleaning apparatus, and/or the secondary suction motor, as the case may be, may be operated at a different, e.g., reduced, power level when conveying or assisting in conveying dirt from the dirt storage chamber of a robotic surface cleaning apparatus into a docking station, during operation in the dirt emptying mode, compared to the power level of the primary suction motor when the robotic surface cleaning apparatus operates in a floor cleaning mode. An advantage of such a design is that the docking station need not have a suction motor.

It will be appreciated that such a pneumatic transfer member may be used by itself (e.g., it may be the sole dirt transfer mechanism) or it may be used with any other mechanism disclosed herein or in use in the robotic docking station arts. For example this aspect may be combined with mechanically conveying dirt from the dirt storage chamber of a robotic surface cleaning apparatus into a docking station and/or it may be used with a docking station that incorporates a suction fan to draw air through a dirt chamber of a robotic surface cleaning apparatus.

In accordance with this broad aspect, there is provided an autonomous surface cleaning apparatus comprising:
 (a) a primary air flow path extending from a dirty air inlet to a clean air outlet:
 (b) a primary suction motor positioned in the primary air flow path;
 (c) an air treatment unit positioned in the primary air flow path, the air treatment unit comprising a dirt collection region wherein, when the autonomous surface cleaning apparatus is positioned on a floor, the dirt collection region has an upper side, a lower side, a first end having a first side positioned between the upper and lower sides and a second end having a second side positioned between the upper and lower sides, the second side is spaced apart from the first side in a first direction, the first side has a dirt collection region air inlet port and the second side has a dirt outlet; and,
 (d) a pneumatic dirt transfer member is operable in a dirt emptying mode to produce an air flow which enters the dirt collection region through the dirt collection region air inlet port and whereby dirt collected in the dirt collection region is moved in the first direction through the dirt outlet.

In some embodiments, the pneumatic dirt transfer mechanism may comprise the primary suction motor.

In some embodiments, a secondary air flow path may be selectively connectable in fluid flow communication with the primary suction motor, the secondary air flow path may extend between a downstream end of the primary suction motor and the dirt collection region air inlet port.

In some embodiments, the autonomous surface cleaning apparatus may be operable in a floor cleaning mode and a dirt emptying mode, in the floor cleaning mode, air may travel through the primary air flow path and in the dirt emptying mode, the secondary air flow path may be connected in fluid flow communication with the primary suction motor and air may travel from the primary suction motor to the dirt collection region air inlet port and exit the dirt collection region through the dirt outlet.

In some embodiments, the dirt outlet which communicates with a docking station when the autonomous surface cleaning apparatus is docked at the docking station and in the dirt emptying mode, the air may travel from the primary suction motor to the dirt collection region air inlet port, through the dirt collection region, through the dirt outlet, through a dirt inlet of the docking station and out a clean air outlet of the docking station.

In some embodiments, the autonomous surface cleaning apparatus may be operable in a floor cleaning mode and a dirt emptying mode, in the floor cleaning mode air may travel through the primary air flow path and in the dirt emptying mode air may travel through the secondary air flow path, and the autonomous surface cleaning apparatus may further comprise a valve operable between a floor cleaning position in which the primary suction motor is in fluid flow communication with the clean air outlet and a dirt emptying position in which the primary suction motor is in fluid flow communication with the dirt collection region air inlet.

In some embodiments, the pneumatic dirt transfer mechanism may comprise a secondary suction motor provided in a secondary air flow path, wherein the autonomous surface cleaning apparatus may be operable in a floor cleaning mode and a dirt emptying mode, in the floor cleaning mode, air may travel through the primary air flow path and in the dirt emptying mode the secondary air flow path may be in fluid flow communication with the dirt collection region.

In some embodiments, the dirt collection region may have an air outlet and a portion of the primary air flow path may extend from the air outlet of the dirt collection region to the clean air outlet and, in the dirt emptying mode the portion of the primary air flow path may be closed.

In some embodiments, the dirt collection region may have a dirt inlet and a first portion of the primary air flow path may extend from the dirty air inlet to the dirt inlet of the dirt collection region and, in the dirt emptying mode the portion of the primary air flow path may be closed.

In some embodiments, the dirt collection region may have an air outlet and a second portion of the primary air flow path may extend from the air outlet of the dirt collection region to the clean air outlet and, in the dirt emptying mode the second portion of the primary air flow path may be closed.

In accordance with this broad aspect, there is also provided an autonomous surface cleaning apparatus comprising:
  (a) a primary air flow path extending from a dirty air inlet to a clean air outlet:
  (b) a primary suction motor positioned in the primary air flow path;
  (c) an air treatment unit positioned in the primary air flow path, the air treatment unit comprising a dirt collection region having a dirt inlet, a dirt collection region air inlet port and a dirt outlet; and,
  (d) a secondary air flow path extending from a secondary air flow path air inlet to the dirt outlet of the dirt collection region;
  (e) a secondary suction motor positioned in the secondary air flow path,
wherein the autonomous surface cleaning apparatus is operable in a floor cleaning mode and a dirt emptying mode, in the floor cleaning mode, air travels through the primary air flow path and in the dirt emptying mode the secondary air flow path is in fluid flow communication with the dirt collection region whereby air enters the dirt collection region through the dirt collection region air inlet and dirt collected in the dirt collection region is moved through the dirt outlet.

In some embodiments, the secondary suction motor may draw air through the dirt collection region air inlet into the dirt collection region and out the dirt outlet.

In some embodiments, the secondary suction motor may blow air through the dirt collection region air inlet into the dirt collection region and out the dirt outlet.

In some embodiments, the dirt collection region may have a primary air flow path air outlet and, in the floor cleaning mode, air may travel through a first portion of the primary air flow path extending from the dirty air inlet to the dirt inlet of the dirt collection region and through a second portion of the primary air flow path extending from the primary air flow path air outlet to the clean air outlet.

In some embodiments, in the dirt emptying mode, at least one of the first and second portions may be closed.

In some embodiments, in the dirt emptying mode, each of the first and second portions may be closed.

In some embodiments, in the floor cleaning mode, the secondary air flow path may be closed.

In accordance with this broad aspect, there is also provided, an autonomous surface cleaning apparatus comprising:
  (a) a primary air flow path extending from a dirty air inlet to a clean air outlet:
  (b) a suction motor positioned in the primary air flow path;
  (c) an air treatment unit positioned in the primary air flow path, the air treatment unit comprising a dirt collection region having a dirt inlet, a dirt collection region air inlet port and a dirt outlet; and,
  (d) a secondary air flow path extending from the suction motor to the dirt outlet of the dirt collection region;
wherein the autonomous surface cleaning apparatus is operable in a floor cleaning mode and a dirt emptying mode, in the floor cleaning mode, the suction motor drives a fan blade in a first direction of rotation and air travels through the primary air flow path and, in the dirt emptying mode, the suction motor drives a fan blade in a second direction of rotation whereby air enters the dirt collection region through the dirt collection region air inlet and dirt collected in the dirt collection region is moved through the dirt outlet.

In accordance with another aspect, which may be used by itself or with one or more of the other aspects disclosed herein, a pneumatic dirt transfer mechanism may be provided inside a robotic docking station and operable in a dirt emptying mode to direct air to the robotic surface cleaning apparatus to thereby convey dirt that has been collected inside the robotic surface cleaning apparatus to the docking station. The pneumatic dirt transfer mechanism may comprise a suction motor provided on or inside of the docking station and an air flow path extending between a downstream end of the docking station suction motor and the dirt collection region of the autonomous surface cleaning apparatus, when the autonomous cleaning apparatus is docked at the docking station. In a dirt emptying mode, the docking station suction motor may direct air into the autonomous surface cleaning apparatus so as to transfer dirt that has collected inside the dirt collection region to a dirt receptacle of the docking station. An advantage of such a design is that by providing the pneumatic dirt transfer mechanism inside the docking station, a dirt transfer mechanism is not required to be provided inside of the robotic vacuum cleaner. This, in turn, may simplify the design of the robotic vacuum cleaner. Further, directing air through the dirt chamber of a robotic surface cleaning apparatus may more completely empty the dirt chamber.

It will be appreciated that such a pneumatic transfer member may be used by itself (e.g., it may be the sole dirt transfer mechanism) or it may be used with any other mechanism disclosed herein or in use in the robotic docking station arts. For example, it may be used with a dirt transfer mechanism provided inside the robotic vacuum cleaner to provide more efficient dirt transfer between the robotic vacuum cleaner and the docking station. The pneumatic transfer mechanism may also be provided at a connection interface of the docking station.

In accordance with this broad aspect, there is provided an apparatus comprising a docking station having a dirt receptacle and an autonomous surface cleaning apparatus, wherein the autonomous surface cleaning apparatus comprises:
  (a) a primary air flow path extending from a dirty air inlet to a clean air outlet:
  (b) a primary suction motor positioned in the primary air flow path; and
  (c) an air treatment unit positioned in the primary air flow path, the air treatment unit comprising a dirt collection region;
wherein the apparatus comprises a pneumatic dirt transfer mechanism comprising a secondary air flow path and a secondary suction motor provided in the secondary air flow path, and
wherein the secondary air flow path extends between a downstream end of the secondary suction motor and the dirt collection region of the autonomous surface cleaning apparatus whereby in a dirt emptying mode the secondary suction motor directs air into the autonomous surface cleaning apparatus so as to transfer dirt that has collected in the dirt collection region from the dirt collection region to the dirt receptacle, and
wherein a portion of the pneumatic dirt transfer mechanism is provided in the docking station.

In some embodiments, the secondary suction motor may be provided in the docking station.

In some embodiments, the secondary suction motor may be provided in the autonomous surface cleaning apparatus.

In some embodiments, the docking station may have a secondary air flow path air outlet port and the autonomous surface cleaning apparatus may have a secondary air flow path air inlet port which mates with the secondary air flow path air outlet port of the docking station when the autonomous surface cleaning apparatus docks at the docking station.

In some embodiments, the secondary suction motor may draw from the dirt collection region.

In some embodiments, the secondary suction motor may blow into the dirt collection region.

In some embodiments, the autonomous surface cleaning apparatus may be positioned on a floor, the dirt collection region may have an upper side, a lower side, a first end having a first side positioned between the upper and lower sides and a second end having a second side positioned between the upper and lower sides, the second side is spaced apart from the first side in a first direction, the first side has a dirt collection region air inlet port and the second side has a dirt outlet and wherein, in the dirt emptying mode, the secondary suction motor may produce an air flow that enters the dirt collection region through the dirt collection region air inlet port and exits through the dirt outlet.

In some embodiments, the dirt collection region may have an air outlet and a portion of the primary air flow path my extend from the air outlet of the dirt collection region to the clean air outlet and, in the dirt emptying mode the portion of the primary air flow path may be closed.

In some embodiments, the dirt collection region may have a dirt inlet and a first portion of the primary air flow path may extend from the dirty air inlet to the dirt inlet of the dirt collection region and, in the dirt emptying mode the portion of the primary air flow path may be closed.

In some embodiments, the dirt collection region may have an air outlet and a second portion of the primary air flow path may extend from the air outlet of the dirt collection region to the clean air outlet and, in the dirt emptying mode the second portion of the primary air flow path may be closed.

In accordance with this broad aspect, there is also provided an apparatus comprising a docking station having a dirt receptacle and an autonomous surface cleaning apparatus, wherein the autonomous surface cleaning apparatus comprises:
  (a) a primary air flow path extending from a dirty air inlet to a clean air outlet:
  (b) a primary suction motor positioned in the primary air flow path; and
  (c) an air treatment unit positioned in the primary air flow path, the air treatment unit comprising a dirt collection region wherein, when the autonomous surface cleaning apparatus is positioned on a floor, the dirt collection region has an upper side, a lower side, a first end having a first side positioned between the upper and lower sides and a second end having a second side positioned between the upper and lower sides, the second side is spaced apart from the first side in a first direction, the first side has a dirt collection region air inlet port and the second side has a dirt outlet, and
wherein the apparatus comprises a pneumatic dirt transfer mechanism comprising a secondary air flow path, and the secondary air flow path comprises a portion that extends in a downstream direction from the docking station to the dirt collection region, and
wherein, in the dirt emptying mode, air travels through the secondary air flow path and enters the dirt collection region through the dirt collection region air inlet port and exits through the dirt outlet.

In some embodiments, the apparatus may further comprise a secondary suction motor.

In some embodiments, the secondary suction motor may be provided in the docking station.

In some embodiments, the dirt collection region may have an air outlet and a portion of the primary air flow path may extend from the air outlet of the dirt collection region to the clean air outlet and, in the dirt emptying mode the portion of the primary air flow path may be closed.

In some embodiments, the dirt collection region may have a dirt inlet and a first portion of the primary air flow path may extend from the dirty air inlet to the dirt inlet of the dirt collection region and, in the dirt emptying mode the portion of the primary air flow path may be closed.

In some embodiments, the dirt collection region may have an air outlet and a second portion of the primary air flow path may extend from the air outlet of the dirt collection region to the clean air outlet and, in the dirt emptying mode the second portion of the primary air flow path may be closed.

In accordance with this broad aspect, there is also provided an apparatus comprising a docking station having a dirt receptacle and an autonomous surface cleaning apparatus, wherein the autonomous surface cleaning apparatus comprises:

(a) a primary air flow path extending from a dirty air inlet to a clean air outlet:

(b) a suction motor positioned in the primary air flow path; and (c) an air treatment unit positioned in the primary air flow path, the air treatment unit comprising a dirt collection region, wherein the apparatus comprises a pneumatic dirt transfer mechanism comprising a secondary air flow path that comprises a first portion that extends between the dirt receptacle and the suction motor and a second portion that extends between the suction motor and the dirt collection region of the autonomous surface cleaning apparatus whereby in a dirt emptying mode the suction motor draws air from the dirt receptacle to the suction motor and directs air into the dirt collection region of the autonomous surface cleaning apparatus whereby dirt that has collected in the dirt collection region is transferred from the dirt collection region to the dirt receptacle.

In some embodiments, the dirt collection region may have an air outlet and a portion of the primary air flow path may extend from the air outlet of the dirt collection region to the clean air outlet and, in the dirt emptying mode the portion of the primary air flow path may be closed.

In some embodiments, the dirt collection region may have a dirt inlet and a first portion of the primary air flow path may extend from the dirty air inlet to the dirt inlet of the dirt collection region and, in the dirt emptying mode the portion of the primary air flow path may be closed.

In some embodiments, the dirt collection region may have an air outlet and a second portion of the primary air flow path may extend from the air outlet of the dirt collection region to the clean air outlet and, in the dirt emptying mode the second portion of the primary air flow path may be closed.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 4A is a simplified representation of the cross-sectional view of FIG. 3, according to some embodiments;

FIG. 4B is a simplified representation of the cross-sectional view of FIG. 3, and showing a dirt bin of the robotic vacuum cleaner removed from the robotic vacuum cleaner housing;

FIG. 4C is a perspective top-front view of the removable dirt bin of FIG. 4B;

FIG. 4D is a perspective rear-bottom view of the removable dirt bin of FIG. 4B;

FIG. 5A is a perspective view of a robotic vacuum cleaner docked at a docking station, and showing a top openable lid of the docking station in an opened position;

FIG. 5B is a perspective view of the robotic vacuum cleaner docked at a docking station, and showing a dirt receptacle being removed from the docking station;

FIG. 5C is a perspective view of the robotic vacuum cleaner docked at the docking station, in accordance with an alternate embodiment;

FIG. 6A is a side cross-sectional view of the robotic vacuum cleaner and docking station of FIG. 5C, taken along the section line 6-6' of FIG. 5C, and showing both the docking station door and the robotic vacuum cleaner dirt bin door in a closed position;

FIG. 6B is a side cross-sectional view of the robotic vacuum cleaner and docking station of FIG. 6A, and showing both the docking station door and the robotic vacuum cleaner dirt bin door in an open position;

FIG. 6C is a side cross-sectional view of an alternate embodiment of the robotic vacuum cleaner and docking station of FIG. 6A, taken along the section line 6-6' of FIG. 5C, showing the dirt receptacle door and the robotic vacuum cleaner dirt bin door in an open position;

FIG. 7A is a side cross-sectional view, taken along section line 7-7' of FIG. 5C, of the robotic vacuum cleaner un-docked from the docking station, and showing the robot dirt bin door and the docking station door in a closed position, in accordance with a further alternate embodiment;

FIG. 7B is a side cross-sectional view of the robotic vacuum cleaner docked at the docking station, and showing the robot dirt bin door and the docking station door in an open position;

FIG. 7C is a perspective view of the door opening mechanism for the robot dirt bin door of FIG. 7A;

FIG. 8A is a side cross-sectional view, taken along section line 7-7' of FIG. 5C, of the robotic vacuum cleaner docked at the docking station, and showing the robot dirt bin door and docking station door in an open position, in accordance with another embodiment;

FIG. 8B is a perspective view of the door opening mechanism for the robot dirt bin door of FIG. 8A;

FIG. 9A is a side cross-sectional view, taken along section line 7-7' of FIG. 5C, of the robotic vacuum cleaner docked at the docking station, and showing the robot dirt bin door and docking station door in an open position, in accordance with a further alternate embodiment;

FIG. 9B is a perspective view of the door opening mechanism for the robot dirt bin door of FIG. 9A;

FIG. 10A is a side cross-sectional view of the robotic vacuum cleaner, taken along sectional line 10-10' of FIG. 5C, and showing a mechanical dirt transfer mechanism in a floor cleaning or storage position, in accordance with a further alternate embodiment;

FIG. 10B is a side cross-sectional view of the robotic vacuum cleaner in FIG. 10A docked at a docking station, taken along sectional line 10-10' of FIG. 5C, and showing the mechanical dirt transfer mechanism in a dirt emptying position;

FIG. 10C is a side cross-sectional view of the robotic vacuum cleaner and docking station of FIG. 10B, and showing the mechanical dirt transfer mechanism in a further dirty emptying position;

FIG. 11A is a perspective view of a robot dirt bin in the robotic vacuum cleaner of FIG. 10A, and showing the mechanical dirt transfer mechanism in the storage or floor cleaning position, in accordance with a further alternate embodiment;

FIG. 11B is a perspective view of the robot dirt bin of FIG. 11A, and showing the mechanical dirt transfer mechanism in a dirt emptying position;

FIG. 11C is a perspective view of a robot dirt bin of FIG. 11A, and showing the mechanical dirt transfer mechanism in a further dirt emptying position;

FIG. 11D is a perspective view of an example mechanical transfer member;

FIG. 12A is a side cross-sectional view of the robotic vacuum cleaner, taken along sectional line 10-10' of FIG. 5C, and showing the mechanical dirt transfer mechanism in a storage or floor cleaning position, in accordance with a further alternate embodiment;

FIG. 12B is a side cross-sectional view of the robotic vacuum cleaner of FIG. 12A, docked at a docking station, and showing the mechanical dirt transfer mechanism in a dirt emptying position;

FIG. 12C is a perspective view of a mechanical actuation mechanism used in the robotic vacuum cleaner of FIGS. 12A and 12B;

FIG. 13A is a side cross-sectional view of the robotic vacuum cleaner, taken along sectional line 10-10' of FIG. 5C, and showing a mechanical dirt transfer mechanism in a storage or floor cleaning position, in accordance with a further alternate embodiment;

FIG. 13B is a side cross-sectional view of the robotic vacuum cleaner of FIG. 13A, docked at a docking station, and showing the mechanical dirt transfer mechanism in dirt emptying position;

FIG. 13C is a perspective view of a mechanical actuation mechanism used in the robotic vacuum cleaner of FIGS. 13A and 13B;

FIG. 14A is a side cross-sectional view of the robotic vacuum cleaner, taken along sectional line 10-10' of FIG. 5C, and showing a mechanical dirt transfer mechanism in a storage or floor cleaning position, in accordance with a further alternate embodiment;

FIG. 14B is a side cross-sectional view of the robotic vacuum cleaner of FIG. 14A, docked at a docking station, and showing the mechanical dirt transfer mechanism in a dirt emptying position;

FIG. 15B illustrates the side cross-sectional view of FIG. 15A, and showing the mechanical dirt transfer mechanism in a dirt emptying position;

FIG. 15C illustrates the side cross-sectional view of FIG. 15A, and showing the mechanical dirt transfer mechanism in a further dirt emptied position;

FIG. 15D illustrates the side cross-sectional view of FIG. 15A, and showing the mechanical dirt transfer mechanism in a partially retracted dirt emptying position;

FIG. 15E illustrates the side cross-sectional view of FIG. 15A, and showing the mechanical dirt transfer mechanism in a further retracted dirt emptying position;

FIG. 17A is a side cross-sectional view of an alternate embodiment of a robotic vacuum cleaner, taken along sectional line 10-10' of FIG. 5C, and showing a suction motor in a floor cleaning mode;

FIG. 17B is a side cross-sectional view, taken along sectional line 10-10' of FIG. 5C, of the robotic vacuum cleaner of FIG. 17A, docked at a docking station, and showing the suction motor in a dirt emptying mode;

FIG. 18A is a side cross-sectional view of a robotic vacuum cleaner, taken along sectional line 10-10' of FIG. 5C, showing a suction motor of the robotic vacuum cleaner operating in a floor cleaning mode, in accordance with an alternate embodiment;

FIG. 18B is a side cross-sectional view of the robotic vacuum cleaner of FIG. 18A, docked at a docking station, and showing the suction motor operating in a dirt emptying mode;

FIG. 19B is a side cross-sectional view of a robotic vacuum cleaner of FIG. 19A, docked at a docking station, taken along sectional line 10-10' of FIG. 5C, and showing the suction motor operating in a dirt emptying mode;

FIG. 19C is a top-side perspective view of the robotic vacuum cleaner and docking station of FIG. 19B;

FIG. 20A is a side cross-sectional view of a robotic vacuum cleaner docked at a docking station, taken along sectional line 10-10' of FIG. 5C, and showing a secondary suction motor located inside of the robotic vacuum cleaner and being operated in a dirt emptying mode, in accordance with a further alternate embodiment;

FIG. 20B is a side cross-sectional view of a robotic vacuum cleaner docked at a docking station, taken along sectional line 10-10' of FIG. 5C, and showing a secondary suction motor located inside of the robotic vacuum cleaner and being operated in a dirt emptying mode, in accordance with a further alternate embodiment;

FIG. 21A is a side cross-sectional view of a robotic vacuum cleaner, taken along sectional line 10-10' of FIG. 5C, in accordance with a further alternate embodiment;

FIG. 21B is a side cross-sectional view of the robotic vacuum cleaner of FIG. 21A, docked at a docking station, and showing a suction motor provided inside the docking station being operated in a dirt emptying mode;

FIG. 22A is a side cross-sectional view of an un-docked robotic vacuum cleaner and docking station, taken along sectional line 10-10' of FIG. 5C, and showing the robotic vacuum cleaner being operated in a floor cleaning mode, according to a further alternate embodiment;

FIG. 22B is a side cross-sectional view of the robotic vacuum cleaner and docking station of FIG. 22A, and showing the robotic vacuum cleaner docked at the docking station, and a suction motor provided inside the docking station being operated in a dirt emptying mode;

FIG. 24A is a side cross-sectional view of a robotic vacuum cleaner docked at a docking station, taken along sectional line 10-10' of FIG. 5C, and showing a suction motor provided inside of a connection interface and being operated in a dirt emptying mode, according to a further alternate embodiment;

FIG. 24B is a side cross-sectional view of the robotic vacuum cleaner and docking station of FIG. 24A, and showing the robotic vacuum cleaner un-docking from the docking station and the suction motor provided inside of the connection interface being operated in a dust absorption mode;

FIG. 25 is a side cross-sectional view of a robotic vacuum cleaner docked at a docking station, taken along sectional line 10-10' of FIG. 5C, and showing a suction motor provided inside of a connection interface being operated in a dirt emptying mode, according to a further alternate embodiment;

FIG. 26 is a side cross-sectional view of a robotic vacuum cleaner docked at a docking station, taken along sectional line 10-10' of FIG. 5C, and showing a suction motor provided inside of a connection interface being operated in a dirt emptying mode, according to a further alternate embodiment;

FIG. 27 is a side cross-sectional view of a robotic vacuum cleaner docked at a docking station, taken along sectional line 10-10' of FIG. 5C, and showing a suction motor provided inside of a connection interface being operated in a dirt emptying mode, according to a further alternate embodiment;

FIG. 28 is a side cross-sectional view of a robotic vacuum cleaner docked at a docking station, taken along sectional line 10-10' of FIG. 5C, and showing a suction motor provided inside of a connection interface being operated in a dirt emptying mode, according to a further alternate embodiment;

FIG. 29A is a side cross-sectional view of a robotic vacuum cleaner and docking station, taken along sectional line 10-10' of FIG. 5C, showing the robotic vacuum cleaner un-docked from the docking station and operating in a floor cleaning mode, according to a further alternate embodiment; and, FIG. 29B is a side cross-sectional view of the robotic vacuum cleaner and docking station of FIG. 29A, and showing the robotic vacuum cleaner docked at the docking station and a suction motor provided inside of a connection interface being operated in a dirt emptying mode.

Figure 1:
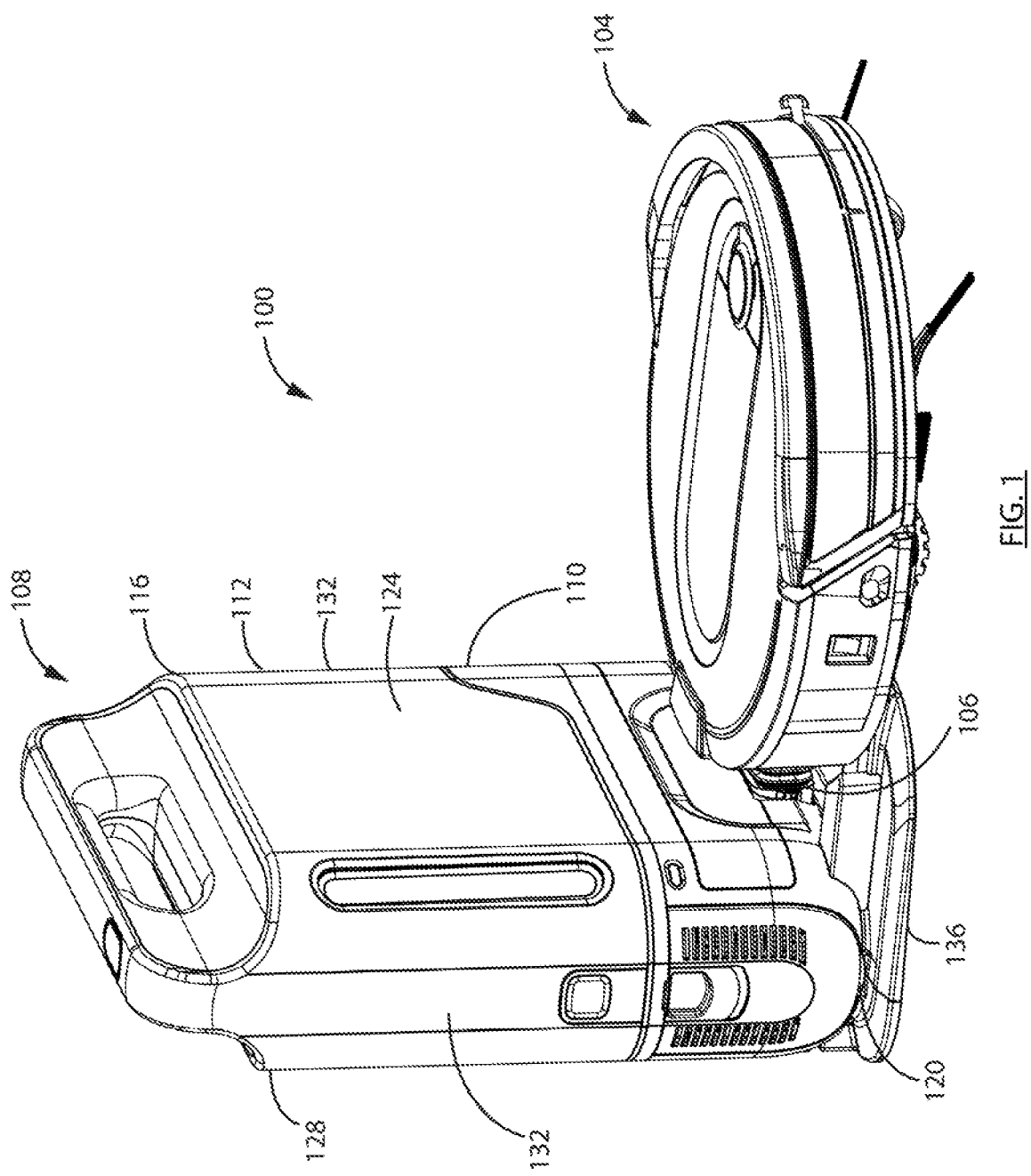
FIG. 1 is a perspective view of a robotic vacuum cleaner docked at a docking station.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g. $112a$, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Figure 2:
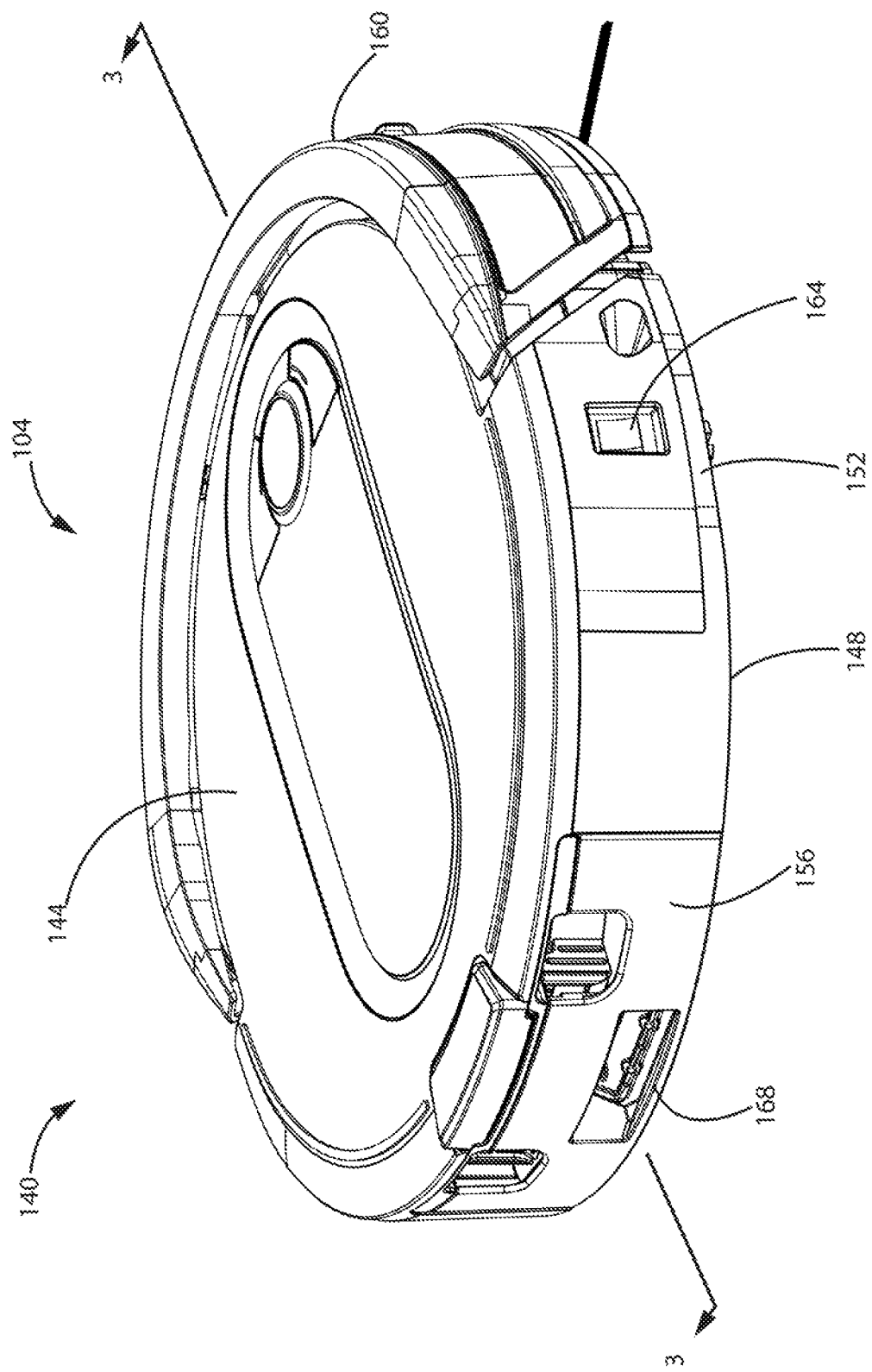
FIG. 2 is a perspective view of the robotic vacuum cleaner of FIG. 1.
Figure 3:
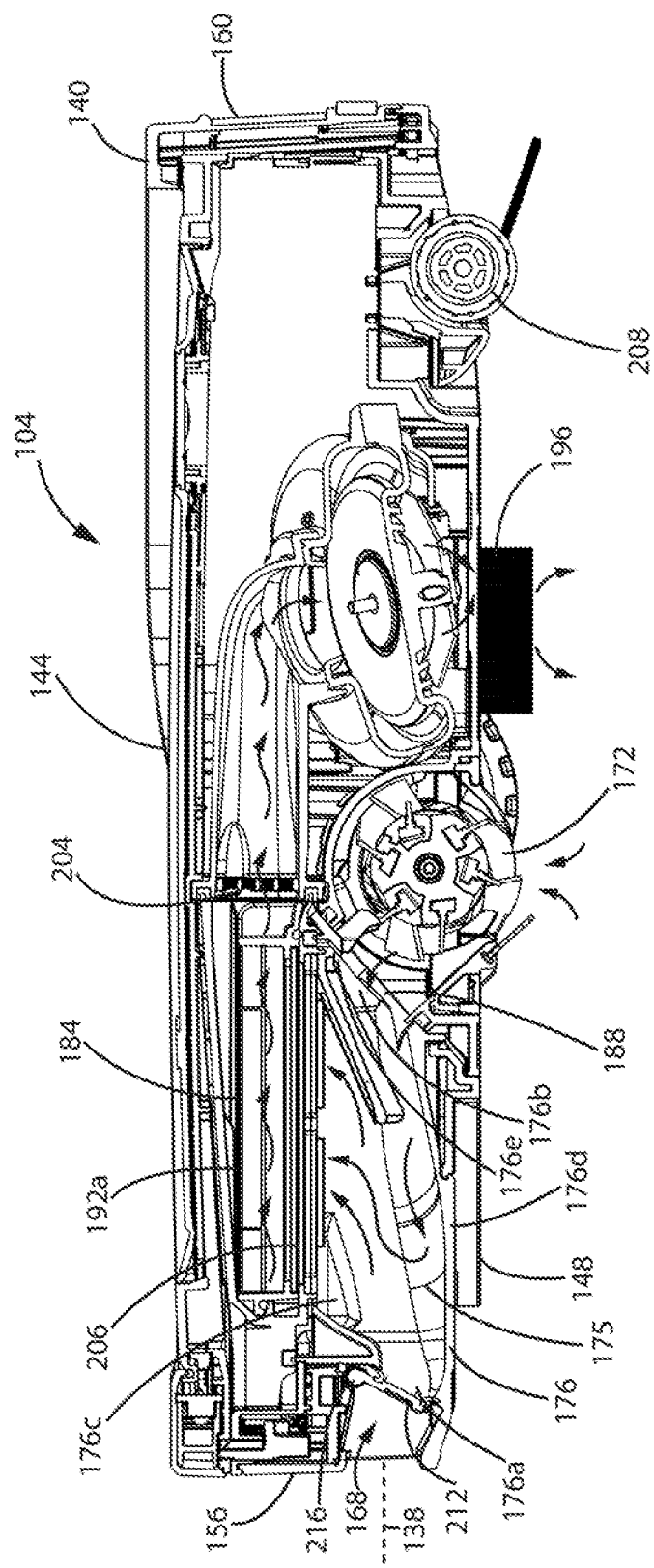
FIG. 3 is a cross-sectional view of the robotic vacuum cleaner of FIG. 1, taken along the section line 3-3' of FIG. 2.

General Description of an Autonomous Surface Cleaning Apparatus and Docking Station With reference to FIGS. 1-3, the following is a general discussion of embodiments of an apparatus 100, which provides a basis for understanding several features that are discussed herein. As discussed subsequently, each of the features may be used individually or in any particular combination or sub-combination such as in the embodiments disclosed herein.

As exemplified, apparatus 100 includes an autonomous surface cleaning apparatus 104 and a docking station 108. In the course of cleaning, and during periods of inactivity, the robotic vacuum cleaner 104 may, at times, dock (or connect) to the docking station 108 (FIG. 1). The docking station 108 can facilitate quick emptying of the robotic vacuum cleaner 104 from dirt and debris accumulated therein during a cleaning operation. Once some, or all, of the dust or collected debris (which may be referred to as dirt) has been transferred out of the robotic vacuum cleaner, the docking station may be independently cleaned-out. In this manner, the docking station 108 facilitates safe and fast emptying of the robotic surface cleaning device without requiring a user to, e.g., remove a dirt collection container from the robotic vacuum cleaner each time it is desired to empty out dust and debris. In various cases, docking station 108 can also be used to re-charge a battery of the robotic vacuum cleaner 104 during docking.

General Description of an Autonomous Surface Cleaning Apparatus

The autonomous surface cleaning apparatus (also referred to herein as a robotic vacuum cleaner) may be of any shape and configuration. As exemplified in FIGS. 2 and 3, the robotic vacuum cleaner 104 may have a housing 140 defined by a generally circular configuration, and comprising an upper end 144, a lower end 148 and peripheral side edge 152 extending between the upper and lower ends 144, 148. A portion of the side edge 152 may define the front end 156 and another portion of the side edge 152 may define the rear end 160 of the robotic vacuum cleaner 104. One or more wheels 208 may be provided, at a lower end 148 of the vacuum housing 140, for moving the robotic vacuum cleaner 104 over surfaces requiring cleaning. It will be appreciated that, in other embodiments, housing 140 may not have a circular configuration, but have any other suitable design or shape.

In order to transfer dirt to docking station 108, robotic vacuum cleaner 104 is provided with a dirt outlet 168. As exemplified, dirt outlet 168 is provided at a front end 156 of the robot housing 140. As exemplified in FIG. 3, dirt outlet 168 is in fluid communication with an air treatment unit 175 located inside the robot housing 140. In other embodiments, the outlet port 168 can be provided at other locations around robot housing 140, including at a rear end 160, top end 144 or lower end 148 of housing 140. Further, more than one dirt outlet port 168 can be provided on the vacuum 104. In embodiments exemplified herein, dirt outlet 168 may be removably coupled to a dirt inlet of the docking station 108 to allow transfer of dirt and debris, collected inside of air treatment unit 175, to docking station 108.

As exemplified, robotic vacuum cleaner 104 has an air treatment unit 175. In the exemplified embodiment, the air treatment unit 175 includes a robot dirt collection chamber 176 (also referred to herein as a robot dirt bin 176 or a robot dirt collection region 176) for storing dirt collected by the robotic vacuum cleaner 104 during the course of cleaning. It will be appreciated that in alternate embodiments, a robotic vacuum cleaner 104 may have two or more dirt bins or dirt collection chambers 176.

It will be appreciated that the air treatment unit 175 may use any air treatment elements known in the air/dirt separation arts for treating an in-flow of dirty air and otherwise separating the air flow from air-entrained dirt and may have one or more air treatment elements. For example, the air treatment element may be a cyclone, a momentum separator, a bag or the like.

Robot dirt bin 176 may be of any configuration. As exemplified in FIGS. 3 and 4C, robot dirt bin 176 may be generally flat and may have a generally rectangular configuration. As exemplified, robot dirt bin 176 extends in the longitudinal direction indicated by the longitudinal axis 138, between a front end 176a and an axially opposed rear end 176b. When robotic vacuum cleaner 104 is placed on a horizontal surface, robot dirt bin 176 comprises a top end 176c, a bottom end 176d, and one or more side faces 176e extending between the top and bottom ends. In the exemplified embodiment, the front end 176a of the dirt bin 176 may comprise an at least partially open end defining a dirt outlet of the robot dirt bin which is aligned with dirt outlet port 168 of the robotic housing 140. In other embodiments, the rear end 176b (FIG. 11D) or top end 176b of the dirt bin 176 may also comprise an at least partially open end.

If a docking station 108 is provided for receiving dirt collected by a robotic vacuum cleaner 104, then the robot dirt bin 176 may be secured in position in the robot housing 140 such that it is not intended to be user removable (see for example FIG. 3).

Optionally, whether or not a docking station 108 is provided, robot dirt bin 176 may comprise a separate removable compartment (as exemplified in FIGS. 4A-4D). An advantage of this design is that the robot dirt bin may be removed from the robotic vacuum cleaner 104 for cleaning (e.g., with water). As exemplified, dirt bin 176 is removably disposed inside of a cavity 220, formed within the robot body 140 (FIGS. 4A and 4B). Also, a user may extract the bin 176 to empty its contents (e.g., in a garbage receptacle), without necessitating the use of a docking station 108.

The robot dirt bin 176 may be removable from robotic vacuum cleaner 104 in any manner, for example, it may be removed by opening a door provided, e.g., on upper end 144 of housing 140 and removing the robot dirt bin 176 upwardly. Alternately, the robot dirt bin may be translated horizontally. In the exemplified embodiment, the dirt bin 176 is removed (i.e., extracted) from the cavity 220, through an outlet port 168 (FIG. 4B), by translating the robot dirt bin 176 along a horizontal longitudinal axis 138.

In order to retain dirt in robot dirt bin 176, one or more openable doors 212 may be provided. The openable doors 212 may be part of robot dirt bin 176 or they may be part of housing 140. When the openable doors 212 are in a closed position, dirt is securely stored in robot dirt bin 176. When at least one of the openable doors 212 is opened, robot dirt bin 176 may be emptied. The robot bin doors 212 can have any suitable design or configuration, and may be rotatably openable, translatable to an open position or the like. As exemplified in FIG. 3, door 212 is pivotally connected to the robot body 140 while, as exemplified in exemplified in FIGS. 4A-4C, door 212 is pivotally connected to the dirt bin 176 body.

In the embodiment exemplified in FIG. 4C, the door 212 is pivotally mounted to the robot dirt bin 176 by a hinge 216. Hinge 216 may be configured as a piano hinge, which rotates about an axis 224, transverse to axis 138 (FIG. 4C). In the exemplified embodiment, hinge 216 is provided at a top-forward edge of dirt bin 176, and can be configured to pivot the door 212 forwardly (see for example FIG. 4C) or rearwardly (see for example FIG. 15C). In other cases, hinge 216 can be located, for example, at the lower front edge of dirt bin 176.

Any number of openable doors 212 may be provided, and may be provided at any location on robot dirt bin 176. For example, the robot dirt bin may comprise a single door (FIG. 4), or more than one door (FIG. 10). In particular, as exemplified in FIGS. 4A-4C, the front end 176a of robot dirt bin 176 may comprise an openable end that is in communication with the dirt outlet 168. The openable door 212 is provided at the front end 176a, and aligned with the outlet port 168, to seal the dirt bin 176 during operation of the robotic vacuum cleaner 104. In other embodiments, provided in further detail herein, and as exemplified in FIG. 10, dirt bin 176 may include two openable doors 212, including a front openable door 212₁ located at the front end 176a, and a rear openable door 212₂ provided to cover an open (or partially open) rear end 176b.

The openable doors 212 may be manually openable by a user, or an opening mechanism may be provided to move doors 212 to the open position when, e.g., robot dirt bin 176 is to be emptied and/or when robotic vacuum cleaner 104 docks at the docking station 108.

Doors 212 may be openable in any manner known in the art. Several exemplary opening mechanisms are discussed subsequently. For example, doors 212 may be pivotally openable using, for example, a rotating swing door design (see for example FIG. 7), a rotating axle design (see for example, FIG. 8), or a rotating gear design (see for example FIG. 9).

The robot dirt bin 176 is also provided with a dirt inlet 188, which may be of any design known in the robotic vacuum cleaner arts and may be provided at any location known in the robotic vacuum cleaner arts. As exemplified in FIG. 3, the rear end 176b of dirt bin 176 is provided with the dirt inlet 188 for receiving dirt and debris that is collected by the robotic vacuum cleaner 104 during the course of cleaning. In other cases, dirt inlet 188 can also be located at other locations around dirt bin 176, including on the side face 176e of bin 176 (see for example FIG. 4A). As exemplified in FIG. 4B, in embodiments wherein the dirt bin 176 comprises a removable component, the robot housing 140 can include a dirt inlet 232 (FIG. 4B), which is in fluid flow communication with into the robot dirt bin inlet 188 when bin 176 is positioned inside of housing cavity 220.

The robotic vacuum cleaner may also be provided with any floor cleaning member known in the robotic vacuum cleaner arts. Referring to FIGS. 3 and 4, a sweeper 172 can be located on a lower end 148 of the vacuum robot 104, and can be used for sweeping dirt and debris from surfaces during cleaning. As exemplified, sweeper 172 can comprise one or more rotating brushes which, by itself using a mechanical sweeping action or in combination with an air flow, conveys dirt through the dirt inlet 188 into the dirt bin 176.

In various embodiments, as provided in further detail herein, the robotic vacuum cleaner may also have a suction motor 180 to draw, or assist in drawing, dirt into robot dirt bin 176. In such an embodiment, sweeper 172 can also function as a dirty air inlet for the robotic vacuum cleaner 104. If a suction motor is provided, then a clean air outlet 196 may be provided. The clean air outlet 196 may be located at a lower end of the robotic vacuum cleaner 104 as exemplified in FIG. 3, but may alternately be provided at other locations around the robot body 140 (e.g., top end 144 as exemplified in FIG. 4, or at a rear end 160). Accordingly, an airflow path 184 extends between the dirty air inlet (or sweeper) 172 and the clean air outlet 196 with the suction motor 180 positioned in the airflow path 184 to generate a vacuum suction through the airflow path 184. As exemplified, suction motor 180 may be positioned downstream of dirt bin 176, and is located inside of motor housing 182. Suction motor 180 can be, for example, a fan-motor assembly including an electric motor and impeller blade(s).

If a suction motor 180 is provided, then, as exemplified in FIGS. 3 and 4, one or more pre-motor filters 204 may be provided in the airflow path 184, upstream of the suction motor 180. Pre-motor filters 204 can be formed from any suitable physical, or porous filter media. For example, pre-motor filters 204 may be one or more of a foam filter, a felt filter, a HEPA filter, or other physical filter media. In some embodiments, pre-motor filter 204 may include an electrostatic filter, or the like.

During operation of the exemplified robotic vacuum cleaner 104, suction motor 180 is activated (i.e., via the power switch 164 in FIG. 2) to drive airflow, through airflow path 184, such that air is drawn through the sweeper (i.e., dirty air inlet) 172, and into the robot dirt bin 176 via inlet 188 (FIG. 3). The airflow may continue through an air outlet 206 of dirt bin 176, and downstream through an air passage 192a to the suction motor 180. As exemplified in FIG. 4A, in some cases, an additional pre-motor filter 204b may be provided at outlet 206, to prevent airborne dirt from being carried downstream toward the suction motor 180. As exemplified in FIG. 3, air exiting the suction motor 180 may continue through a second air passage 192b, and exits the clean air outlet 196. In various embodiments, upon de-activating the suction motor 180, dirt which aggregates on the filter 204b may collapse and collect inside dirt bin 176.

As exemplified in FIG. 4C, in embodiments wherein the dirt bin 176 comprises a separately removable compartment, the compartment may include an air outlet 236 which aligns with outlet 206, when the dirt bin 176 is received inside of cavity 220. Optionally, as exemplified, the air outlet 236 can include a separate filter medium 238. The filter medium 238 can prevent dirt and debris from escaping the dirt bin 176, via outlet 236, when the dirt bin 176 is extracted for cleaning. Alternately, or in addition, air outlet 236 may have an openable door for closing air outlet 236.

General Description of a Docking Station

A docking station 108 may be of any shape and configuration. Referring to FIG. 1, as exemplified, the docking station 108 comprises a body (or housing) 110 having a top end (or upper end) 116, a bottom end (or lower end) 120, a front end 124 and a rear end 128. Body 110 also includes lateral side faces 132, which extend between the front and rear ends. Optionally, a base 136 is provided at the lower end 120 to stabilize the docking station 108 in the upright position.

In the exemplified embodiment, the docking station 108 is generally configured as a vertical, rectangular structure, having an upright section 112. In other cases, the docking station 108 may have any other suitable shape or design.

As best exemplified in FIGS. 6A-6C, the docking station 108 may include an opening port 262 (also referred to herein as a dirt inlet 262), disposed at the front end 124 of the docking housing 110. The opening port 262 is positioned to be in fluid flow communication with, e.g., it may be aligned a with and be abutted by opening port 168 of the robotic vacuum cleaner 104 when the robotic vacuum cleaner 104 is to be emptied (e.g., the robotic vacuum cleaner is docked at the docking station). In this configuration, the docking station 108 can receive dirt and debris, ejected from the docked robotic vacuum cleaner 104, through dirt inlet port 262. In other embodiments, port 262 may be located at any other suitable location on the docking station body 110.

Optionally, as exemplified in FIGS. 5 and 6, a sealing member 106 may be attached (e.g., permanently or removably attached) around the port opening 262, and at the front end 124 of docking station 108. The sealing member 106 may be any member which can create a seal between the outlet 168 of the robotic vacuum cleaner 104 and the opening or dirt inlet port 262 of the docking station 108. For example, the sealing member 106 may comprise a rigid interface member (see for example FIGS. 5A and 5B), a flexible or compressible member (e.g., a bellows or the like) (see for example FIG. 5C) or a gasket-like member. As exemplified, upon docking the robotic vacuum cleaner 104, the sealing member 106 can engage to surround the dirt outlet port 168 of the robotic vacuum cleaner 104, and can be used to prevent dirt and debris from escaping when transferring dirt and debris between the robot dirt bin 176 and the docking station 108.

Alternately, or in addition, and as explained subsequently in further detail with reference to FIGS. 25-29, a connection interface 264 may be attached to a front end 124 of the docking station 108 (e.g., integrally, or removably attached thereto). The connection interface 264 can be provided in addition to, or as an alternative to, the sealing member 106. In the exemplified embodiments, and as explained in further detail herein, the connection interface 264 can be used to house a dirt transfer mechanism for transferring the contents of robot dirt bin 176 into docking station 108.

As best exemplified in FIGS. 5-6, the docking station 108 can further comprise a dirt receptacle 248. Dirt receptacle 248 may be of any design which collects and retains dirt, transferred from the robotic vacuum cleaner 104 to the docking station 108. The dirt receptacle 248 may be secured in position in the docking station 108 such that it is not intended to be user removable, or it may be the docking station 108 itself or it may comprise a separate removable compartment (see for example, FIGS. 5A and 5B).

If the dirt receptacle 248 is not removable from the docking station 108 or is the docking station 108 itself, then an openable door may be provided to permit the dirt receptacle 248 to be emptied. For example, dirt receptacle 248 may have a bottom that is openable when it is removed from the docking station. Alternately, if the dirt receptacle 248 is a non-removable component of the docking station, then the portion of the docking station that houses, comprises or consists of dirt receptacle 248 may be removable and it may have a bottom that is openable when it is removed from the docking station.

If the dirt receptacle 248 is removable, then the docking station 108 may include a cavity 250 for removably receiving the dirt receptacle 248 and at least one open end 249, through which the dirt receptacle 248 may be removed for emptying. For example, as exemplified in FIGS. 5A and 5B, the open end 249 may be the upper end 116 of the docking station 108, which may be used for accessing and removing (or replacing) the receptacle 248. In other embodiments, the opening for removing the dirt receptacle 248 may be provided at any other location around the docking housing 110.

A removable dirt receptacle 248 may be self-supporting, e.g., it may comprise a rigid bin, or it may not be self-supporting, e.g., a re-usable or disposable bag (e.g., a wax or plastic bag) in which case the docking station 108 may support the disposable bag during a robot emptying operation.

Preferably, an openable door or lid 240 is provided to cover or seal the open end 249 of the docking station 108 while the receptacle 248 is disposed inside of the docking station 108. For example, lid 240 can be used to seal the open end 116 during operation and/or non-use of the docking station 108. The lid 240 may be removable from docking station 108, or it may be rotatably mounted thereto, or it may be translatable to an open position. As exemplified in FIG. 5C, the openable lid 240 is pivotally connected to the docking housing 110 by a hinge 244. Alternatively, or in addition, an openable lid can also be provided on the receptacle 248, rather the docking station housing (not illustrated). In particular, an advantage of this design is that the receptacle 248 can be transported (e.g., carried) to an emptying container (e.g., a larger garbage bin) while the opening 249 is covered, thereby preventing plumes of dust from forming during transport.

If the receptacle is removable or a separate component from the docking station housing 110, then the dirt receptacle 248 can include one or more dirt openings 252 that are positioned to be in fluid flow communication with, e.g., to generally align with and abut, dirt opening port 262 of the docking station 108, when the dirt receptacle 248 is disposed inside of the docking station 108 (see for example FIG. 6A). Accordingly, dirt can be transferred from the robot 104 into the receptacle 248, via the dirt opening 252.

It will be appreciated that if the dirt receptacle 248 is not removable from the docking station 108 or is the docking station 108 itself, then only a single opening may be provided for connecting the dirt receptacle 248 with the dirt outlet 168 of the robotic vacuum cleaner 104. For example, only dirt opening 262 may be provided. In such a case, opening 262 may be provided with an openable door 272.

It will be appreciated that if the dirt receptacle 248 is removable from the docking station 108 then the dirt receptacle 248 and the docking station 108 may each be provided with a dirt opening 252, 262. In such a case, opening 252 and/or opening 262 may each be provided with an openable door 254, 272.

The openable door or doors 254, 272 may be rotatable mounted, translatable or otherwise openable.

For example, as exemplified in FIG. 5B, opening 252 may be covered (e.g., sealed) by a door or flap 254. Flap 254 may cover the opening 252 to prevent dirt from escaping the receptacle 248 when the receptacle is removed from the docking station 108. Optionally, as exemplified, in order to seal the opening 252, flap 254 may be recessed inside the receptacle 248, and may have a cross-sectional area greater than the opening 252. As exemplified in FIG. 6, flap 254 can be opened inwardly, into the volume of the receptacle 248, to provide access into the receptacle 248. In some embodiments, where the dirt receptacle 248 comprises a rigid bin, flap 254 can comprise a rigid material (e.g., a rigid door) which is pivotally attached to the receptacle 248 by a hinge 256 (FIG. 5B). Flap 254 may be biased, e.g., by a spring, to the closed position. Alternately, or in addition, the opening mechanism may secure flap 254 in the closed position.

As exemplified in FIG. 6, the docking station opening 262 may also include an openable door 272. Openable door 272 may seal the docking station 108 when the robotic vacuum cleaner 104 is not docked. In the exemplified embodiment, door 272 is pivotally mounted to the docking station housing 110 by hinge 274, and can pivot either forwardly or rearwardly.

As exemplified in FIG. 6B, door 272 can pivot rearwardly to push open the dirt receptacle flap 254, and accordingly, allow dirt to be transferred into the dirt receptacle 248. Alternatively or in addition, as exemplified in FIG. 6C, where the flap 254 comprises a rigid door, docking station door 272 may not be necessarily provided, and receptacle door 254 can act as a doorway for both the docking station 108 and the receptacle 248.

Door Opening Mechanisms

The following is a discussion of a door opening mechanism, which may be used by itself or with any of the features disclosed herein. In the exemplified embodiments, the door opening mechanism can be used for opening one or more of: (i) door(s) 212 to the robotic vacuum cleaner dirt bin 176; (ii) door 272 to the docking station 108; and/or (iii) a door 254 associated with the dirt receptacle 248, in order to allow dirt to be transferred from the robot dirt bin 176 into docking station 108 during docking.

The door opening mechanism may be part of a mechanical transfer member whereby the door or doors are opened as the mechanical transfer member moves to transfer dirt from the robotic surface cleaning apparatus to the docking station. Accordingly, the door opening mechanism may comprise a mechanical door opening mechanism which is part of a dirt transfer mechanism (see for example FIGS. 10 and 15). A mechanical door opening mechanism may be part of a dirt transfer mechanism and may engage and open the door as part of a dirt transfer operation. Accordingly, mechanical door opening mechanisms are discussed subsequently.

Alternately, the door opening mechanism may be activated when the mechanical transfer member or the pneumatic dirt transfer mechanism is actuated or when the robotic vacuum cleaner 104 docks at the docking station 108. In such an embodiment, the door opening mechanism may comprise an electrically operated motor which is energized when the mechanical transfer member or the pneumatic dirt transfer mechanism is actuated.

Similarly, the door opening mechanism may close the door(s) when the dirt transfer is completed or when the robotic vacuum cleaner leaves the docking station 108. Alternately, or in addition, the door(s) may be biased to a closed position.

As exemplified, the door opening mechanism may comprise an electric door opening mechanism that is drivingly connected to the door by a linking mechanism. As exemplified in FIGS. 7-9, the linking mechanism comprises an axle of a drive motor that is drivingly (e.g., rotatably) connected to the door. Alternately, the linking mechanism may be a telescoping member that moves axially to open and close the door. Alternately, the linking mechanism may be a drive arm similar to that shown in FIG. 13C.

FIGS. 7-9 exemplify various embodiments for an automatic electric door opening mechanism. As exemplified, the robotic vacuum cleaner 104 is provided with a door 212 and the docking station is also provided with a door 272. An electric motor 276 is drivingly connected to the door to move the door between the open and closed position. The motor 276 is actuated by a signal provided by a control unit 296. The control unit 296 issues a signal in response to an actuator (an activation switch unit), which may be a manually operable switch (e.g., a user actuates the switch), or a sensor (e.g., a proximity sensor, an optical sensor, a pressure sensor or a reed switch) that detects when the robotic vacuum cleaner docks at the docking station, or a circuit that is closed when the on board power supply of the robotic vacuum cleaner 104 commences recharging after the robotic vacuum cleaner has docked at the docking station 108.

As best exemplified in FIG. 7A, each door is provided with an automatic door opening mechanism that comprises an electric motor 276 drivingly connected to the door to open the door 272, 212. In particular, each of the robotic vacuum cleaner door 212 and the docking station door 272 is rotated by a respective electric motor $276_1$, $276_2$. Each motor 276 is, in turn, controlled by a control unit $296_1$, $296_2$, via, e.g., a cable wire 298. In various cases, control units 296 can also house power supplies (e.g., batteries) to power the motors 276 or the motors 276 may be powered by an on board power supply of the robotic vacuum cleaner. Each control unit 296 is electrically coupled via, e.g., a cable 292 to a respective activation switch unit $288_1$, $288_2$.

Activation switch units 288 operate to transmit activation signals to control units 296 upon, e.g., docking of robotic vacuum cleaner 104 at the docking station 108 and/or the robotic vacuum cleaner leaving the docking station 108. Upon receiving the activation signal, the control units 296 can control the opening and/or closing of doors 212, 272, via motors 276. In the exemplified embodiments, the activation switch unit $288_1$ for the robotic vacuum cleaner is provided at a front end 156 of the robot housing 140, while the activation switch unit $288_2$ for the docking station 108 is provided at a front end 124 of the docking station housing 110.

Activation units 288 can comprise any suitable switch mechanism known in the art. In the exemplified embodiment of FIG. 7, activation units 288 each comprise a pressure sensor, which is configured to transmit an activation signal upon sensing applied pressure. As exemplified in FIG. 7B, the pressure sensors 288 are each positioned—on the robotic vacuum cleaner and docking station housings—to directly engage (e.g., contact) each other upon docking of the robotic vacuum cleaner 104. Upon contacting, each pressure sensor 288 may transmit an activation signal to a respective control unit 296, to activate motors 276 and open doors 212, 272. In this manner, the pressure sensors 288 facilitate automatic opening of doors 212, 272 upon docking robotic vacuum cleaner 104. In other embodiments, pressure sensors 288 may not directly engage each other at docking, but rather, may engage reciprocal surfaces of the docking station 108, robotic vacuum cleaner 104 and/or sealing member 106 and may be located at different locations.

It will be appreciated that, in an alternate embodiment, a single motor may be driving connected to each door 212, 272.

FIGS. 8 and 9 exemplify an alternative embodiment for activation units 288. In the exemplified embodiments, activation units 288 each comprise a reed switch, that is opened and closed by an applied magnetic field. As exemplified, magnets 320 are positioned at a front end 124 of docking station 108, and at a front end 156 of the robotic vacuum cleaner 104. During docking of the robotic vacuum cleaner 104, reed switches 288 engage complementary magnets 320 provided on a reciprocal surface of the robotic vacuum cleaner 104 and docking station 108. Each magnet 320 operates to "close" the reed switch 360, and in turn, complete a circuit defined by the control unit 296, and forward and return wires 292a, 292b. The closing of the circuit, in turn, causes each control unit 296 to activate a motor 276, and automatically open respective doors 212, 272.

In other cases, the activation switch unit 288 can be manually activated by the user, and can comprise, for example, a button, a switch, or the like, provided on an exterior of the robot and/or docking station housings.

In the embodiments exemplified in FIGS. 7-9, upon receiving an activation signal from activation switch units 288, motors 276 can operate to open the doors 212, 272. Similarly, when the robotic vacuum cleaner leaves the docking station 108 and/or when a transfer operation is complete, activation switch units 288 may issue a signal to the motors whereby the motors close the doors.

FIG. 7A-7C exemplify a first door opening configuration using rotatable "V"-shaped doors wherein the drive motor is indirectly driving connected to the door. As exemplified, the robot dirt bin door 212 may comprise a first "upper" portion 212a joined to a second "lower" portion 212b, forming a "V"-shaped member. Portions 212a, 212b can be joined together by a hollow cylinder 282, which receives a rod 286. Door 212 is rotatable about rod 286, e.g., by one or more bearings. Rod 286 is attached, optionally non-rotatably mounted at opposite axial ends 286a, 286b, to the robot housing 140. In this configuration, door 212 is rotatable between the closed position (FIG. 7A) and an open position (FIG. 7B) about a rotation axis 224 defined by the axis of extension of rod 286.

As best exemplified in FIG. 7A, hollow cylinder 282 and rod 286 may be positioned at a top-forward end, of dirt bin 176 (i.e., the interface between dirt bin 176 and the robot housing 140). In this arrangement, the upper door portion 212a is disposed above the dirt bin 176, while the lower door portion 212b is disposed to cover the open front end 176a of dirt bin 176.

To pivot door 212 between the open and closed positions, a cord $280_1$ (e.g., cable or other intermediary member) is attached at a first cable end $280a_1$ to the upper door portion 212a (FIG. 7C). The cord indirectly connects the motor to the door. The second cable end $280b_1$ is attached to (e.g., wound around) a spool $284_1$. Spool $284_1$, in turn, is drivingly connected to the spool motor $276_1$. As exemplified, spool motor $276_1$ is located above the robotic dirt bin 176, and rear of the door 212. In this configuration, spool motor $276_1$ can be used to wind or unwind the cord $280_1$, in order to open the door 212 (FIG. 7B), or otherwise, release the door 212 back into the closed position (FIG. 7A). Optionally, door 212 is biased to the closed position by, e.g., a torsion spring, such that, when spool motor $276_1$ unwinds the cable, the door will move to the closed position.

The docking station door 272 may also have a similar door configuration, comprising an upper door portion 272a and a lower door portion 272b joined together to form a "V"-shaped member. A cable $280_2$ connects the upper portion 272a to spool $284_2$, which is wound or unwound by spool motor $276_2$. An optional torsion spring may also be provided.

Optionally, each door may have a heavier lower door portion 212b, 272b than the upper door portion 212a, 272a. An advantage of this design is that the heavier lower portion 212b, 272b may assist in pivoting the door into the closed position, once cords 280 are un-wound by motors 276 (i.e., under the force of gravity).

FIGS. 8A-8B exemplify an alternative door opening configuration wherein the motor is directly connected to the door (e.g., the drive axle of the motor is drivingly connected to the door). As best exemplified in FIG. 8B, robot dirt bin door 212 may comprise a longitudinally extending member 282, attached to a lateral edge of the door 212. Member 282 can extend between a first lateral end 282a and an axially opposed second lateral end 282b. As exemplified, the first end 282a is non-rotatably mounted to rotating axle 322 of motor 276. The motor 276 and axle 322 can be jointly positioned at the interface between the top of the dirt bin 176c, and the housing 140, and at a forward-end 176a of the dirt bin 176 (FIG. 8A). In this configuration, motor 276 rotates axle 322 to pivot the door 212, about rotation axis 224, between the open and closed positions. A similar configuration can be applied with respect to door 272 of the docking station 108.

FIGS. 9A-9B exemplify still a further alternative door opening configuration wherein the motor is indirectly drivingly connected to the door by intermediary members comprising gears. In this embodiment, the motor drives a drive gear 334b and a mating driven gear 334a is provided on the door. As exemplified in FIG. 9B, the longitudinally extending member 282 of door 212 is connected, at a first lateral end 282a, to a first rotating toothed gear 334a. In the exemplified embodiment, the gear 334a is non-rotationally mounted to the longitudinally extending member 282. The first gear 334a is, in turn, in toothed engagement with a second rotating gear 334b. As exemplified, second gear 334b is non-rotationally mounted to an axle 322 of motor 276. Each of the second gear 334b and the motor 276 can be disposed above the dirt bin 176. In this configuration, upon activation of motor 276, the drive gear 334b may rotate to turn the driven gear 334a and, in turn, pivot the door 212, about rotation axis 224, into the open position. Similarly, the motor may be rotated in the reverse direction to close the door. A similar configuration can be used with respect of docking station door 272, using interleaved gears 336a, 336b.

While the embodiments in FIGS. 7-9 exemplify various electrical door opening mechanisms, in other embodiments, the door opening mechanism can also comprise a mechanical door opening mechanism using, for example, a mechanical ram. These embodiments will be described in further detail herein, with reference to FIGS. 10-15.

Dirt Transfer Mechanism

The following is a discussion of a dirt transfer mechanism which is used for cleaning (e.g., removing) dirt and debris from the robot dirt bin 176. The dirt transfer mechanism can be used by itself, or with any of the features previously disclosed herein, including the door opening mechanism. In the exemplified embodiments, the dirt transfer mechanism may comprise one or more of: (a) a mechanical dirt transfer mechanism; and/or (b) a pneumatic dirt transfer mechanism.

(a) Mechanical Dirt Transfer Mechanism

A mechanical dirt transfer mechanism comprises a member (e.g., a mechanical transfer member) which physically engages and moves dirt from the robot dirt bin 176 towards or into the docking station 108 (dirt receptacle 248). The mechanical dirt transfer member may push the dirt out of the robot dirt bin 176 towards or into the docking station 108 and/or may pull the dirt out of the robot dirt bin 176 towards or into the docking station 108. As such, the mechanical dirt transfer mechanism may travel through part or all of the robot dirt bin 176 (e.g., it may sweep across all or part of the floor of the robot dirt bin 176).

As exemplified, the mechanical dirt transfer mechanism may be located inside one or more of the robotic vacuum cleaner 104 (see for example FIGS. 10-14), and/or the docking station 108 (see for example FIGS. 15-16).

As exemplified in FIGS. 10-14 and FIGS. 15-16, the mechanical dirt transfer member 344 may comprises a sweeping portion 344a that is longitudinally translatable through at least a portion of the robot dirt bin 176 In particular, as the sweeping portion 344a is translated inside all or part of the robot dirt bin 176, the sweeping portion 344a is configured to engage dirt in the robot dirt bin 176 and push (FIGS. 10-14) and/or pull (FIGS. 15-16) the dirt through and, optionally, out of the robot dirt bin 176 and into the dirt receptacle 248 of the docking station 108.

Sweeping portion 344a may have a cross-sectional area in a plane transverse to the longitudinal axis 138 that is proximate (e.g., slightly smaller than) the cross-sectional area of the robot dirt bin in the plane transverse to the longitudinal axis 138. Accordingly, as sweeping portion 344a is translated longitudinally through robot dirt bin 176, sweeping portion 344a pushes or pulls dirt through and optionally out of the robot dirt bin 176.

In the exemplified embodiments of FIGS. 10-14, sweeping portion 344a of transfer member 344 is configured as a planar member having a cross-sectional area that is substantially equal to the cross-sectional area of the robot dirt bin 176. In other embodiments, sweeping portion 344a may have any other suitable design, shape or configuration. For example, as exemplified in FIGS. 15-16 and as provided in further detail herein, sweeping portion 344a may be configured as a foldable sweeping portion 344a which includes a pivoting first sweeping member 344a₁ and second sweeping member 344a2.

Optionally, the sweeping portion 344a may engage one or more of the lateral sidewalls of the robot dirt bin 176 (e.g., the sweeping portion 344a may have a lower end that sweeps along the floor of the robot dirt bin 176 as the sweeping portion travels e.g., from a rear end of the robot dirt bin 176 to the front end of the robot dirt bin 176). Accordingly, one or more of the lateral sides, the upper side and the lower side of the sweeping portion that face a lateral sidewall, the upper wall and/or the floor of the robot dirt bin 176 may have brush members, rubber wipers or the like that travel along or proximate the lateral sidewalls, the upper wall and the floor of the robot dirt bin 176 to move dirt through the robot dirt bin 176.

Optionally, as exemplified in FIG. 11, at least a portion of a longitudinal edge of the sweeping member 344a that is directed toward the top surface 176c of the dirt bin 176 is lined with one or more scraping members 194 (i.e., scraping teeth) (FIG. 11D). As exemplified in FIGS. 11B and 11C, scraping members 194 can scrap (e.g., debride) a grill 198 for filtering large particles, which covers the air outlet 206 that leads to the air passage 192a, as the transfer member 344 is translated between the storage and emptied positions. In other cases the grill 198 may not be provided, and the scraping members 194 may directly engage a pre-motor filter 204a covering the air outlet 206.

Sweeping portion 344a may be translatable axially through the robot dirt bin 176 between a storage or floor cleaning position (FIGS. 10A, 11A, 12A, 13A, 14A, 15A), and one or more dirt emptying position (FIGS. 10B-10C, 11B—11C, 12B, 13B, 14B, 15B—15D). FIGS. 10-15 exemplify embodiments where the mechanical transfer member 344 is provided inside the robotic vacuum cleaner. As exemplified, in FIGS. 10A, 11A, 12A, 13A and 14A, in the floor cleaning position, the sweeping portion 344a may be positioned such as to not obstruct the flow of air through the dirt bin 176 in a floor cleaning mode. For instance, as exemplified in FIGS. 10A, 11A, 12A, 13A and 14A, in the floor cleaning position, the sweeping portion 344a may be optionally recessed behind the rear end 176b of the robot dirt bin 176 and inside a cavity 356 located rearward and exterior to the robot dirt bin 176. In other embodiments, in the floor cleaning mode, the sweeping portion 344a may be provided inside the robot dirt bin 176, and recessed proximal the rear end 176b.

Figure 15A:
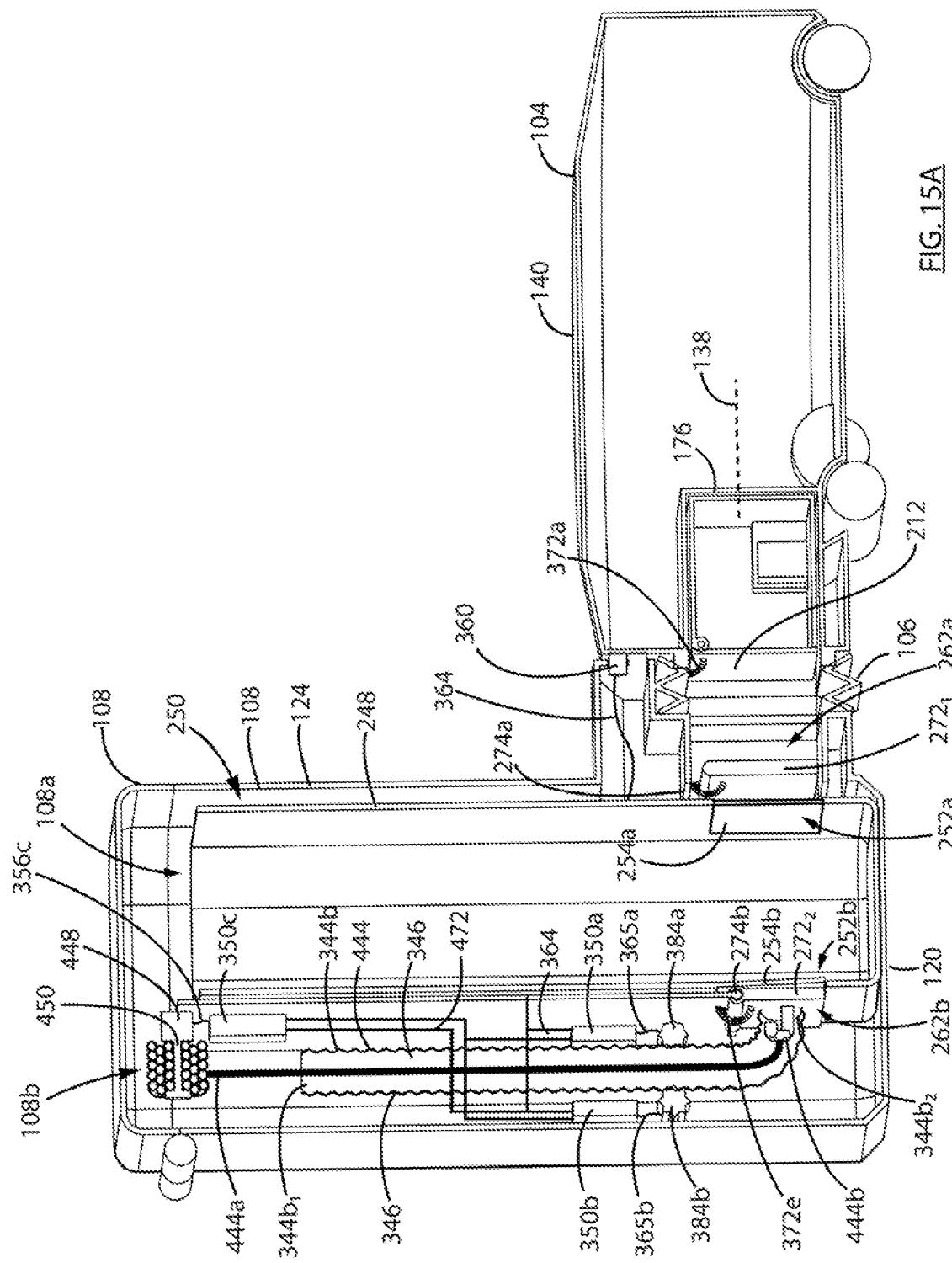
FIG. 15A is a side cross-sectional view of a robotic vacuum cleaner docked at a docking station, taken along sectional line 10-10' of FIG. 5C, and showing a mechanical dirt transfer mechanism located inside the docking station in a storage position.

FIG. 15A exemplifies an alternative embodiment where the mechanical transfer member 344 is located inside the docking station 108. In this exemplified embodiment, in the floor cleaning or storage position, the sweeping portion 344a may be disposed inside the docking station 108. In particular, as discussed subsequently herein, the docking station 108 may include two compartments, a first compartment 108a for containing the dirt receptacle 248, and a second compartment 108b for housing the mechanical dirt transfer mechanism 344. The sweeping portion 344a may be located inside the second compartment 108b in the floor cleaning or storage position.

In the dirty emptying positions (FIGS. 10B-10C, 11B—11C, 12B, 13B, 14B, 15B—15D), sweeping portion 344a may be translated along axis 138 to push dirt out of the robot dirt bin 176 (FIGS. 10B-10C, 11B—11C, 12B, 13B, 14B) or pull dirt out of the dirt bin 176 (FIGS. 15B-15D) through and, optionally, out of the dirt bin 176. In embodiments where the dirt transfer member 344 is located inside the robotic vacuum cleaner 104 (FIGS. 10B—10C, 11B—11C, 12B, 13B, 14B), in the dirty empting position, the sweeping portion 344a may be translated—along axis 138—along a portion of the dirt bin 176 and toward the front end 176a of the dirt bin 176 and/or optionally through the dirt outlet 168 and into the docking station 108. In embodiments where the transfer member 344 is located inside of the docking station 108, in the dirt emptying positions, the sweeping portion 344a may be translated, along axis 138, through the front end 176a of the dirt bin 176 and at least partially toward the rear end of the dirt bin 176b (FIGS. 15B and 15C) or all the way to the rear end, and back toward the docking station 108 (FIGS. 15D and 15E).

Sweeping portion 344a may have a drive member 344b that moves the sweeping member longitudinally between the floor cleaning or storage positions and one or more dirt emptying positions. The drive member 344b may push the sweeping member 344a through the robot dirt bin (see for example transfer member 344 of FIGS. 10-14) or may pull a sweeping member 344a through the robot dirt bin 176 (see for example FIGS. 15A-15E, and 16A and 16B). If the drive member 344b pulls the dirt through the robot dirt bin 176, then the drive member 344b may be located in the docking station 108 or the connection interface 246.

The drive member 344b may be a rigid member that is pushed through the robot dirt bin, such as ram stem portion 344b of FIGS. 10-14 or pulled through the robot dirt bin (see for example FIGS. 15A-15E), or may be a telescoping member that telescopes axially (in the direction of axis 138) to move the sweeping member 334a, a drive arm similar to that shown in FIG. 13C, an inflatable member that inflates rearward of sweeping portion 344a to push sweeping portion 344a or the like.

Each portion of transfer member 344 may be formed of any suitable material, including a rigid material or a flexible material. In some cases, the sweeping portion 344a and stem portion 344b may be each formed from different materials. An advantage of forming sweeping portion 344a and/or stem portion 344b from flexible material is that, the transfer member 344 may be deployed in areas having non-linear contours. For example, if the cavity in which drive member 344b is located is non-linear, then it may be beneficial for the drive member 344b to be made of a flexible material. For instance, as exemplified in FIG. 3, the robot dirt bin 176 may have a curvature, which requires sweeping portion 344a and/or stem 344b to be sufficiently flexible to bend with the curvature as ram 344 translates through the robot dirt bin 176.

Referring now to FIGS. 10-14 which exemplify a case where the mechanical transfer member 344 is located inside the robotic vacuum cleaner 104. In the exemplified embodiment, the mechanical dirt transfer mechanisms may be configured as a "ram" like member wherein the drive member 344b comprises a longitudinal stem portion 344b. As exemplified, stem portion 344b extends axially, along axis 138, between a first stem end 344b₁ and a second stem end 344b2. In the exemplified embodiment, the first end 344b₁ is mounted to the rear side of sweeping portion 344a. (Stem portion 344b extends through the rear wall of robot dirt bin 176.)

Stem portion 344b is slidably moveably mounted in the robotic vacuum cleaner 104 and extends along axis 138. For instance, as exemplified in FIG. 11, the stem portion 344b may be positioned rearwardly and exterior of robot dirt bin 176, such as in cavity 356 of the robot housing. The rear end 176b of the robot dirt bin 176 may comprise an opening to allow the stem portion 344b to translate the sweeping portion 344a through the robot dirt bin 176 (also referred to herein as a mechanical transfer member inlet port 183, exemplified in FIGS. 11A-11C). In this manner, stem portion 344b may extend through the opening port 183 in the rear wall 176b of robot dirt bin 176 to push the sweeping portion 344a through the robot dirt bin 176. In this configuration, axial sliding of stem portion 344b, inside of cavity 356, controls and stabilizes axial motion of the sweeping portion 344a inside the dirt bin 176. It will be appreciated that stem portion 344b may have any suitable axial length to extend sweeping portion 344a to various emptied positions. For example, as exemplified in FIG. 11A, stem 344b may have an axial length 342, which is defined between the first stem end $344b_1$ and the second stem end 344b2, that is substantially equal to, or greater, than the axial length 178 of dirt bin 176, i.e., defined between the front end 176a and the rear end 176b of dirt bin 176. An advantage of this configuration is that the sweeping portion 344a may translate across the entire axial length of the dirt bin 176, so as to transfer dirt completely out of the bin 176. As exemplified in FIG. 10C, in other cases, the axial length of the stem portion 344b can be greater than the dirt bin 176. An advantage of this design is that sweeping portion 344a may extend to further transfer dirt into the docking station 108 when the robotic vacuum cleaner 104 is in the docked position. Accordingly, stem portion 344b may have a length to extend through interface 246 (if provided) and into dirt receptacle 248. The cavity 356 may have an axial length which is at least as equal to the axial length of stem 344b, so as to receive the stem 344b in the storage position. It will be appreciated that the stem portions may be a telescoping member.

In addition to ejecting dirt and debris from the dirt bin 176, stem portion 344b can also be used as a mechanical door opening mechanism for opening one or more of the robot dirt bin doors $212_1$ and $212_2$, docking station door 272 and/or a dirt receptacle door 254. For example, as exemplified in FIGS. 10B and 10C, as the ram 344 is translated into the emptied position, the sweeping portion 344a may engage, and cause the doors 212 and 272 to pivot open.

Preferably, as exemplified in FIG. 10, the stem portion 344b may comprise a flange member, which can be used to hold (e.g., prop) the doors in the open position as the sweeping member 344a passes by the door. In this manner, the flange member prevents the doors from moving towards the closed position, behind the sweeping portion 344a. Accordingly, the doors are prevented from engaging the sweeping portion 344a, when the sweeping portion 344a is retracted back into the storage position and thereby preventing the sweeping portion 344a to move to the storage position. As exemplified in FIG. 10, the upper surface of the stem portion 344b extends axially rearwardly from the upper end of the sweeping portion 344a. Therefore, the flange member is the upper surface of stem portion 344b. It will be appreciated that flange portion may be any member which will maintain a door above the upper end of the sweeping portion 344a such that the sweeping portion 344a may be retracted to the storage position.

Optionally, as also exemplified in FIG. 10, one or more biasing members such as springs 372a, 372b, 372c, 372d may be provided to bias one or more of doors $212_1$, 272, 254 and $212_2$, respectively, to the closed position. For example, as exemplified in FIG. 10A, a spring 372a may connect between the front robot dirt bin door $212_1$ and the robot housing 140, and a spring 372d may connect between the rear robot dirt bin door $212_2$ and the robot housing 140. Similarly, as exemplified in FIG. 10B, a spring 372b may also connect between the docking station housing 110 and the door 272. Optionally, a spring 372c may further connect between dirt receptacle 248 and the receptacle door/flap 254. Each of springs 372 can be a torsion spring that is compressed when the doors 212, 254, 272 are rotated into the open position by the ram 344. The springs 372 can then expand to automatically close the doors 212, 272, as the ram 344 is retracted back into the storage position.

In other embodiments, rather than using biased springs, hinges 216 and 274, for the robotic vacuum cleaner doors 212 and docking station door 272, respectively, can comprise spring hinges, which bias the doors into the closed position. Similarly, a hinge 256 for a dirt receptacle door 254 (FIG. 5B) may also be configured as a spring hinge.

In the embodiments exemplified in FIG. 10-14, wherein the transfer member 344 is located inside the robotic vacuum cleaner 104, the transfer member 344 may be translated between the floor cleaning position and the dirt emptying positions, in any suitable manner known in the art. In the exemplified embodiments, movement of the transfer member 344 i from the floor cleaning position to the dirt emptying position is actuated using one or more of an automatic electrical activation mechanism (FIGS. 10-11), a user actuated electro-mechanical activation mechanism (FIG. 12), a mechanical activation mechanism (FIG. 13) and/or a hydraulic or pneumatic activation mechanism (FIG. 14).

As exemplified in FIGS. 10 and 11, an automatic electrical activation mechanism is used to commence a cleaning cycle whereby the transfer member 344 is translated between the floor cleaning and dirty emptying positions. In this embodiment, the automatic electrical activation mechanism comprises control unit 350 which is operably connected to electric motor 352 and an activation switch, such as activation switch unit 360, wherein upon the activation switch being actuated, such as by the robotic surface cleaning apparatus docking at a docking station, a signal is sent to the control unit 350 which then actuates the electric motor 352 thereby commencing an emptying cycle.

In the exemplified embodiments, and as best exemplified in FIG. 11, a mechanical transfer member is actuated by an electrical activation mechanism. In this embodiment, transfer member 344 is translated between the floor cleaning and dirt emptying positions using a rack and pinion system driven by an electric motor 352. As exemplified, the electric motor 352 rotates a toothed gear 348 that is non-rotatably mounted to a motor shaft 352a. The toothed gear 348 engages complimentary teeth 346, extending axially along at least a portion of the upper end of the ram stem 344b (FIGS. 10A and 11D). In this configuration, rotating gear 348 drives ram stem 344b axially in a manner analogous to a rack-and-pinion system. For example, in the exemplified embodiment, gear 348 is rotated in a clockwise direction to translate ram 344 to an emptied position. Gear 348 is then rotated in a counter-clockwise direction to reverse translation of ram 344 back to the storage position.

As exemplified in FIG. 10, motor 352 may be in communication with a control unit 350, via e.g., wire 365. Control unit 350 can control motor 352 in order to rotate gear 348 in a clockwise or counter-clockwise direction. In some embodiments, control unit 350 can be the same as the control unit $296_1$, exemplified in FIGS. 7-9, used for controlling the automated opening of the robot dirt bin door 212. In this manner, a single control unit can be used for both automatically opening the robotic vacuum cleaner door, and translating the ram 344 into an emptied position, i.e., upon docking the robotic vacuum cleaner 104. In various cases, control unit 350 can also house a power supply (e.g., batteries) to power the motor 352.

In some cases, control unit 350 can also control the number of rotations of gear 348 by motor 352. For example, control unit 350 can control motor 352 to rotate gear 348 a pre-determined number of rotations in the clockwise or counter-clockwise directions. In particular, this can be done to prevent ram 344 from over-extending in the emptied position (i.e., due to over-rotation of gear 348), and otherwise displacing stem 344b from cavity 356. Control unit 350 can also control the number of rotations of gear 348 to ensure that the ram 344 is properly returned to the storage position.

Electric motor 352 may be powered by the onboard energy storage member of the robotic vacuum cleaner 104.

As exemplified in FIG. 10, electric motor 352 may be automatically electrically activated to translate ram 344 into the emptied position. Accordingly, upon a robotic vacuum cleaner docking at a docking station 108, a signal may be issued by a sensor which actuates the electric motor 352 to commence an emptying cycle of the robot dirt bin 176. For example, control unit 350 may automatically activate the electric motor 352 upon the robotic vacuum cleaner 104 docking at the docking station 108.

As exemplified in FIGS. 10B and 10C, control unit 350 is connected, e.g., via one or more wires 364, to an activation switch unit 360. Activation switch unit 360 can comprise any suitable switch mechanism known in the art and may be any of those discussed with reference to activation unit 288 and, optionally, may be activation unit 288. For instance, as exemplified in FIG. 10, activation unit 360 can comprise a reed switch disposed at a front end 156 of the robot housing 140. Upon docking the robotic vacuum cleaner 104, the reed switch 360 engages a magnet 368 disposed on a front end 124 of the docking station 108. Magnet 368 can also be disposed on a front end of the sealing member 106, or at a front end of a connection interface 264 disposed between the docking station 108 and the vacuum 104.

As exemplified, magnet 368 operates to "close" the reed switch 360, and complete a circuit defined by the control unit 350 and forward and return wires 364a, 364b. The closing of the circuit, in turn, causes control unit 350 to activate motor 352 and translate the ram 344 into the emptied position.

In some cases, control unit 350 can automatically return the ram 344 back into the storage position once the unit detects that the reed switch 360 is reopened (e.g., the robot has undocked). In other cases, the control unit 350 can return the ram 344 back into the storage position, immediately or shortly after, the ram 344 is translated into the emptied position, i.e., without first waiting for the robotic vacuum cleaner 104 to undock, e.g., using a timer.

In other embodiments, activation unit 360 can comprise a pressure sensor, rather than a reed switch. Upon engaging the pressure sensor 360 with a surface of the docking station 108, sealing member 106 and/or a connection interface 264, the pressure sensor 360 may be activated to transmit a signal to the control unit 350, via, e.g., wire 364. Control unit 350 may, in turn, activate the motor 352 to translate the ram 344 into the emptied position. Accordingly, the pressure sensor can also be used to automatically activate motor 352 upon docking the robotic vacuum cleaner 104 at the docking station 108.

In some cases, the activation unit 360 can be the same as activation unit 288 (FIGS. 7-11), used for controlling opening of the dirt bin door 212. Accordingly, a single activation unit can be used to control opening of the dirt bin door 212, and translating ram 344 into the dirt emptying position.

While the use of wires has been discussed herein for issuing activation signals, it will be appreciated that signals may be sent otherwise, such as by using Bluetooth™.

Alternately, the electric motor may be electro-mechanically activated. Accordingly, the electric motor 352 may be actuated to commence a dirt emptying cycle of the robot dirt bin 176 upon a user actuating a switch, such as a foot pedal (see for example FIG. 12). Generally, the embodiment exemplified in FIG. 12 operates analogous to the embodiment of FIG. 10, with the exception that the activation unit 360 is activated mechanically by a user, rather than being automatically activated upon docking the robot 104. According to this embodiment, the electro-mechanical activation mechanism comprises control unit 350 which is operably connected to electric motor 352 and a manually operated activation switch, such as foot pedal 384 or wirelessly via a smart phone, wherein upon the activation switch being actuated, such as by the user stepping on foot pedal 384, a signal is sent to the control unit 350 which then actuates the electric motor 352 thereby commencing an emptying cycle.

In the exemplified embodiment, a foot pedal 384 is rotatably mounted to the rear end 160 of the vacuum body 140, via a rotating cylinder 404 (FIG. 12C). Rotating cylinder 404 can rotate about an axis 139, transverse to longitudinal axis 138, in order to rotate foot pedal 384 between an initial undepressed storage position (FIG. 12A), and a depressed emptied position (FIG. 12B).

As exemplified in FIGS. 12A and 12B, foot pedal 384 may be drivingly connected to an engagement member 388, via one or more linkage beams 396a, 396b. Linkage beams 396 each comprise a first end $396_1$, attached to the rotating cylinder 404, and an opposed second end $396_2$, attached to a respective engagement member 388.

As exemplified in FIG. 12A, when the foot pedal 384 is located in the initial undepressed position, the engagement members 388 are disposed below, and spaced away from, activation unit 360, assuming the robotic vacuum cleaner 104 is in the upright position. Engagement members 388 may move a physical switch (e.g., a push button) that causes the control unit to issue a signal, or it may be part of a sensor system (e.g., a proximity sensor or a pressure sensor) that causes the control unit to issue a signal.

As exemplified in FIG. 12B, upon depressing the foot pedal 384 downwardly (i.e., by the user's foot), cylinder 404 is rotated clockwise, and linkage beams 396 are driven upwardly so as to cause at least one of the engagement members 388 to contact activation unit 360. Upon contact, activation unit 360 transmits an activation signal to control unit 350, to cause the unit 350 to translate ram 344 between the storage and emptied positions, as previously described. The activation unit 360 may be de-activated by returning the foot pedal 384 back to the undepressed position and/or by a timer.

In cases where the activation unit 360 comprises a reed switch, the engagement member 388 may comprise a magnet operable to close the reed switch 360 upon contact. In other cases, where the activation unit 360 comprises a pressure sensor, the engagement member can comprise any material that can be used to apply pressure to activate the pressure sensor 360.

Optionally, as exemplified in FIGS. 12A and 12B, a spring 408 is provided for automatically returning the foot pedal 384 back to the initial undepressed position. In the exemplified embodiment, spring 408 is connected between the foot pedal 384, and a laterally portion 412 of housing 140, located above the foot pedal 384. A tension spring or a compression spring may be used. Other biasing members which bias the foot pedal to the storage position may be used.

As exemplified, the compression spring 408 may expand as the user depresses the foot pedal 384. Once pressure is relieved from the foot pedal 384, the compression spring 408 can automatically retract to return the foot pedal 384 back to the undepressed position.

In other embodiments, the activation unit 360 can simply comprise a button, a switch or the like, which is located on an exterior to the robot body 140. The button or switch 360 can be mechanically activated, by a user, to translate the ram 344 between the storage and emptied position.

In a further alternate embodiment, control unit 350 may be wirelessly activated by a signal issued by, e.g., a smart phone or the docking station. Accordingly, when the robotic vacuum cleaner 104 docks the docking station may issue a signal which is received by the control unit 350 and thereby actuates an emptying cycle.

In the embodiment of FIG. 12, sweeping member 344*a* may be moveable into the docking station as far as is exemplified in FIG. 10C, or further.

FIG. 13 exemplifies an alternative configuration, wherein the ram 344 is translated between the storage and emptied position using only a mechanical activation mechanism. In this embodiment, the mechanical activation mechanism comprises a manually operated activation switch, such as foot pedal 384, wherein upon the activation switch being actuated, such as by the user stepping on foot pedal 384, an emptying cycle is operated.

In the exemplified embodiment, foot pedal 384 is drivingly engaged to the ram 344, by a linkage system 396. As exemplified, linkage system 396 comprises three connected linkage beams 396*a*, 396*b*, 396*c*. Each linkage beam extends between a respective first end $396a_1$, $396b_1$, $396c_1$ and a respective second end $396a_2$, $396b_2$, $396c_2$. It will be appreciated that, in other embodiments, the linkage system 396 may comprise any other number of connected linkage beams.

As exemplified, first linkage 396*a* may have a first end $396a_1$ which is pivotally connected to the rotating disk 404, and a second $396a_2$ connected to the second linkage 396*b* (i.e., a first end $396b_1$ of the second linkage 396*b*). Second linkage 396*b* is, in turn, connected between the first and third linkages 396*a*, 396*c*. Third linkage 396*c* is pivotally connected—at a first end $396c_1$—to the second linkage 396*b* (i.e., a second end $396b_2$ of the second linkage), and is pivotally connected—at a second end $396c_2$—to a portion of ram 344. In the exemplified embodiment, the third linkage 396*c* can connect to the ram 344 through an axial slot opening 357 extending into the housing cavity 356. As exemplified, in the storage or floor cleaning position (FIG. 13A), third linkage 396*c* is angled below the second linkage 396*b*.

In order to drive ram 344 into the dirt emptying position (FIG. 13B), foot pedal 384 is depressed downwardly to rotate disk 404 in a clockwise direction. This, in turn, drives upwardly the first linkage 396*a*, and further causes the second linkage 396*b* to rotate upwardly, and rearwardly. As the second linkage 396*b* is driven upwardly and rearwardly, the second linkage 396*b* pivots away from the third linkage 396*c*, allowing the third linkage 396*c* to translate ram 344 into the emptied position. To return the ram 344 back into the storage position, the foot pedal 384 is returned to the initial undepressed state, which causes the linkage system 396 to retract ram 344 back into the storage position.

Preferably, a first biased spring 408*a* is provided between the second and third linkages 396*b*, 396*c*. Spring 408*a* is biased in the expanded state, and expands to assist the third linkage 396*c* to rotate (e.g., pivot) away from the second linkage 396*b*, and in turn, translate ram 344 into the emptied position.

Optionally, a second biased spring 408*b* is located below the foot pedal 384, and is used to automatically return the foot pedal 384 back to the undepressed position. As exemplified, the spring 408*b* can connect between pedal 384 and a laterally extending portion 412 of the robot housing 140, disposed below the pedal 384. The spring 408*b* is compressed as the foot pedal 384 is depressed, and automatically expands as pressure from the foot pedal 384 is relieved. Accordingly, spring 408*b* automatically drives the foot pedal 384 into the initial undepressed position, and causes the linkage system 396 to automatically retract ram 344 back into the storage position.

Preferably, where both springs 408*a* and 408*b* are provided, the spring factor of spring 408*b* may be greater than the spring factor of spring 408*a*. In this manner, the expansive force of spring 408*a* does not overwhelm spring 408*b*, thereby inadvertently translating the ram 344 from the storage position to the cleaned position while the foot pedal 384 is not depressed.

While FIGS. 12 and 13 exemplify a foot pedal used in conjunction with an electro-mechanical, or mechanical activation mechanism, it will be appreciated that any other user-actuatable mechanical mechanism can be used in place of a foot pedal and the exemplified driving mechanism so as to drive motion of the ram 344. For example, in some cases, an adjustable lever can be provided in place of the foot pedal 384.

FIG. 14 exemplifies a further alternative embodiment wherein the ram 344 is translated between the storage and emptied positions using a hydraulic or pneumatic activation mechanism. In this embodiment, the hydraulic or pneumatic activation mechanism comprises a container (e.g., a cylinder) which comprises a fluid (which may be a compressed gas) wherein the fluid drives a mechanical member (e.g., ram 344) upon an activation switch being actuated (such as by the robotic surface cleaning apparatus docking at a docking station), thereby commencing an emptying cycle. The fluid may be pressurized in which case the activation switch may open a valve enabling the compressed fluid to drive, e.g., a ram 344. Alternately, the docking of the robotic surface cleaning apparatus docking at a docking station may drive the fluid to thereby drive, e.g., the ram 344. As exemplified in FIG. 14A, ram stem 344*b* is slidably received inside of a cavity formed by cylinder 356*a*. Cylinder 356*a* extends between a first open end $356a_1$, and an axially opposed second open end $356a_2$. The second end $356a_2$ is fluidically coupled, via a connecting tube 356*b*, to a piston cylinder 356*c*.

Piston cylinder 356*c* also extends, along an axis parallel to axis 138, between a first and second open end $356c_1$, $356c_2$, respectively. As exemplified, the first open end $356c_1$ is located at a front end 156 of the robot housing, and slidably receives a piston 416. The second open end $356c_2$ is connected to the tube 356*b*. The piston 416 includes a planar piston portion 416*a* sized to fit inside of the piston cylinder 356*c*, and an axially extending piston rod 416*b*, which in the floor cleaning or storage position, may at least partially protrude from an opening 419 located at the front end 156 of the robotic vacuum housing 140.

The connected system 356 may be filled with pressurized gas (e.g., a pneumatic system), or a pressurized fluid (e.g., a hydraulic system).

In the storage or floor cleaning position (FIG. 14A), ram stem 344b is, at least partially, disposed inside of cylinder 356a, while the piston rod 416b is, at least partially, disposed outside of piston cylinder 356c. Further, the planar piston portion 416a is recessed toward the second end $356c_2$ of the piston cylinder 356c. As exemplified in FIG. 14B, upon docking the robot 104, an axial end of the piston rod 416b engages a wall of the docking station 108, sealing member 106 and/or a connection interface 264, and axially translates the piston planar portion 416a across at least a portion of the axial length of the piston cylinder 356c toward the first piston cylinder end $356c_1$. This, in turn, generates a build-up of positive pressure in the connected system 356, and causes the pressurized medium to flow through tube 356b, and eject ram stem 344b out of cylinder 356a.

To retract the ram 344 back to the floor cleaning or storage position, a user may extract the piston rod 416b such as to translate the piston planar portion 416a back toward the second cylinder end $356c_2$. For example, a user can extract the piston rod 416b after undocking the robot 104. In particular, extracting the piston 416 results in a buildup of negative pressure in the connected system 356, and in turn, causes the ram stem 344b to retract back into the cylinder 356a.

Optionally, a biasing spring 602 may be provided to automatically return the piston 416 and ram 344 into the floor cleaning or storage position. The biasing spring 602 may be disposed between a flange 417 located along the piston rod 416b and a wall segment 604 located inside the robot housing 140. The biasing spring 602 can be biased into the expanded position. Accordingly, in the docked position (FIG. 14A) the biasing spring 602 may be compressed, and upon un-docking the robot vacuum 104, the biasing spring 602 may automatically expand to drive the piston 416 back into the storage or floor cleaning position.

It will be appreciated that the piston may be actuated by an activation switch 288 and the movement of piston 416 may be driven by an electric motor.

Referring now to FIGS. 15-16, which exemplify embodiments of a mechanical dirt transfer mechanism that is located inside of the docking station 108, rather than the robotic vacuum cleaner 104. The mechanical dirt transfer mechanism exemplified in FIGS. 15-16 can be used alone, or in conjunction with the any of the dirt transfer mechanisms, previously exemplified in FIGS. 10-14. According to such an embodiment, a mechanical transfer member 344 is extended from the docking station through the inlet of the docking station 108 and the dirt outlet 168 of the robot 104 into the robot dirt bin 176, optionally to the rear end 176b of the robot dirt bin. The member may then be reconfigured to pull or draw dirt from the robot dirt bin 176 into the docking station 108. In accordance with such an embodiment, the member 344 that is inserted into the robot dirt bin 176 may be configured (during the insertion stage of a cleaning cycle), to pass, e.g., through or above the dirt in the robot dirt bin 176. Upon completion of the insertion stage, the inward end of the member may be reconfigured so as to engage of pull dirt out of the robot dirt bin 176 during the retraction stage of the cleaning cycle.

As best exemplified in FIG. 15A, docking station 108 may include two compartments, a first compartment 108a for containing the dirt receptacle 248, and a second compartment 108b for housing the mechanical dirt transfer mechanism 344. In the exemplified embodiment, the second compartment 108b is arranged rearward, and in parallel to the first compartment 108a (i.e., on an opposite side of the first compartment 108a from the docking station opening 262a).

As exemplified, an inter-compartment opening 262b is disposed between the first and second compartments 108a, 108b, and is provided to allow the dirt transfer mechanism to extend into and through the dirt receptacle 248. Optionally, an openable door $272_2$ covers the secondary opening 262b, and is pivotally connected inside the docking housing 110 by a hinge 274b.

As further exemplified, the dirt receptacle 248 can also include a secondary opening 252b, which aligns with the inter-compartment opening 262b. As exemplified, secondary opening 252b is located on an opposite lateral face of the dirt receptacle 248 from the opening 252a, which aligns with the primary docking station opening 262a. Similar to the primary opening 252a, a flap (or door) 254b may cover, or seal, secondary opening 252b. In some cases, openable door $272_2$ of inter-compartment opening 262b may not be provided, and only the receptacle flap (or door) 254b included.

Similar to the embodiments previously exemplified in FIGS. 10-14, the dirt transfer mechanism 344 in FIG. 15 can comprise a "ram"-like mechanism 344. As best exemplified in FIG. 15A, ram 344 includes a drive member 344b (e.g., ram stem 344b) which extends between a first open end $344b_1$ and a second open end $344b_2$. In the exemplified embodiment, the ram stem 344b is formed from a flexible hollow member.

Ram 344 is driven between a storage position (FIG. 15A) and one or more dirt emptying positions (FIGS. 15B-15D) using rotating gears 348a, 348b. Similar to the gear 348 exemplified in FIG. 11, each gear 348a, 348b is driven by respective motors 352, via a motor shaft 352a (not illustrated). Further, each motor 352, controlling each gear 348, may in turn be controlled by a respective control unit 350a, 350b. While two gears 348 are exemplified in FIG. 15, it will be understood that any number of gears can be provided to translate the ram 344.

In the storage position (FIG. 15A), a portion of stem 344b may be oriented generally vertically (i.e., transverse to axis 138), such that the first end $344b_1$ is positioned above the second end $344b_2$. An advantage of this configuration is that the ram 344 can be stored in a vertically-configured compartment 108b, which can help reduce the depth of the docking station 108, and minimize its occupied storage space. In other cases, ram 344b can be configured to be stored horizontally (e.g., along axis 138 or transversely). Alternately, or in addition, it will be appreciated that the ram stem 344b may be a telescoping member.

As further exemplified, ram stem 344b is axially lined with grooves 346, which engage gears 348a, 348b, respectively. As exemplified, gears 348 are positioned on opposite longitudinal edges of ram stem 344b. The engagement of grooves 346 with gears 348 allows gears 348 to translate the stem 344b between the storage and one or more dirt emptying positions.

As best exemplified in FIG. 15A, a cable 444 extends inside, and through the hollow interior of stem 344b, between a first cable end 444a and a second cable end 444b (e.g., like a Bowden cable). The first cable end 444a is wound around a spool 450, which is in turn, rotated by a spool motor 448. Spool motor 448 is used to wind or unwind the spool 450, and is controlled by control unit 350c, via wire 365c. In the exemplified embodiment, control unit 350c is connected, e.g., via wire 472, to control units 350a, 350b in order to synchronize spool motor 448 with gear motors 352. As further exemplified, the second cable end 440b is connected to a foldable sweeping portion 344a of ram 344.

Figure 16B:
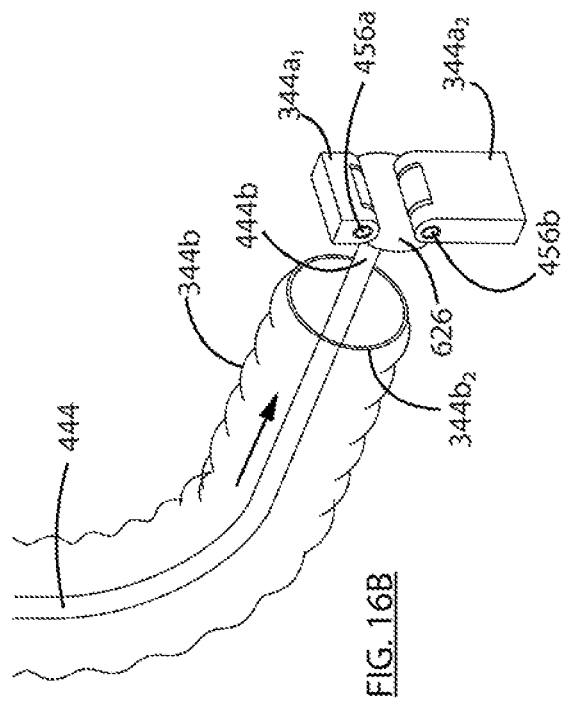
FIG. 16B is a perspective view of the foldable sweeper in a sweeping position.
Figure 16A:
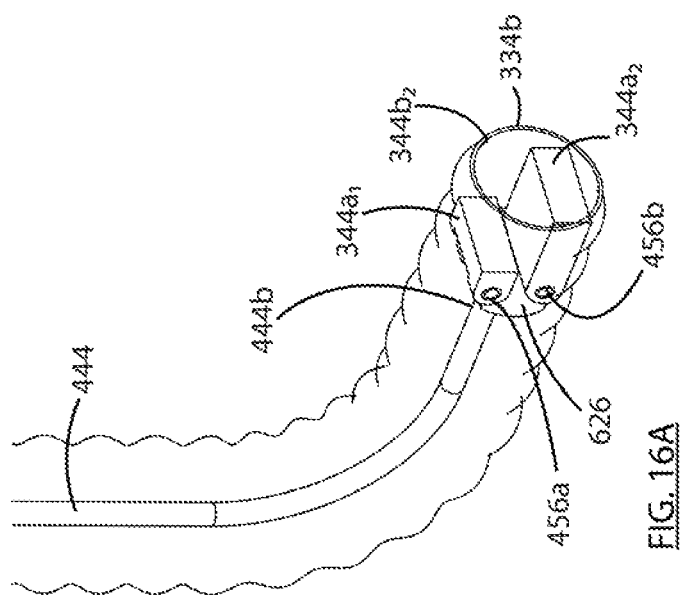
FIG. 16A is a perspective view of a foldable sweeper in an insertion position.

FIGS. 16A-16B exemplify an embodiment of a reconfigurable end of the ram stem 344b, which as exemplified is a foldable sweeping portion 344a. The sweeping portion 344a is reconfigurable between an insertion position (FIG. 16A) and a sweeping position (FIG. 16B).

As exemplified, foldable sweeping portion 344a includes a first sweeping member $344a_1$ and a second sweeping member $344a_2$, each pivotally attached to a holding member 626 by a respective hinge 456a, 456b. In the insertion position (FIG. 16A), the first sweeping member $344a_1$ is folded to overlie the second sweeping member $344a_2$. Additionally, in the insertion position, the sweeping portion 344a may be nested inside the hollow interior of stem 344b, proximal the second end $344b_2$ of hollow stem 344b.

In the sweeping position (FIG. 16B), the sweeper 344a is ejected (e.g., pushed out) of the hollow stem 344b by cable 444. This, in turn, allows the first sweeping member $344a_1$ to fold outwardly relative to the second sweeping member $344a_2$. In the exemplified embodiment, the second sweeping member $344a_2$ is positioned below both the first sweeping member $344a_1$ and the ram stem 344b in the folded-out sweeping position.

Optionally, hinges 456 can be configured as a spring hinges that are biased to the expanded position. In this configuration, hinges 456 can automatically fold out the sweeper 344a, when the sweeper 344a is ejected from the hollow stem 344b.

While the exemplified embodiment illustrates a two-piece sweeper 344a, it will be appreciated that in other cases, the sweeper 344a may have any number of foldable or reconfigurable pieces such that the sweeper may be inserted in an insertion configuration into the robot dirt bin 176 and then reconfigured to a sweeping configuration to remove dirt from the robot dirt bin 176 as the mechanical transfer member is retracted into the docking station. For example, in some cases, the sweeper 344 may comprise only one of the portions $344a_1$, $344a_2$.

As exemplified in FIGS. 15B-15C, during docking of the robotic vacuum cleaner 104, the ram 344 is extended into the dirt emptying position to commence emptying the robot dirt bin 176. In particular, ram stem 344b is extended across the first compartment 108 and dirt receptacle 248, and into the robot dirt bin 176. In some cases, ram 344 may only extend part-way through the first compartment 108 and receptacle 248.

To translate ram 344 into the dirt emptying position, control units 350a, 350b can activate motors 352 to rotate gears 348a, 348b. In some cases, to prevent over extension of ram 344b, control units 350a, 350b can control motors 352 to only rotate gears 348 a pre-determined number of rotations. Any activation mechanism discussed herein may be used.

As the ram stem 344b is translated into the dirt emptying position (FIG. 15B), that is optionally proximate the rear end of the robot dirt bin 176, spool motor 448 can unwind cable 444 at the same rate as ram stem 344b. This allows cable 444 to push forward the sweeping portion 344a at the same rate as ram stem 344b (FIG. 15B). In the exemplified embodiment, control units 350a, 350b and 350c may be coordinated to synchronize rotation of gear motors 352 and spool motor 448.

As exemplified in FIG. 15C, ram stem 344b can open docking station doors $272_1$ and $272_2$, as well as robot bin door 212, as it is being translated into the emptied position.

Once the ram stem 344b is translated into the dirt emptying position (FIG. 15C), control units 350a, 350 may stop rotating gear motors 352. Spool motor 448, however, may continuing unwinding cable 444 to eject the foldable sweeper 344a out of the hollow stem 344b from the insertion position (FIG. 15B) to the sweeping position (FIG. 15C). It will be appreciated that an advantage of folding the sweeper 344a in the sweeping position, only once the ram is in the dirt emptying position, is to prevent the sweeper 344a from pushing dirt into the robot dirt bin 176 as the stem 344b is being translated into the dirt emptying position.

In order to retract the ram 344 back to the storage position (FIGS. 15D-15E), control units 350a, 350b reverse rotation of gears 348. Gear motors 352 and spool motor 448 can be synchronized, e.g., via control units 350, to ensure cable 444 is retracted at same rate as ram stem 344b. As sweeping portion 344a is being retracted by cable 444, it may "drag" (e.g., transfer) dirt from the robot dirt bin 176 and into the dirt receptacle 248.

As exemplified in FIG. 15E, prior to returning the ram stem 344b into storage compartment 108b, spooling motor 448 can first wind back cable 444. This, in turn, draws the sweeping portion 344a back into the folded storage position, inside the hollow stem 344b. Gear motors 352 may then continue rotating gears 348 until the ram stem 344b is received inside the compartment 108b.

The dirt transfer mechanism exemplified in FIG. 15 can be activated in any suitable manner and may use any activation switch discussed herein. In the exemplified embodiment, the control units 350 are automatically electrically activated upon docking the robot 104. For instance, as exemplified in FIG. 15A, control units 350 are connected, e.g., via wire 364, to activation unit 360. Activation unit 360 is located at the front end 124 of docking housing 110. Upon docking robot 104, the activation unit 360 is activated, and transmits an activation signal to control units 350. This, in turn, causes the control units 350 to activate gear motors 352 and spool motor 448.

(b) Pneumatic Dirt Transfer Mechanism

Alternately, or in addition to mechanically transferring dirt from the robot dirt bin to the dirt receptacle 248, pneumatic transfer may be provided. Accordingly, a suction and/or blowing device may be positioned in any one or more of the robotic vacuum cleaner 104 (FIGS. 17-20), docking station 108 (FIGS. 21-24) and/or at a connection interface 264 provided between the docking station 108 and a docked robotic vacuum cleaner 104 (FIGS. 25-29).

For example, air may be blown through part or all of the robot dirt bin to move or assist in moving dirt into the docking station. The suction motor to direct air through the robot dirt bin may be provided at any location, such as in the docking station, a connection interface 264 or the robotic surface cleaning apparatus. The suction motor 180 of the robotic vacuum cleaner that is used in a cleaning operation may be used for such pneumatic transport. Alternately, a secondary suction motor may be provided inside the robotic vacuum cleaner, which may operate to provide a slower air flow rate than the suction motor 180, may be used to provide such pneumatic transport during an emptying cycle.

Alternately, air may be drawn out of the robot dirt bin. The suction motor 180 of the robotic vacuum cleaner that is used in a cleaning operation may be used for such pneumatic transport. Alternately, a secondary suction motor may be provided inside the robotic vacuum cleaner, which may operate to provide a slower air flow rate than the suction motor 180, may be used to provide pneumatic transport during an emptying cycle. An advantage of such a design is that the docking station need not have a separate suction motor, which may simplify the construction of the docking station. In accordance with such a design, the suction motor of the robot vacuum cleaner, whether the primary suction motor 180 and/or a secondary suction motor, may be operable to blow air through part or all of the robot dirt bin 176 during an emptying cycle.

As exemplified in FIGS. 17-20, the suction motor used for such pneumatic dirt transport may be located inside of the robotic vacuum cleaner 104.

FIG. 17 exemplifies a first embodiment for a pneumatic dirt transfer mechanism that is located inside of the robotic vacuum cleaner 104 and that uses the suction motor 180 of the robotic vacuum cleaner 104 in a dirt emptying mode. In accordance with such an embodiment, one or more valves may be used to reconfigure the air flow induced by the suction motor 180 through the robotic vacuum cleaner 140 between a primary floor cleaning air flow path (used during a floor cleaning mode of operation) and a secondary dirt emptying air flow path (used in a dirt emptying mode).

In the exemplified embodiment, suction motor 180 is connectable in fluid flow communication with a primary or cleaning airflow path 184*a* (FIG. 17A), and a secondary or dirt emptying airflow path 184*b* (FIG. 17B).

As exemplified in FIG. 17A, the primary flow path 184*a* may be used during normal cleaning operation when the robotic vacuum cleaner 104 is operating in a floor cleaning mode. The primary flow path 184*a* and can extend between a dirty air inlet 172 (as exemplified in FIG. 3) and the clean air outlet 196. During the floor cleaning mode, air is drawn through the dirty air inlet 172 via the primary path 184*a* to the robot dirt bin 176, via dirt inlet 188, and then out the robot dirt bin 176 through a first air passage 192*a* via air outlet 206, and then continues downstream to an inlet of suction motor 180. Air is then ejected from the suction motor 180 to the clean air outlet 196, via a second air passage 192*b*.

As exemplified in FIG. 17B, to transfer dirt and debris from dirt bin 176, air exiting suction motor 180, the robotic vacuum cleaner 104 may be operated in a dirt emptying mode whereby air flow may be re-directed back into the robot dirt bin 176 along the secondary airflow path 184*b*. Second air flow path 184*b* comprises a third air passage 192*c*, which connects the suction motor 180 outlet to an air inlet 484 of the robot dirt bin 176 (also referred to herein as dirt collection region air inlet port 484). The end of the passage 192*c* located at the downstream side of the suction motor 180 may be regarded as an inlet end of the secondary air flow path 184*b* (e.g., a secondary air flow path air inlet). Preferably, as exemplified, air inlet 484 is positioned at a rear-end 176*b* of the dirt bin 176. In this configuration, air exiting inlet 484 can blow dirt and debris toward the front-end of the dirt bin 176, and into the docking station 108. A filter medium 488 and/or an openable door may cover the air inlet 484 to prevent a backflow of dirt from entering air passage 192*c*, during normal cleaning operation.

As exemplified, two valves (a first valve 478*a* and a second valve 478*b*) are provided to re-direct airflow between the primary and secondary airflow paths. As exemplified, the first valve 478*a* may be located in the second air passage 192*b*, while the second valve 478*b* may be located in the third airflow passage 192*c*.

As exemplified in FIG. 17A, during the floor cleaning mode of operation, the first valve 478*a* is opened while the second valve 478*b* is closed. This configuration blocks airflow from entering air passage 192*c* (i.e., into dirt bin 176), and directs air toward the clean air outlet 196 (i.e., along the primary airflow path 184*a*).

As exemplified in FIG. 17B, when it is desired to empty the dirt bin 176 to operate the robot vacuum 104 in a dirty emptying mode, the valve configuration is reversed, such that the first valve 478*a* is closed, and the second valve 478*b* is opened. In this manner, airflow is re-directed, through air passage 192*c*, into the dirt bin air inlet 484 (i.e., along the secondary airflow path 184*b*). Accordingly, the valves 478 can be used to selectively connect the secondary air flow path 184*b* in fluid flow communication with the suction motor 180. As exemplified, as air is directed into the robot dirt bin 176, it may push dirt collected inside the robot dirt bin 176 forwardly through the robot dirt outlet 168, and into the docking station 108. Optionally, as exemplified, the docking station 108 may include a clean air outlet 608. Air flow into the docking station may exit through the clean air outlet 608, via an opening 612, and into the ambient surrounding. A filter media 608 may be located to prevent dirt plumes from forming as a result of air-entrained dirt being carried through the outlet 610. While the illustrated embodiment shows the clean air outlet 608 as being located at an upper end 116 of the docking station 108, in other embodiments, the clean air outlet 608 may be located at any other suitable location.

While the exemplified embodiment illustrates two valves, it will be appreciated that any number of valves can be provided. For example, a single three-way valve can be used to re-direct air between the clean air outlet 196 and the robot dirt bin 176.

Figure 17C:
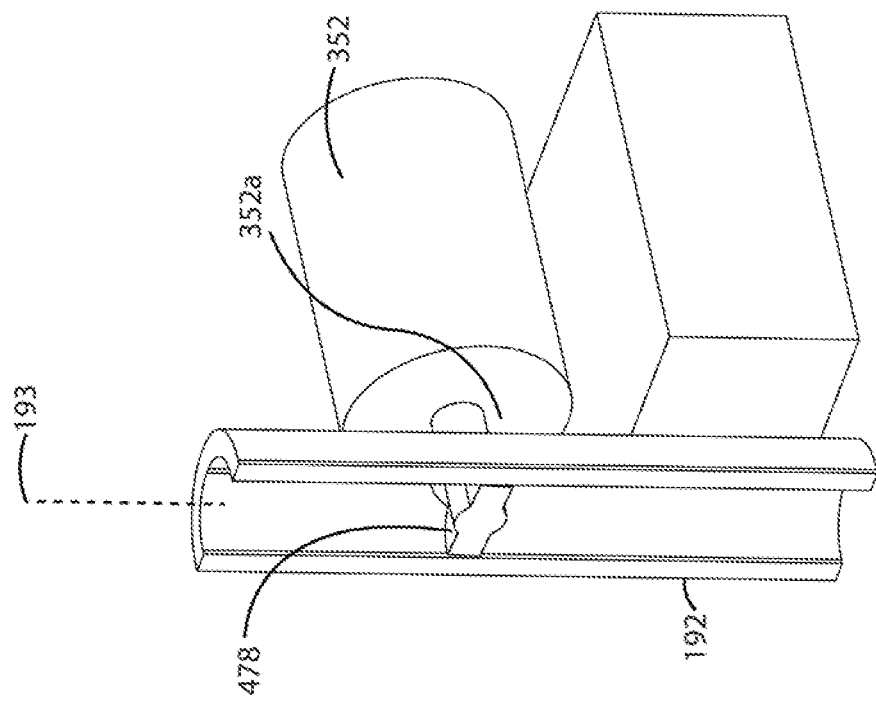
FIG. 17C is a perspective view of a butterfly valve in an open position.
Figure 17D:
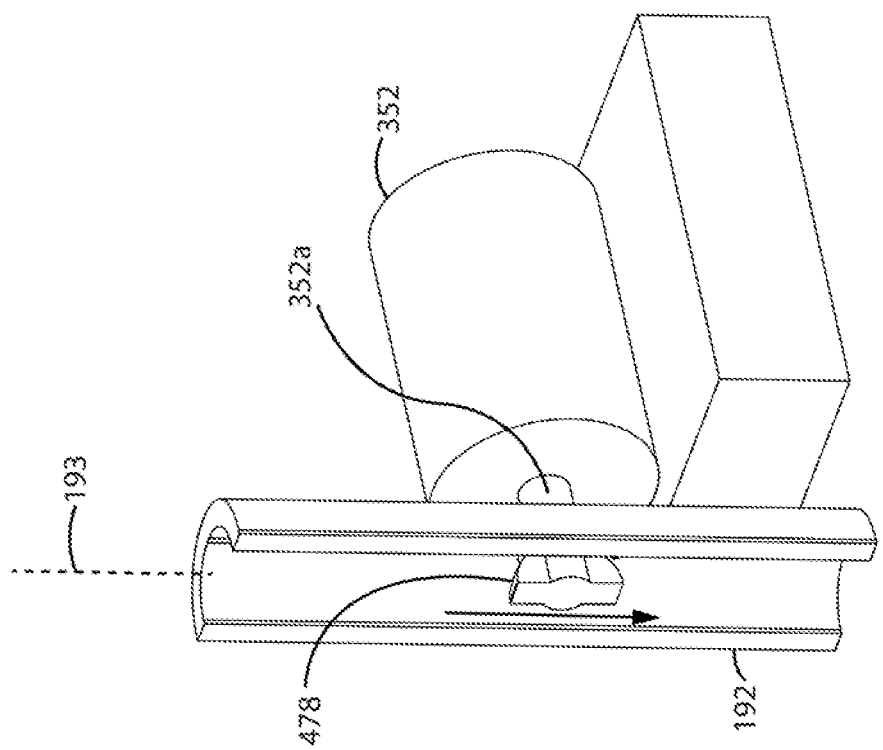
FIG. 17D is a perspective view of the butterfly valve of FIG. 17C in a closed position.

FIGS. 17C and 17D exemplify an embodiment of the valve 478. In the exemplified embodiment, each valve 478 comprises a butterfly valve. In the open position (FIG. 17C), the valve 478 is rotated in an axis generally parallel to an axis 193 of passage 192. In this position, airflow passes through air passage 192. As exemplified in FIG. 17D, the valve 478 can be closed by rotating the valve such that it is generally transverse with the passage axis 193. In this orientation, airflow is blocked from passing through the passage 192.

It will be appreciated that while the exemplified embodiment illustrates butterfly valves, any other suitable valves known in the art may also be used. For instance, valves 478 can comprise ball valves, gate valves or check valves, or otherwise, any switch mechanism capable of diverting and re-directing airflow.

In the exemplified embodiment, motors $352_1$, $352_2$ are provided to rotate valves 478*a*, 478*b*, respectively, between the open and closed positions. As illustrated in FIGS. 17C and 17D, valves 478*a*, 478*b* are mounted to drive shafts $352a_1$, $352a_2$ of motors $352_1$, $352_2$, respectively, allowing motors 352 to rotate the valves 478.

Motors 352 may be activated in any suitable manner to re-configure the valves 478 between the open and closed positions. For instance, as explained previously with respect to FIGS. 10-16, an activation unit 360 can be provided to activate motors 352, via control unit 350. Any activation mechanism discussed herein may be used. For example, activation unit 360 may be automatically activated upon docking robot 104, or otherwise.

Figure 19A:
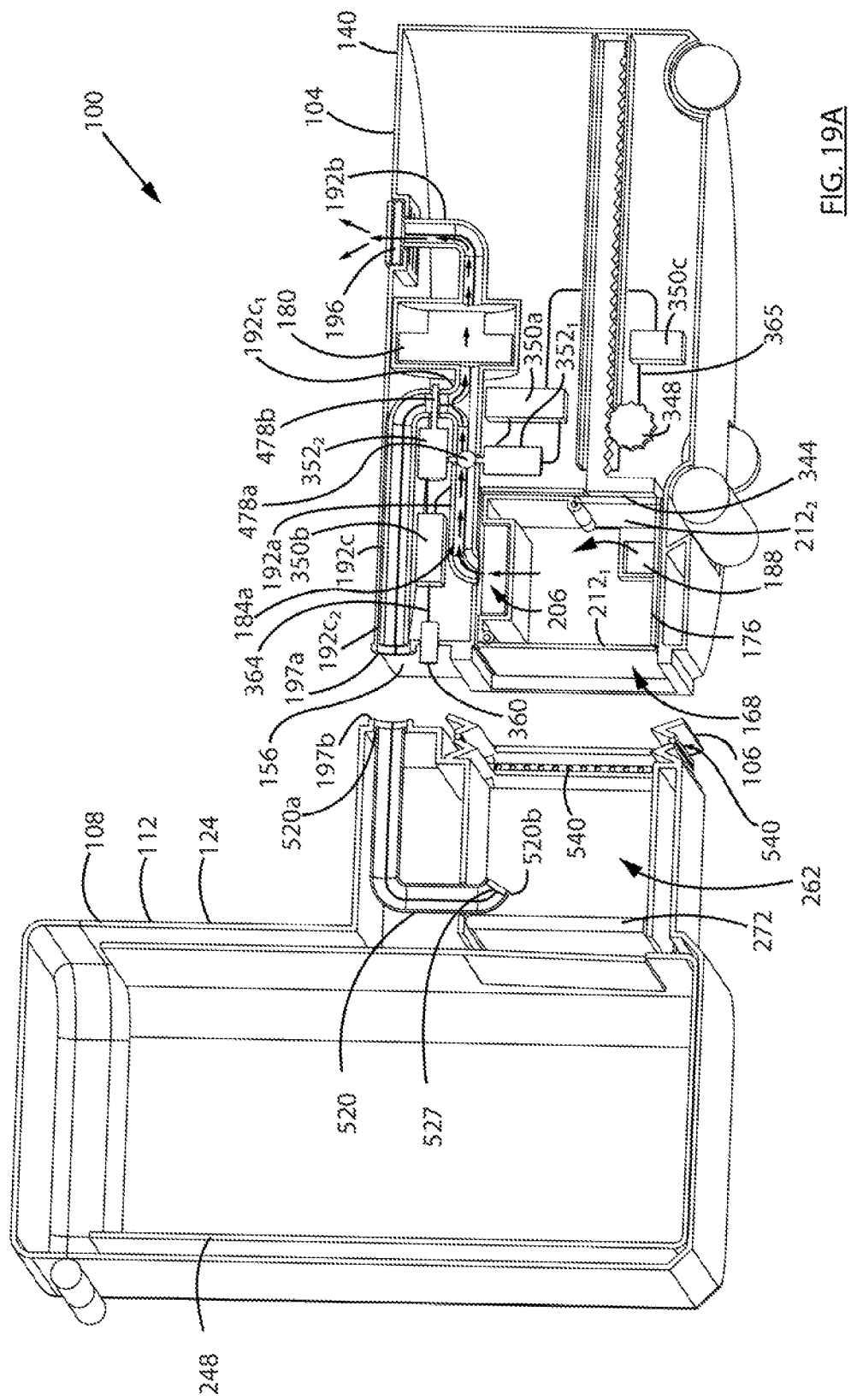
FIG. 19A is a side cross-sectional view of a robotic vacuum cleaner, taken along sectional line 10-10' of FIG. 5C, in accordance with a further alternate embodiment, and showing a suction motor of the robotic vacuum cleaner operating in a floor cleaning mode.

While the embodiment of FIGS. 17A and 17B exemplify the first airflow conduit 192*a* being the source of air used in the dirt emptying mode, it will be appreciated that the source of air may be located elsewhere, such as a location downstream from dirt outlet port 168 during the emptying mode (e.g., in an interface 264 as exemplified in FIG. 19A or in the docking station or on an outer surface of the robotic surface cleaning apparatus). In such a case, a further vale may be used to connect the suction motor 180 inlet end to such a source of air.

FIGS. 18A-18B exemplify an alternative embodiment of a pneumatic dirt transfer mechanism that also uses the suction motor 180 of the robotic vacuum cleaner 104. In contrast to the configuration of FIGS. 17A-17B, the secondary flow path 184b in FIG. 17 extends between an upstream side of the suction motor 180, and an air inlet 484 of the robot dirt bin 176. In the floor cleaning mode (FIG. 18A), the valve switch 478a is opened, while the valve switch 478b is closed and the suction motor 180 may drive an internal fan blade in a first direction to drive the flow of air along the primary air flow path 184a. That is, the flow of air is driven from the robot dirty air inlet 172, through the robot dirt bin 176 and to the clean air outlet 196. In the dirt emptying mode (FIG. 18B), the valve switch 478a is closed, while the valve switch 478b is opened. The direction of rotation of the internal fan blade of suction motor 180 is then reversed such that the suction motor 180 inlet is now an air outlet. In this configuration, the flow of air is driven from the air inlet 196, through the air passage 192c and into the robot dirt bin 176 via the air inlet 484. The air being blown into the robot dirt bin 176 from air inlet 484 may push collected debris out of the robot vacuum cleaner via dirt outlet 168. Optionally, as exemplified, operation of the suction motor 180 between the floor cleaning and dirty emptying mode can be controlled by the activation unit 350, via a connecting wire 628. It will be appreciated that this embodiment may utilize any motor and fan blade assembly that, in a first mode of operation, directs air in a first direction and, in a second mode of operation, directs air in another (e.g., the opposite) direction. It will also be appreciated that while this embodiment exemplifies the use of air outlet 196 as the source of air in the dirt emptying mode, the source or air may be an alternate inlet port. In such a case, a further vale may be used to connect the suction motor 180 to such a source of air.

FIGS. 19A-19C exemplify still an alternative embodiment of a pneumatic dirt transfer mechanism that also uses the suction motor 180 of the robotic vacuum cleaner 104. The exemplified embodiment of FIG. 19 also operates generally analogous to the embodiment exemplified in FIG. 17, with the exception that re-directed airflow is entering the suction motor 180, rather than exiting the suction motor 180. According to such an embodiment, air is drawn by suction motor 180 out of the dirt outlet port 168 of the robot dirt bin 176.

In the exemplified embodiment, the third airflow conduit 192c extends between a first end 192$c_1$ and a second end 192$c_2$. The first end 192$c_1$ connects to the first airflow conduit 192a, which directs air into the suction motor 180 inlet. The second end 192$c_2$ is an open end provided at, e.g., a front end 156 of the robotic vacuum cleaner 104.

As further exemplified in FIG. 19B, the docking station 108 also includes an air passage 520. Air passage 520 comprises an air outlet end 520a, disposed at a front end 124 of the docking station housing 110, along the upright section 112, and an air inlet end 520b, provided at the docking station opening 262. It will be appreciated that inlet end 520b may be located anywhere on interface 264 or the docking station.

In the exemplified embodiment, the first valve 478a is located inside the first air passage 192a, while the second valve 478b is located inside the third air passage 192c.

As exemplified, during the floor cleaning mode of operation (FIG. 19A), the first valve 478a is open, and the second valve 478b is closed. In this configuration, airflow travels along the primary airflow path 184a, from the robot dirty air inlet 172, through the robot dirt bin 176 to the suction motor 180 inlet, and out of the clean air outlet 196.

Upon docking the robotic vacuum cleaner 104, the vacuum cleaner 104 is operated in a dirty emptying mode whereby the second open end 192$c_2$ of air passage 192c, engages (e.g., abuts) the outlet end 520a of docking station passage 520 (FIG. 19B). The first valve 478a is then closed, and the second valve 478b is opened.

In this configuration, air is drawn by suction motor 180 through air inlet 520b, and flows along a secondary airflow path 184b comprising the docking station air passage 520 and the third air passage 192c, and toward the suction motor 180. In the exemplified embodiment, the suctioning of air through inlet 520b, draws dirt and debris out of the robot dirt bin 176, and into the docking station 108. Preferably, as exemplified, docking station air inlet 520b is directed to face the robotic vacuum cleaner 104, in order to draw air from the dirt bin 176.

Preferably, as exemplified, the configuration in FIG. 19B is used in conjunction with a secondary (e.g., mechanical) dirt transfer mechanism, such as a mechanical ram 344 provided inside of the robot 104. In this configuration, the ram 344 can be used to push dirt and debris toward the front end of dirt bin 176, and the suction at inlet 520b can further facilitate drawing the dirt inside the docking station 108.

It will be appreciated that in the dirt emptying mode of operation, the suction motor 180 may operate at a slower speed so as to limit the dirt which is entrained in an air stream and drawn into air passage 192c.

As exemplified, sealing members 197a, 197b can be provided around the second end 192$c_2$ of air passage 192c, and the outlet end 520a of docking station air passage 520, respectively. The sealing members 197 can comprise a gasket or the like, and can prevent air leakage between air passage 192c and air passage 520 during an emptying cycle. As further exemplified, a filter medium 527 may optionally cover the docking station air inlet 520b to prevent dirt and debris from entering the air passage 520.

Optionally, as exemplified in FIGS. 19B and 19C, bellows 106—is disposed between the docking station 108 inlet 262 and the robotic vacuum cleaner 104 dirt outlet port 168 which—may include one or more openings or perforations 540 extending therethrough. As exemplified in FIG. 19B, as air is being drawn through air inlet 520b, the reduced pressure in the dirt transfer passage (the passage between outlet port 168 of robotic vacuum cleaner 104 and opening port 262 of the docking station 108) can draw ambient air through the gasket perforations 540. An advantage of this configuration is that dust or dirt, which may escape during an emptying cycle of the robot dirt bin 176, can be drawn back through the gasket perforations 540. In particular, this can prevent formation of dust plumes around the combined apparatus 100. In other embodiments, rather than providing a bellows 106, any other sealing member (e.g., a gasket) having one or more openings can be provided.

As exemplified in FIGS. 20A and 20B, the pneumatic dirt transfer mechanism may use a second suction motor located inside the robotic vacuum cleaner 104, which differs to the suction motor 180 of robotic vacuum cleaner 104 that is used during the floor cleaning mode of operation. Accordingly, the robotic vacuum cleaner 104 may comprise a suction motor 180 for use in a floor cleaning mode and a suction motor for use in a dirt emptying mode. In the exemplified embodiments, the suction motor for use in the dirt emptying mode can be located either outside of the robot dirt bin 176 (FIG. 20A), or inside of the robot dirt bin 176 (FIG. 20B).

As exemplified in FIG. 20A, suction motor 504 is positioned rearward of the dirt bin 176, and within a secondary airflow path 184b. The secondary airflow path 184b extends between an inlet end $196c_1$ of air passage 192c, located on the exterior of robot body 140, and air inlet 484 of robot dirt bin 176.

Upon activating suction motor 504, ambient air is drawn through the air inlet $196c_1$ and into air passage 196c. The air may then flow downstream, through the conduit 196c, to a second end $196c_2$ of the air passage, positioned at the suction motor 504 inlet. Suction motor 504 then ejects the suctioned air into the dirt bin 176, via the dirt bin inlet 484, so as to blow (e.g., eject) dirt and debris out of the bin 176, and into the docking station 108 via the dirt outlet port 168 of the robotic vacuum cleaner 104.

In the exemplified embodiment, a filter media 486 can cover the air inlet $192c_1$ to prevent dirt and debris from being suctioned into air passage 192c from the ambient surrounding. Preferably, as exemplified, air inlet 484 is also positioned at a rear end 176b of the bin 176, so as to blow dirt forwardly, toward an opened front end 176a of bin 176.

FIG. 20B exemplifies a similar configuration to FIG. 20A, with the exception that the suction motor 504 is now positioned inside the robot dirt bin 176, and forward of the dirt bin air inlet 484.

In the exemplified configuration, the dirt bin air inlet 484 is contiguous with the second end $192c_2$ of the air passage 192c. Suction motor 504 draws air through the inlet 484, and directs the air directly into the dirt bin 176. Optionally, as exemplified, the filter medium 488 can be positioned forward of the suction motor 504, to prevent dirt and debris from clogging the suction motor 504 fan during normal cleaning operation.

In the configurations exemplified in FIGS. 20A and 20B, the suction motor 504 can be activated in any suitable manner and may use any activation mechanism discussed herein. For instance, as exemplified, suction motor 504 can be controlled by a control unit 350 (e.g., via wire 365), which is in turn, connected to an activation unit 360 (e.g., via wire 364). Activation unit 360 can function as previously exemplified with respect to FIGS. 10-12. In various cases, upon receiving an activation signal from activation unit 360 (i.e., at docking), control unit 350 can activate suction motor 504 for all or a portion of the time during which robotic vacuum cleaner 104 is docked. In other cases, control unit 350 can activate suction motor 504 for only a pre-determined interval of time before de-activating the suction motor. In some cases, suction motor 180 can be turned off prior to activating suction motor 504 (i.e., using power switch 164 in FIG. 2).

It will be appreciated that, in any embodiment wherein air is blown through the robot dirt bin, the air inlet and air outlet may be located at any location. Optionally, as exemplified, the air is directed linearly through the robot dirt bin. Accordingly, the air inlet and the air outlet may be spaced apart and face each other. For example, as exemplified in FIGS. 17A, 17B, 18A, 18B, 20A and 20B, optionally, the air inlet and the air outlet in the dirt emptying mode are on opposed sidewalls such that air is blown over the floor of the robot dirt bin from one end to the other.

Referring now to FIGS. 21-24, which exemplify various embodiments for a suction motor 504 positioned inside the docking station 108, rather than robotic vacuum cleaner 104. It will be appreciated that the exemplified embodiments can be used separately, or in conjunction with any of the embodiments previously exemplified in FIGS. 17-20.

FIGS. 21A-21B exemplify a first embodiment for a suction motor 504 located inside the docking station 108. As best exemplified in FIG. 21B, docking station 108 includes the suction motor 504, positioned between a first air passage 520 and a second air passage 522.

First passage 520 extends between an inlet end 520a and an outlet end 520b. As exemplified, the inlet end 520a is downward facing and is configured to overlie the robotic vacuum cleaner 104 during docking, while outlet end 520b feeds into the suction motor 504. The second passage 522 also includes an inlet end 522a, located at the suction motor 504 outlet, and an outlet end 522b, located at the docking station opening 262. In the exemplified embodiment, the outlet end 522b faces into the docking station 108.

As further exemplified in FIG. 21A, robotic vacuum cleaner 104 includes an air passage 192c. Air passage 192c includes an inlet end $192c_1$, positioned proximal the robotic vacuum cleaner outlet port 168, and facing toward dirt bin 176. An outlet end $192c_2$ of the air passage is provided at an upper end 144 of robot housing 140.

In the exemplified embodiment, when in the docking position (FIG. 21B), outlet end $192c_2$ of robotic vacuum cleaner 104 aligns with downward facing inlet end 520a of the docking station 108. Optionally, sealing members 197a, 197b are provided at the outlet end $192c_2$ and inlet end 520a, respectively.

Upon activating suction motor 504 (e.g., using activation unit 360) (FIG. 21B), air is drawn from the robot dirt bin 176, via the air inlet $192c_1$, and through passages 192c and 520. The suction force at the air inlet $192c_1$ draws dirt and debris out of the dirt bin 176, and directs it towards the robot outlet port 168. As exemplified, air drawn by suction motor 504 is then drawn into the docking station opening 262 via the air outlet 522b. The air blown out of outlet 522b facilitates pushing the dirt and debris that has been drawn from robot dirt bin 176 into the dirt receptacle 248.

Such an embodiment may be used in conjunction with a mechanical dirt transfer system. The suction motor 504 may operate at a relatively low level of suction so as to assist with the dirt transfer.

FIGS. 22A-22B exemplify an alternative configuration for a suction motor 504 located inside of the docking station 108 wherein suction motor 504 is used to blow air through the robot dirt chamber. The exemplified arrangement is generally analogous to FIGS. 21A-21B, with the exception that: (i) suction motor 504 is inverted to draw air through inlet 522b, and eject air through outlet 520a; (ii) air inlet 522b is directed toward the docked robotic vacuum cleaner 104 and (iii) air outlet 520a is located at a front end 124 of docking station 108, along upright section 112, and faces forwardly.

Further, in the exemplified embodiment, the first open end $192c_1$ of air passage 192c, which is inside the robotic vacuum cleaner 104, is located at the front end 156 of the vacuum body 140, while the second open end $192c_2$ is positioned at the air inlet 484 of robot dirt bin 176.

Upon docking the vacuum cleaner 104 (FIG. 22B), the open end $192c_1$ of air passage 192c, aligns with the outlet end 520a of the docking station 108. The activated suction motor 504 draws air through inlet 522b and passage 522, and ejects the air through passages 520 and 192c, and into the robot dirt bin 176 via air inlet 484. Accordingly, air exiting the dirt bin inlet 484 can push dirt, forwardly, out of the dirt bin 176, and toward the docking station 108. The complementary suction force at inlet 522b may further assist in drawing dirt and debris into the docking station 108.

Optionally, as exemplified, a sealing member 106, having one or more perforations 540, can be provided between the docking station 108 and the robotic vacuum cleaner 104.

Figure 23:
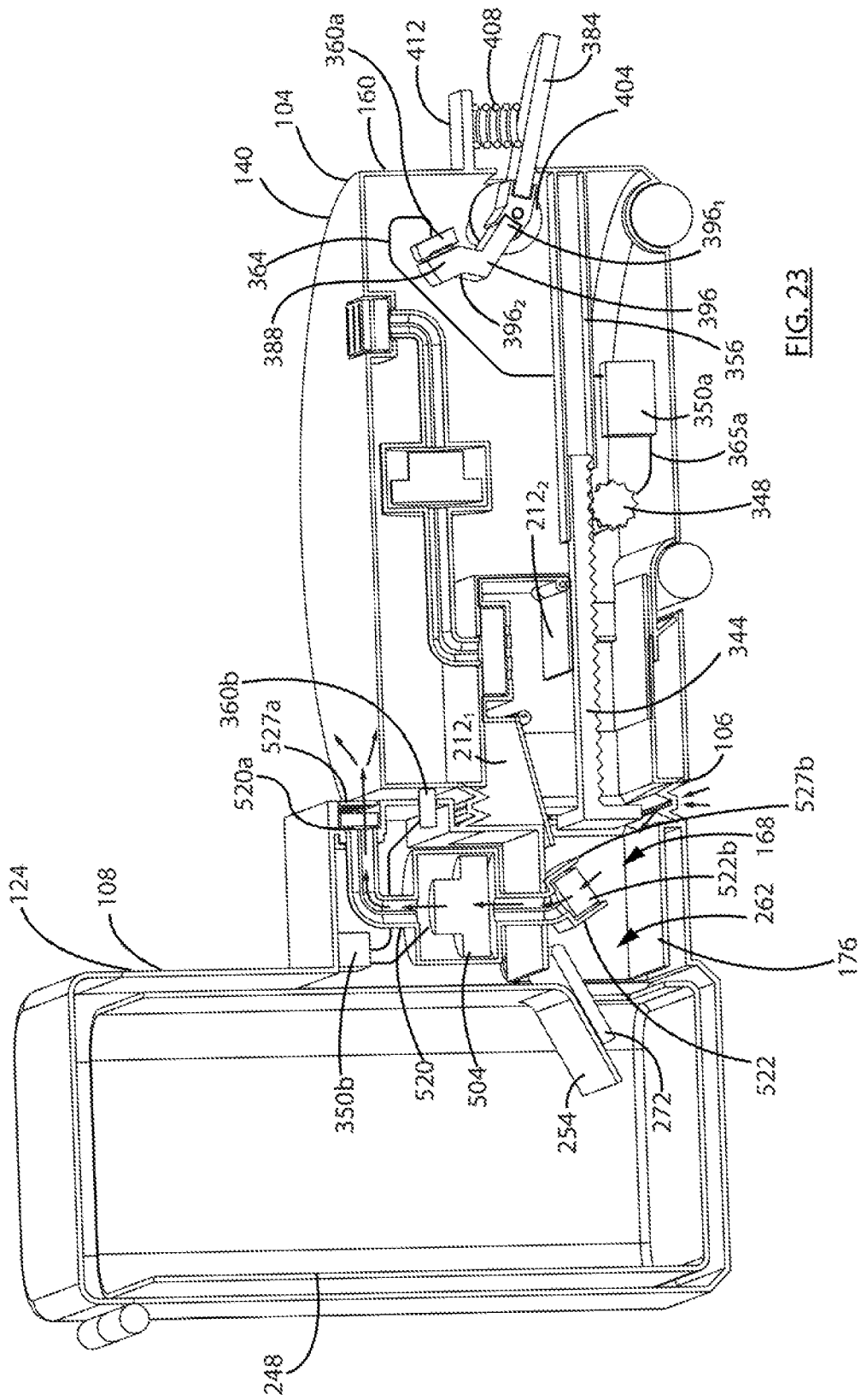
FIG. 23 is a side cross-sectional view of a robotic vacuum cleaner docked at a docking station, taken along sectional line 10-10' of FIG. 5C, and showing a suction motor provided inside the docking station being operated in a dirt emptying mode, according to a further alternate embodiment.

FIG. 23 exemplifies still a further alternative configuration for a suction motor 504 located inside of the docking station 108. The exemplified configuration of FIG. 23 is generally analogous to the configuration previously exemplified in FIG. 22, with the exception that the suction motor 504 ejects air, from outlet 522a, directly into the ambient surrounding. Accordingly, in this configuration, an airflow passage 192c is not required inside of the robotic vacuum cleaner 104.

Preferably, in the exemplified configuration, a secondary (e.g., mechanical) dirt transfer mechanism (e.g., ram 344 inside robot 104) is provided to facilitate pushing of dirt and debris toward the suction point 522b, and further into the dirt receptacle 248.

FIGS. 24A-24B exemplify still a further alternative configuration for a suction motor 504 inside of the docking station 108. In this embodiment, the suction motor 504 configuration exemplified in FIGS. 24A-24B is analogous to the configuration previously exemplified in FIG. 23, with the exception that the suction motor 504 is: (i) inverted to suction ambient air through an inlet 520a, and eject air through an outlet 522b; and (ii) the air outlet 522b is directed into the docking station 108, so as to blow dirt and debris toward the dirt receptacle 248. In the exemplified embodiment, air inlet 520a is provided at the front end 124 of docking station 108, along the upright section 112.

An advantage of the exemplified configuration is that the suction motor 504 can be used to draw air-borne containments, which escape when emptying robot bin 176 into docking station 108.

In particular, as exemplified, suction point 520a can include a filter media 527a, which can be used to capture air-borne contaminants which escape while emptying the robot dirt bin 176. Once the suction motor 504 is de-activated, dirt collected on filter media 527a may, for example, collapse on the surface located around the docking station 108. The collapsed dirt may then be swept and cleaned by a user. As exemplified in FIG. 24B, the suction motor 504 can also be used to prevent dust plumes from forming while undocking robot 104. For instance, suction motor 504 can be activated while un-docking the robot to prevent debris that was not fully transferred, between the dirt bin 176 and docking station 108 during cleaning from becoming air borne. It will be appreciated that the use of a suction motor to reduce or prevent dust plumes for forming upon de-docking may be used in any embodiment disclosed herein.

Optionally, as previously discussed and as exemplified, a secondary (e.g., mechanical) dirt transfer mechanism (e.g., ram 344 inside robotic vacuum cleaner 104) can be provided to facilitate pushing of dirt and debris out of the robot dirt bin 176 and toward the docking station 108. For example, ram 344 may push dirt toward the docking station opening 262, and air being blown out of outlet 522b can further push the ejected dirt and debris into the dirt receptacle 248.

Alternately, as discussed previously, an interface may be provided between the robotic vacuum cleaner 104 and the docking station 180. The interface may be part of the docking station and may be removably mounted thereto or non-removably mounted thereto. FIGS. 25-29 exemplify various embodiments for a suction motor 504 provided in connection interface 264. The exemplified embodiments can be used separately, or in conjunction with the embodiments previously exemplified in FIG. 17-23.

As best exemplified in FIG. 24, the connection interface 264 can comprise a housing portion 264a for housing suction motor 504, and a passage portion 254a which extends between a first open end $264b_1$ and a second open end $264b_2$. As exemplified, the first open end $264b_1$ aligns with the robotic vacuum cleaner outlet 168 when the robotic vacuum cleaner is docked, while the second open end $264b_2$ aligns with the docking station opening 262.

In the exemplified embodiment, the housing portion 264a is positioned above the passage portion 264b. However, it will be appreciated that in other embodiments, the housing portion 264a can be positioned at any other location relative to passage portion 264b. For example, housing portion 264a can be disposed lateral to, or below passage portion 264b.

FIG. 25 exemplifies a first embodiment of a suction motor 504 positioned inside the connection interface 264. As exemplified, the suction motor 504 draws (e.g., suctions) ambient air, through the air inlet 520a. Air flows to suction motor 504 via passage 520. Suction motor 504 ejects the air through airflow passage 522, and into passage portion 264b of connection interface 264 (e.g., via outlet 522b). In the exemplified configuration, outlet 522b is oriented toward the docking station 108, and further is positioned proximal the first open end $264b_1$ of passage 264b. In this configuration, air ejected from outlet 522b can be used to blow dirt and debris from the robot dirt bin 176 into the docking station 108.

Preferably, as exemplified, the configuration exemplified in FIG. 25, is used in conjunction with a secondary (e.g., mechanical) dirt transfer mechanism. For example, as exemplified, ram 344 inside robotic vacuum cleaner 104 can be used to eject dirt out of the robot dirt bin 176, and into the connection interface 264. Air ejected from suction motor 504 is then used to blow ejected dirt, further into the docking station 108.

FIGS. 26-28 exemplify still further embodiments of a suction motor 504 positioned inside the connection interface 264. The embodiment exemplified in FIGS. 26-28 are generally analogous to the exemplified embodiment of FIG. 25, with the exception that: (i) the configuration of suction motor 504 is reversed to suction air from inlet 522b, and eject air through outlet 520a; (ii) the air inlet 522b is directed to face the docked robotic vacuum cleaner 104 in order to suction air from the robot dirt bin 176.

Optionally, a sealing member 106 having one or more perforations 540 can be provided between the connection interface 264 and the robotic vacuum cleaner 104.

In the exemplified embodiment, the air outlet 520a can be positioned to eject air into the ambient surrounding (FIG. 26), into the docking station 108 (FIG. 27), into the passage portion 264b (FIG. 28), or into an air passage 192c located inside of the robotic vacuum cleaner 104, which further directs air into the dirt bin 176, via air inlet 484 (FIG. 29). In particular, the embodiment exemplified in FIG. 28 may operate generally analogously to the embodiment previously exemplified in FIG. 21, with the exception that the suction motor 504 is provided inside the connection interface 264, rather than docking station 108.

It will be appreciated that a mechanical dirt transfer mechanism may be used in conjunction with any pneumatic dirt transfer mechanism.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An apparatus comprising a docking station and an autonomous surface cleaning apparatus wherein, the autonomous surface cleaning apparatus comprises:
    (a) a primary air flow path extending from a dirty air inlet to a clean air outlet;
    (b) a primary suction motor positioned in the primary air flow path; and
    (c) an air treatment unit positioned in the primary air flow path, the air treatment unit comprising a dirt collection region;
and wherein the docking station comprises a dirt receptacle and a mechanical dirt transfer mechanism moveable between a first position and a second position, wherein when the mechanical dirt transfer mechanism moves between the first position and the second position, the mechanical dirt transfer mechanism physically engages dirt that has collected in the dirt collection region and transfers at least some of the dirt that has collected in the dirt collection region from the dirt collection region towards the dirt receptacle.

2. The apparatus of claim 1 wherein, when the autonomous surface cleaning apparatus is positioned on a floor, the air treatment unit has an upper side, a lower side, a first end having a first side positioned between the upper and lower sides and a second end having a second side positioned between the upper and lower sides, the second side is spaced apart from the first side in a first direction and, the mechanical dirt transfer mechanism is moveable in the first direction through at least a portion of the air treatment unit whereby dirt collected in the air treatment unit is moved in the first direction through the air treatment unit.

3. The apparatus of claim 1 wherein, when the autonomous surface cleaning apparatus is positioned on a floor, the air treatment unit has an upper side, a lower side, a first end having a first side positioned between the upper and lower sides and a second end having a second side positioned between the upper and lower sides, the second side is spaced apart from the first side in a first direction, the second side has a dirt outlet and, in a dirt emptying mode, the mechanical dirt transfer mechanism is moveable through the dirt outlet towards the first side and then moveable in the first direction back through the dirt outlet.

4. The apparatus of claim 3 wherein the mechanical dirt transfer mechanism comprises a sweeping portion and a drive portion, the sweeping portion is reconfigurable between in insertion position in which the sweeping portion is positioned above the lower side and a sweeping position in which the sweeping portion extends downwardly from the drive portion.

5. The apparatus of claim 1 wherein the autonomous surface cleaning apparatus has a robot bin door which closes a dirt outlet of the air treatment unit and the mechanical dirt transfer mechanism opens the robot bin door when the mechanical dirt transfer mechanism is actuated.

6. The apparatus of claim 1 wherein the docking station has an openable door which closes a dirt inlet of the dirt receptacle and the mechanical dirt transfer mechanism opens the openable door when the mechanical dirt transfer mechanism is actuated.

7. The apparatus of claim 6 wherein the autonomous surface cleaning apparatus has a robot bin door which closes a dirt outlet of the air treatment unit and the mechanical dirt transfer mechanism opens the robot bin door when the mechanical dirt transfer mechanism is actuated.

8. The apparatus of claim 1 wherein the autonomous surface cleaning apparatus has a robot bin door which closes a dirt outlet of the air treatment unit and the robot bin door is opened when the autonomous surface cleaning apparatus docks at the docking station.

9. The apparatus of claim 1 wherein the docking station has an openable door which closes a dirt inlet of the dirt receptacle and the openable door is opened when the autonomous surface cleaning apparatus docks at the docking station.

10. The apparatus of claim 9 wherein the autonomous surface cleaning apparatus has a robot bin door which closes a dirt outlet of the air treatment unit and the robot bin door is opened when the autonomous surface cleaning apparatus docks at the docking station.

11. The apparatus of claim 1 wherein the autonomous surface cleaning apparatus has a robot bin door which closes a dirt outlet of the air treatment unit and the robot bin door is opened when an emptying mode of the autonomous surface cleaning apparatus is actuated.

12. The apparatus of claim 1 wherein the docking station has an openable door which closes a dirt inlet of the dirt receptacle and the openable door is opened when an emptying mode of the autonomous surface cleaning apparatus is actuated.

13. The apparatus of claim 12 wherein the autonomous surface cleaning apparatus has a robot bin door which closes a dirt outlet of the air treatment unit and the robot bin door is opened when an emptying mode of the autonomous surface cleaning apparatus is actuated.

14. The apparatus of claim 1 further comprising a pneumatic dirt transfer mechanism.

15. The apparatus of claim 14 wherein the autonomous surface cleaning apparatus has the pneumatic dirt transfer mechanism.

16. The apparatus of claim 1 wherein the mechanical dirt transfer mechanism is exterior to the dirt receptacle.

* * * * *